(12) United States Patent
Son et al.

(10) Patent No.: US 12,519,878 B2
(45) Date of Patent: Jan. 6, 2026

(54) ELECTRONIC DEVICE COMPRISING ANTENNA

(71) Applicant: Samsung Electronics Co., Ltd., Suwon-si (KR)

(72) Inventors: Cheolhong Son, Suwon-si (KR); Gyusub Kim, Suwon-si (KR); Jongwon Kim, Suwon-si (KR); Kyungmoon Seol, Suwon-si (KR); Jungkyu Lee, Suwon-si (KR); Bumjin Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 510 days.

(21) Appl. No.: 18/167,497

(22) Filed: Feb. 10, 2023

(65) Prior Publication Data

US 2023/0224395 A1    Jul. 13, 2023

Related U.S. Application Data

(63) Continuation of application No. PCT/KR2023/000687, filed on Jan. 13, 2023.

(30) Foreign Application Priority Data

Jan. 13, 2022  (KR) .................. 10-2022-0005314
Mar. 21, 2022  (KR) .................. 10-2022-0034767

(51) Int. Cl.
*H04M 1/02*    (2006.01)
*H01Q 1/24*    (2006.01)

(52) U.S. Cl.
CPC .......... *H04M 1/0277* (2013.01); *H01Q 1/243* (2013.01); *H04M 1/0216* (2013.01); *H04M 1/0268* (2013.01); *H04M 2201/08* (2013.01)

(58) Field of Classification Search
CPC ............ H04M 1/0277; H04M 1/0216; H04M 1/0268; H04M 2201/08; H01Q 1/243
See application file for complete search history.

(56) References Cited

U.S. PATENT DOCUMENTS 5,870,065 A * 2/1999 Kanba .................. H01Q 1/38
                                                      343/873
10,230,826 B1   3/2019 Liu et al.
(Continued)

FOREIGN PATENT DOCUMENTS

CN      111510534 A    8/2020
CN      213072751 U    4/2021
(Continued)

OTHER PUBLICATIONS

International Search Report dated May 4, 2023, issued in International Application No. PCT/KR2023/000687.
(Continued)

*Primary Examiner* — Lewis G West
(74) *Attorney, Agent, or Firm* — Jefferson IP Law, LLP

(57) ABSTRACT

An electronic device is provided. The electronic device includes a housing including a first housing and a second housing connected to the first housing by a hinge structure to be rotatable around a first axis, a magnet structure disposed inside the housing, the magnet structure including a magnet and a conductive coating member for enclosing a surface of the magnet, and a wireless communication circuit electrically connected to the conductive coating member, wherein the magnet is disposed to maintain a folding state in which the first housing and the second housing are folded, and the wireless communication circuit is configured to feed a portion of the conductive coating member of the magnet structure to transmit and/or receive a signal in a designated
(Continued)

first frequency band by using at least one of the conductive coating member as a first antenna radiator.

20 Claims, 32 Drawing Sheets

(56) References Cited

U.S. PATENT DOCUMENTS

| | | | |
|---|---|---|---|
| 10,479,050 B2 | 11/2019 | Kim et al. | |
| 11,063,361 B2 | 7/2021 | Suzuki et al. | |
| 11,510,328 B2 | 11/2022 | Kim | |
| 11,616,865 B2 | 3/2023 | Jeong et al. | |
| 2007/0052600 A1* | 3/2007 | Kamitani | G06K 19/0723 |
| | | | 343/788 |
| 2007/0080866 A1* | 4/2007 | Hayakawa | H01Q 9/0442 |
| | | | 343/700 MS |
| 2008/0129608 A1* | 6/2008 | Amano | H01Q 17/00 |
| | | | 343/702 |
| 2010/0079967 A1 | 4/2010 | Hiraoka | |
| 2011/0018777 A1 | 1/2011 | Brown | |
| 2011/0260942 A1* | 10/2011 | Hashizume | H01Q 1/243 |
| | | | 343/853 |
| 2013/0002517 A1 | 1/2013 | Pascolini et al. | |
| 2013/0207659 A1* | 8/2013 | Ham | G01R 33/422 |
| | | | 324/322 |
| 2016/0134730 A1* | 5/2016 | Lee | H04M 1/7246 |
| | | | 455/552.1 |
| 2020/0267861 A1 | 8/2020 | Kim | |
| 2023/0224395 A1* | 7/2023 | Son | H01Q 9/42 |
| | | | 455/575.3 |

FOREIGN PATENT DOCUMENTS

| | | |
|---|---|---|
| KR | 10-2017-0111972 A | 10/2017 |
| KR | 10-2017-0135633 A | 12/2017 |
| KR | 10-2019-0087270 A | 7/2019 |
| KR | 10-2020-0024500 A | 3/2020 |
| KR | 10-2020-0038535 A | 4/2020 |
| KR | 10-2020-0101791 A | 8/2020 |
| KR | 10-2289272 B1 | 8/2021 |
| WO | 2021/162290 A | 8/2021 |

OTHER PUBLICATIONS

Extended European Search Report dated Feb. 17, 2025; European Appln. No. 23740514.7-1201 / 4429022 PCT/KR2023000687.

* cited by examiner

ELECTRONIC DEVICE COMPRISING ANTENNA

CROSS-REFERENCE TO RELATED APPLICATION(S)

This application is a continuation application, claiming priority under § 365(c), of an International application No. PCT/KR2023/000687, filed on Jan. 13, 2023, which is based on and claims the benefit of a Korean patent application number 10-2022-0005314, filed on Jan. 13, 2022, in the Korean Intellectual Property Office, and of a Korean application number 10-2022-0034767, filed on Mar. 21, 2022, in the Korean Intellectual Property Office, the disclosure of each of which is incorporated by reference herein in its entirety.

TECHNICAL FIELD

The disclosure relates to an electronic device including an antenna.

BACKGROUND ART

Electronic devices including various types of displays have been developed to satisfy device portability and convenience for users. For example, an electronic device may include a foldable display. An electronic device (hereinafter, a foldable electronic device) including a foldable display may provide a display having a reduced size by folding a housing and the display. By reducing the size of the display, the electronic device may provide portability to a user.

Furthermore, the foldable electronic device may include multiple magnets for maintaining a folding state. For example, in a state in which the foldable electronic device is folded, magnets arranged at an edge of respective housings are adjacent to each other and the attractive force of the magnets may thus maintain the foldable electronic device in the folded state.

Furthermore, the electronic device may include antenna modules for supporting wireless communication service in various frequency bands, for example, third generation (3G), fourth generation (4G), fifth generation (5G) services or the like. A processor (e.g., a communication processor (CP)) of the electronic device may perform communication with a base station and determine a communication method used by the electronic device. For example, a wireless communication circuit of the electronic device may perform communication with a base station by using 3G/4G communication methods or a 5G communication method.

The above information is presented as background information only to assist with an understanding of the disclosure. No determination has been made, and no assertion is made, as to whether any of the above might be applicable as prior art with regard to the disclosure.

DISCLOSURE

Technical Problem

Multiple magnets may be arranged on an area adjacent to an edge of a housing to secure durability of a folding structure of a foldable electronic device. The multiple magnets arranged adjacent to the edge of the housing may relatively reduce an effective volume of an antenna.

Furthermore, the antenna may be disposed spaced apart from the multiple magnets in order to improve performance of the antenna of the electronic device, but the size of the foldable electronic device may increase due to the multiple magnets arranged spaced apart from the antenna.

Aspects of the disclosure are to address at least the above-mentioned problems and/or disadvantages and to provide at least the advantages described below. Accordingly, an aspect of the disclosure is to provide an electronic device which may secure an effective volume of an antenna while including magnets.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes a housing including a first housing and a second housing, the second housing being connected to the first housing by a hinge structure to be rotatable around a first axis, a magnet structure disposed inside the housing, the magnet structure including a magnet and a conductive coating member for enclosing a surface of the magnet, and a wireless communication circuit electrically connected to the conductive coating member, wherein the magnet is disposed to maintain a folding state in which the first housing and the second housing are folded, and the wireless communication circuit feeds a portion of the conductive coating member of the magnet structure to transmit and/or receive a signal in a designated first frequency band by using the conductive coating member as an antenna radiator.

In accordance with another aspect of the disclosure, an electronic device is provided. The electronic device includes a housing including a first housing and a second housing, the second housing being connected to the first housing by a hinge structure to be rotatable around a first axis, a portion of an edge of the first housing including a conductive part, a magnet structure disposed inside the housing and disposed on an area adjacent to the conductive part of the edge of the first housing, the magnet structure including a magnet and a conductive coating member for enclosing a surface of the magnet, and a wireless communication circuit disposed on a printed circuit board (PCB) and electrically connected to the conductive coating member, wherein the magnet is disposed to maintain a folding state in which the first housing and the second housing are folded, a portion of the conductive coating member of the magnet structure is electrically connected to the conductive part of the edge of the first housing, another portion thereof is electrically connected to a ground of the PCB, and the wireless communication circuit feeds a portion of the conductive part to transmit and/or receive a signal in a designated fourth frequency band based on a second electrical path including the conductive part and the conductive coating member electrically connected to the ground.

In accordance with another aspect of the disclosure, an electronic device is provided. The electronic device includes a housing including a first housing and a second housing, the second housing being connected to the first housing by a hinge structure to be rotatable around a first axis, a portion of an edge of the first housing including a conductive part, a magnet structure disposed on an area adjacent to the conductive part of the edge of the first housing and disposed inside the housing, the magnet structure including a magnet and a conductive coating member for enclosing a surface of the magnet, and a wireless communication circuit disposed on a printed circuit board (PCB) and electrically connected to the conductive coating member, wherein the magnet is disposed to maintain a folding state in which the first housing and the second housing are folded, both ends of the conductive part of a first edge of the first housing are electrically connected to the PCB, the magnet structure is electrically connected to the a portion of the conductive part of the first edge of the first housing, and the wireless communication circuit feeds the conductive part of the first housing to transmit and/or receive a signal in a designated fifth frequency band based on a third electrical path including the conductive part and the conductive coating member electrically connected to the conductive part.

Advantageous Effects

According to various embodiments disclosed herein, an electronic device may provide an antenna capable of securing an effective volume while using at least one magnet.

Furthermore, according to various embodiments, an electronic device may provide an antenna module with secured antenna performance while reducing the size of the electronic device.

In addition, various effects directly or indirectly identified through the disclosure may be provided.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

MODE FOR INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
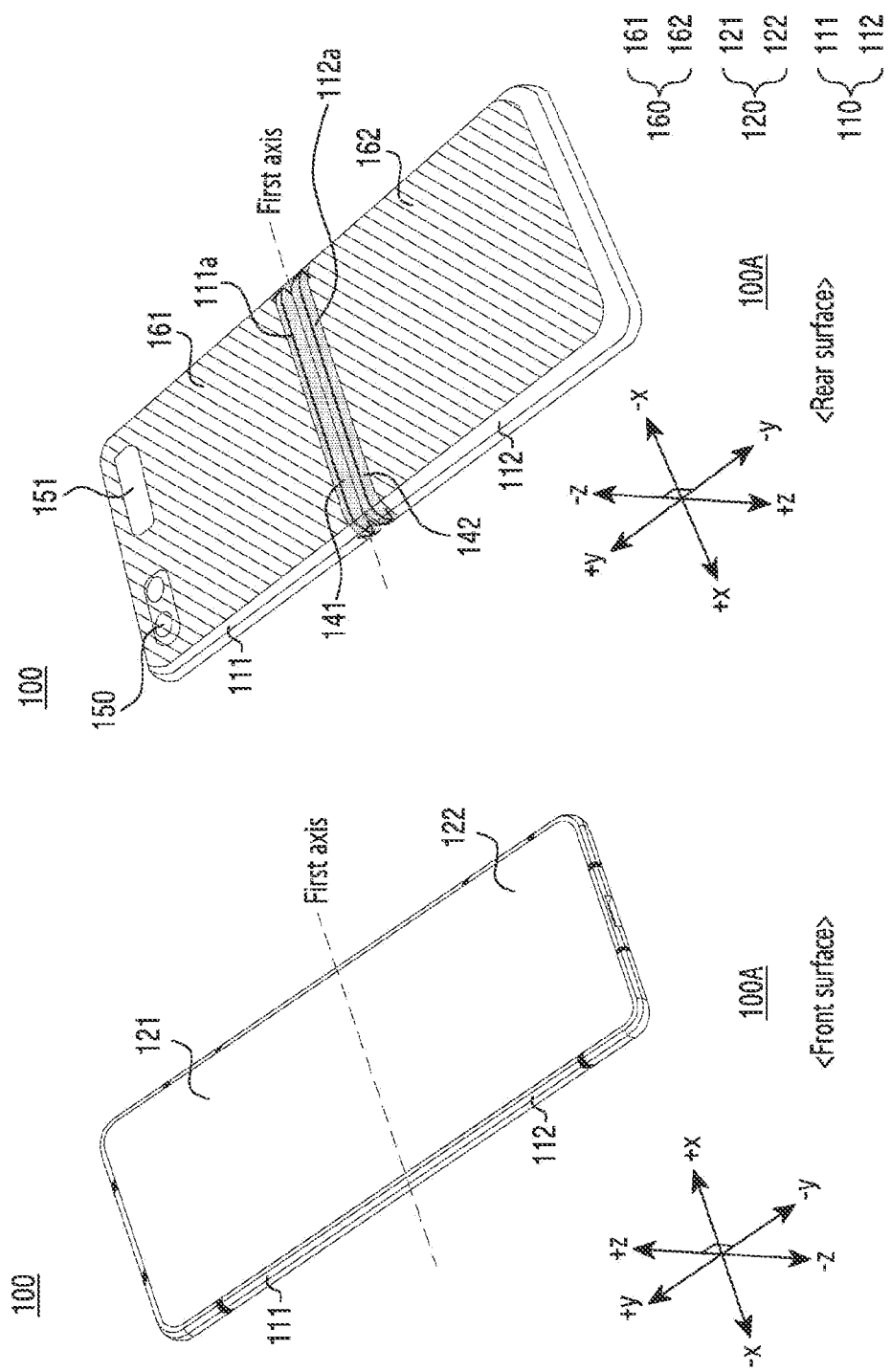
FIG. 1 illustrates a front surface and a rear surface of an electronic device in an unfolded state according to an embodiment of the disclosure.

FIG. 1 illustrates a front surface and a rear surface of an electronic device in an unfolded state according to an embodiment of the disclosure.

Referring to FIG. 1, an electronic device 100 according to an embodiment may include a housing 110 and a flexible display 120 disposed in the housing 110. In the disclosure, a surface on which the flexible display 120 is disposed is defined as a front surface of the electronic device 100. The surface opposite to the front surface is defined as a rear surface of the electronic device 100. The surface surrounding a space between the front surface and the rear surface is defined as a lateral surface of the electronic device 100.

In an embodiment, the housing 110 may include a first housing 111 and a second housing 112. The first housing 111 and the second housing 112 may form at least a portion of the front surface, at least a portion of the rear surface, and at least a portion of the lateral surface of the electronic device 100.

According to an embodiment, the flexible display 120 may be disposed on at least a portion of the front surface of the first housing 111 and the second housing 112.

According to an embodiment, the front surface of the first housing 111 and the second housing 112 may include a rear cover 160 forming the rear surface of the electronic device 100. For example, the first housing 111 may include a first rear cover 161 and the second housing 112 may include a second rear cover 162.

In an embodiment, the first rear cover 161 of the first housing 111 and the second rear cover 162 of the second housing 112 may form at least a portion of the rear surface of the electronic device 100.

In an embodiment, it is described that the rear cover 160 is included in the housing 110 of the electronic device 100, but in another embodiment, the rear cover 160 may be formed as a component separate from the housing 110.

In an embodiment, the rear cover 160 may include an insulative material (e.g., a plastic resin). In another embodiment, the rear cover 160 may include conductive material (e.g., aluminum).

According to an embodiment, the first housing 111 and the second housing 112 may be arranged on opposite sides around a folding axis (e.g., a first axis) parallel with the x-axis and have generally symmetric shapes with respect to the folding axis (e.g., the first axis). However, it is not limited to the symmetric shapes, and the first housing 111 and the second housing 112 may have asymmetric shapes with respect to the folding axis (e.g., the first axis).

Figure 2:
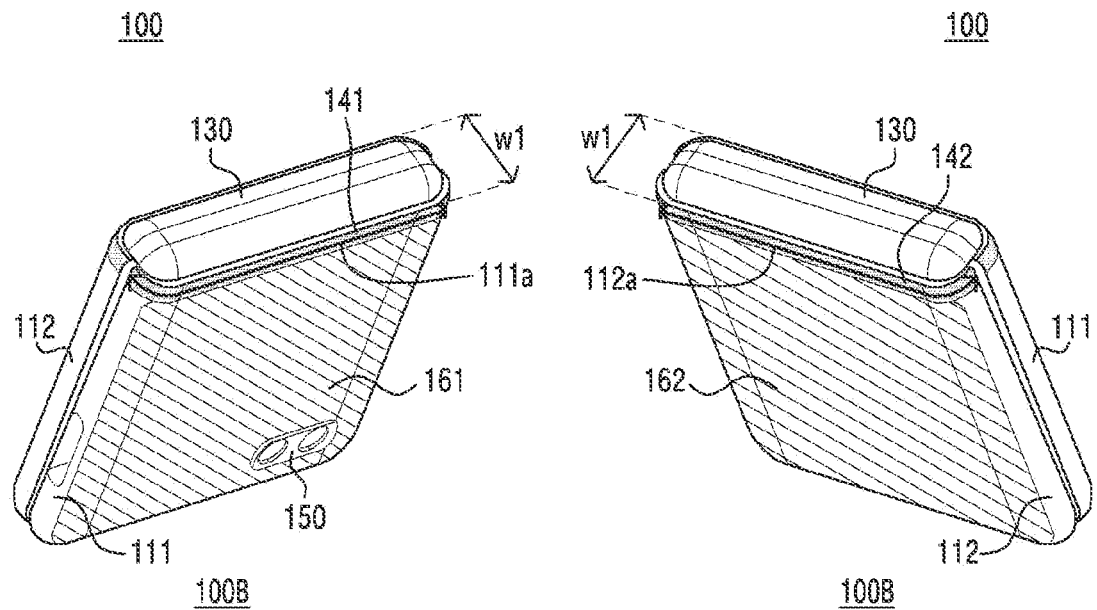
FIG. 2 illustrates a perspective view of an electronic device in a folded state according to an embodiment of the disclosure.

According to an embodiment, the electronic device 100 may have an unfolded state 100A, a folded state 100B, and/or an intermediate state. In an embodiment, the state of the electronic device 100 may be changed according to an angle or a distance between the housing 111 and the second housing 112. For example, a state in which the first housing 111 and the second housing 112 are arranged to have an angle of 180 degrees therebetween may be the unfolded state 100A. For another example, a state in which the first housing 111 and the second housing 112 are arranged to face each other may be the folded state 100B or a folding state 100B. The folded state 100B of the electronic device 100 is illustrated in FIG. 2.

For another example, a state in which the first housing 111 and the second housing 112 are arranged to have a certain angle therebetween may be the intermediate state. However, a specific angle between the first housing 111 and the second housing 112 in the folded state and the unfolded state is merely for convenience of explanation, without limitation thereto.

In an embodiment, the first housing 111 may include a first edge 111a adjacent to the folding axis (e.g., the first axis) and substantially parallel with the folding axis, and the second housing 112 may include a second edge 112a adjacent to the folding axis (e.g., the first axis) and substantially parallel with the folding axis. In an embodiment, in case that the electronic device 100 is in the unfolded state, the first edge 111a of the first housing 111 may be brought in contact with or spaced a predetermined distance apart from the second edge 112a of the second housing 112.

In an embodiment, the first housing 111 and/or the second housing 112 may include a conductive part (e.g., a metal).

According to an embodiment, the first housing 111 may include a first conductive part 141. In an embodiment, the first conductive part 141 may be formed to correspond to the first edge 111a of the first housing 111. For example, the first conductive part 141 may be formed along the first edge 111a of the first housing 111.

According to an embodiment, the second housing 112 may include a second conductive part 142. In an embodiment, the second conductive part 142 may be formed to correspond to the second edge 112a of the second housing 112. For example, the second conductive part 142 may be formed along the second edge 112a of the second housing 112.

In an embodiment, in case that the electronic device 100 is in the unfolded state, the first conductive part 141 and the second conductive part 142 may be brought in contact with each other or spaced a predetermined distance apart from each other.

However, the first conductive part 141 and the second conductive part 142 shown in FIG. 1 are described for convenience of explanation and the first conductive part 141 and the second conductive part 142 may have various sizes and shapes.

In an embodiment, at least a portion of the first housing 111 and the second housing 112 may be formed of a metal material (e.g., aluminum) or non-metal material having a selected magnitude of strength for supporting the flexible display 120.

In an embodiment, the housing 110 and the flexible display 120 may form an internal space in which various components (for example, a printed circuit board or a battery) of the electronic device 100 may be arranged. For example, the internal space of the electronic device 100 may be formed by the flexible display 120, a lateral member of the housing 110, and the rear cover 160.

According to an embodiment, the flexible display 120 may be disposed in the housing 110. For example, the flexible display 120 may be seated in a recess formed by the housing 110 and form most of the front surface of the electronic device 100. In an embodiment, the flexible display 120 may include a first area 121 and a second area 122.

The first area 121 and the second area 122 of the flexible display 120 may be divided around the first axis on which the electronic device 100 is folded or unfolded. The division of areas of the flexible display 120 shown in FIG. 1 is in another embodiment, the flexible display 120 may be divided into two or more areas according to the structure or function thereof. For example, the flexible display 120 may be divided into a folding area having a predetermined curvature when the electronic device 100 is folded about the folding axis (e.g., the first axis), the first area 121 positioned at the first housing 111 with reference to the folding area, and the second area 122 positioned at the second housing 112. The first area 121 and the second area 122 may have overall symmetrical shapes around the folding axis (e.g., the first axis).

According to an embodiment, the arrangement structure of the first area 121 and the second area 122 of the flexible display 120 may be changed according to the state of the electronic device 100. For example, in case that the electronic device 100 is in the unfolded state, the first area 121 and the second area 122 of the flexible display 120 may face the same direction (e.g., the −y direction) while forming an angle of 180 degrees therebetween.

For example, in case that the electronic device 100 is in the folded state, the first area 121 and the second area 122 of the flexible display 120 may face each other while forming a narrow angle (e.g., between 0 degrees and 10 degrees) therebetween. For another example, in case that the electronic device 100 is in the intermediate state, the first area 121 and the second area 122 of the flexible display 120 may form an angle larger than that of the folded state and smaller than that of the unfolded state. Here, at least a portion of the flexible display 120 may be formed of a curved surface having a certain curvature, and the curvature thereof may be smaller than that of the folded state.

However, a specific angle between the first housing 111 and the second housing 112 in the above-described folded state and unfolded state is merely for convenience of explanation, without limitation thereto.

According to an embodiment, the electronic device 100 may include a camera hole 150 and/or a sub display 151.

In an embodiment, the camera hole 150 may correspond to a hole through which at least one lens of the camera module (not shown) is exposed. External light of the electronic device 100 may be incident to the camera module disposed inside the electronic device 100 through the camera hole 150. In an embodiment, the camera hole 150 may be disposed parallel with the first axis (e.g., the x-axis). For example, the camera hole may be disposed adjacent to an edge opposite to the first edge 111a of the first housing 111. However, the disposition of the camera hole 150 is not limited thereto. In another embodiment, the camera hole 150 may be disposed parallel with a second axis (e.g., the y-axis) perpendicular to the first axis. For example, the camera hole may be disposed along an edge perpendicular to the first edge 111a of the first housing 111.

In an embodiment, the sub display 151 may display a designated object (e.g., a current time or remained battery power of the electronic device 100). In an embodiment, the sub display 151 may be turned off in the unfolded state and turned on in the folded state. For another example, the sub display 151 may be turned on regardless of the state. According to an embodiment, the size of the sub display 151 is not limited to the size shown in FIG. 1. For example, in case that the camera hole 150 is disposed parallel with the second axis, the sub display 151 may be formed to have a length corresponding to the camera module disposed parallel with the second axis.

FIG. 2 illustrates a perspective view of an electronic device in a folded state according to an embodiment of the disclosure.

Referring to FIG. 2, the electronic device 100 according to an embodiment may include a hinge cover 130. For example, the hinge cover 130 may be disposed between the first housing 111 and the second housing 112 and configured to cover an internal component (for example, a hinge structure).

In an embodiment, at least a portion of the hinge cover 130 may be covered or exposed through a portion of the first housing 111 and the second housing 112 according to a state of the electronic device 100. For example, in case that the electronic device 100 is in the unfolded state, the hinge cover 130 may be covered by the first housing 111 and the second housing 112 so as not to be exposed. For another example, in case that the electronic device 100 is in the folded state, the hinge cover 130 may be exposed by a first width w1 between the first housing 111 and the second housing 112. For another example, when in the intermediate state in which the first housing 111 and the second housing 112 are folded with a certain angle, the hinge cover 130 may be partially exposed outside between the first housing 111 and the second housing 112. The width of an exposed part of the hinge cover 130 in the intermediate state may be smaller than the width (e.g., the first width w1) of an exposed part in the folded state. In an embodiment, the hinge cover 130 may include a curved surface. In an embodiment, the hinge cover 130 may include conductive material (e.g., aluminum).

In an embodiment, although, an internal structure between the hinge cover 130 and the first conductive part 141 is not described in the drawing, actually, the first conductive part 141 may be spaced a predetermined distance apart from the hinge cover 130. For another example, the second conductive part 142 may be actually spaced a predetermined distance apart from the hinge cover 130.

Figure 3:
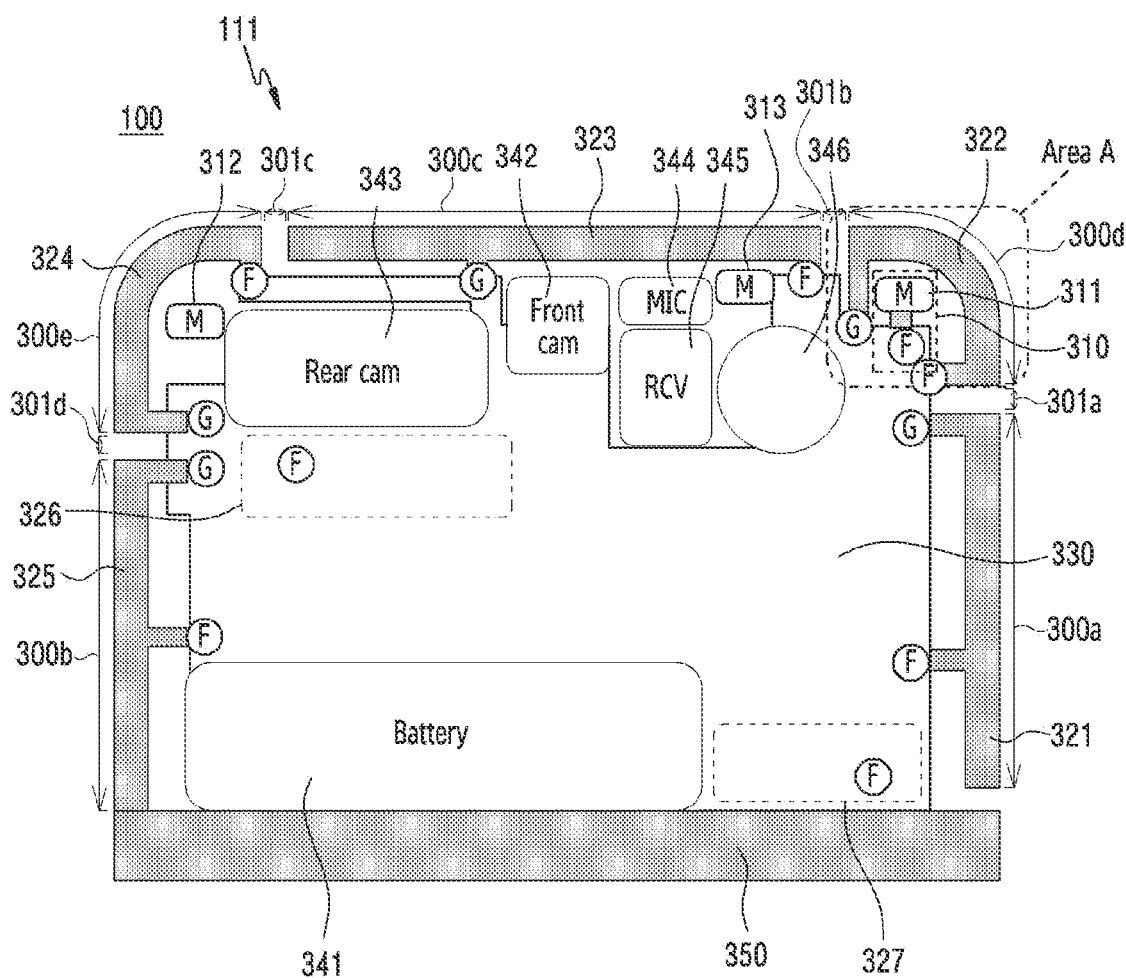
FIG. 3 illustrates the inside of a first housing according to an embodiment of the disclosure.

FIG. 3 illustrates the inside of a first housing according to an embodiment of the disclosure.

Referring to FIG. 3 according to an embodiment, the electronic device 100 may include a hinge structure 350, a magnet 310, multiple antenna radiators 320, a PCB 330, and/or a wireless communication circuit (not shown).

According to an embodiment, the electronic device 100 may further include a battery 341, a front camera module 342, a rear camera module 343, a microphone module 344, a receiver (RCV) 345, and/or a vibration motor sensor 346, without limitation thereto. For example, the electronic device 100 may further include a speaker module (not shown).

In an embodiment, the battery 341, the front camera module 342, the rear camera module 343, the microphone module 344, the receiver 345, and/or the vibration motor sensor 346 may be arranged in the first housing 111 of the electronic device 100. For another example, a second battery (not shown) may be disposed in the second housing 112 of the electronic device 100.

According to an embodiment, the hinge structure 350 may physically connect the first housing 111 and the second housing 112. In an embodiment, the hinge structure 350 may physically connect the first housing 111 and the second housing 112 to be rotatable. For example, the first housing 111 and the second housing 112 may be connected to each other by the hinge structure 350 to be rotatable around the first axis.

According to an embodiment, the first housing 111 may include a first edge 300a, a second edge 300b opposite to the first edge, a third edge 300c opposite to the hinge structure 350, a fourth edge 300d connecting the first edge 300a and the third edge 300c, and/or a fifth edge 300e connecting the second edge 300b and the third edge 300c.

According to an embodiment, a portion of the edges of the first housing 111 may include a conductive part and a non-conductive part.

According to an embodiment, the first edge 300a, the second edge 300b, the third edge 300c, the fourth edge 300d, and the fifth edge 300e may be formed of conductive parts. For example, the first edge 300a, the second edge 300b, the third edge 300c, the fourth edge 300d, and the fifth edge 300e may be formed of a metal material.

In an embodiment, a first boundary part 301a where the first edge 300a and the fourth edge 300d meet, a second boundary part 301b where the fourth edge 300d and the third edge 300c meet, a third boundary part 301c where the third edge 300c and the fifth edge 300e meet, and a fourth boundary part 301d where the fifth edge 300e and the second edge 300b meet may be formed of non-conductive parts. In an embodiment, the first boundary part 301a, the second boundary part 301b, the third boundary part 301c, and the fourth boundary part 301d may be formed of segmental parts. For another example, the first boundary part 301a, the second boundary part 301b, the third boundary part 301c, and the fourth boundary part 301d may be formed of a dielectric material.

According to an embodiment, the electronic device 100 may use the conductive part formed a portion of the edge of the first housing 111 as an antenna radiator.

According to an embodiment, the PCB 330 may be disposed inside the electronic device 100 and the wireless communication circuit may be disposed on the PCB 330. In an embodiment, the wireless communication circuit disposed on the PCB 330 may be electrically connected to the multiple antenna radiators 320 using a portion of the edge of the first housing 111 to transmit and/or receive a signal in a designated frequency band.

According to various embodiments, the electronic device 100 may include multiple antenna radiators 320. For example, the multiple antenna radiators 320 may include a first antenna radiator 321, a second antenna radiator 322, a third antenna radiator 323, a fourth antenna radiator 324, or a fifth antenna radiator 325.

According to an embodiment, the multiple antenna radiators 320 may transmit and/or receive a signal in a low band (LB) (e.g., within about 600 MHz to about 1,000 MHz), in a middle band (MB) (e.g., within about 1,500 MHz to about 2,200 MHz), in a high band (HB) (e.g., within about 1,900 MHz to about 2,400 MHz), and/or in a new radio (NR) band.

According to an embodiment, the NR band may include n77 band (e.g., within about 3,300 MHz to about 4,200 MHz) and n78 band (e.g., within about 3,300 to about 3,800 MHz).

According to an embodiment, the multiple antenna radiators 320 may be formed on the first edge 300a, the second edge 300b, the third edge 300c, the fourth edge 300d, and the fifth edge 300e in which conductive parts are formed.

According to an embodiment, the first antenna radiator 321 may be formed on the first edge 300a. In an embodiment, the wireless communication circuit may feed the first antenna radiator 321 formed on the first edge 300a to transmit and/or receive a signal in a designated frequency band by using the first antenna radiator 321. For example, the wireless communication circuit may transmit and/or receive a signal in the LB band, the MB band, the HB band, and/or the NR band by using the first antenna radiator 321 including a switch and a matching circuit.

According to an embodiment, the second antenna radiator 322 may be formed on the fourth edge 300d. In an embodiment, the wireless communication circuit may feed a portion of the fourth edge 300d to transmit and/or receive a signal in a designated frequency band by using the fourth edge 300d as the second antenna radiator 322. For example, the wireless communication circuit may transmit and/or receive a signal in the MB band or the NR band by using the second antenna radiator 322.

According to an embodiment, the third antenna radiator 323 may be formed on the third edge 300c. In an embodiment, the wireless communication circuit may feed a portion of the third edge 300c to transmit and/or receive a signal in a designated frequency band by using the third edge 300c as the third antenna radiator 323. For example, the wireless communication circuit may transmit and/or receive a signal in the LB band, the MB band, and/or the HB band by using the third antenna radiator 323.

According to an embodiment, the fourth antenna radiator 324 may be formed on the fifth edge 300e. In an embodiment, the wireless communication circuit may feed a portion of the fifth edge 300e to transmit and/or receive a signal in a designated frequency band by using the fifth edge 300e as the fourth antenna radiator 324. For example, the wireless communication circuit may transmit and/or receive a signal of a global positioning system (GPS) (e.g., about 1.5 gigahertz (GHz)), 2.5G wireless fidelity (Wi-Fi) (e.g., within about 2.4 GHz to about 2.6 GHz), and 5G Wi-Fi (e.g., about 5 GHz) by using the fourth antenna radiator 324.

According to an embodiment, the fifth antenna radiator 325 may be formed on the second edge 300b. In an embodiment, the wireless communication circuit may feed a portion of the second edge 300b to transmit and/or receive a signal in a designated frequency band by using the second edge 300b as the fifth antenna radiator 325. For example, the wireless communication circuit may transmit and/or receive a signal in the NR band (e.g., the n77 band or the n78 band) by using the second edge 300b as the fifth antenna radiator 325.

The signal transmitted to and/or received from each of the antenna radiators is exemplary without limitation thereto. For example, the wireless communication circuit may transmit and/or receive a signal of a GPS (e.g., 1.5 GHz), Wi-Fi 2.4G, and Wi-Fi 5G by using the fourth edge 300d as the second antenna radiator 322.

The antenna radiator 320 included in the electronic device 100 has been described by taking the first antenna radiator 321 to the fifth antenna radiator 325 as examples, but is not limited thereto. For example, the electronic device 100 may further include a sixth antenna radiator 326 and a seventh antenna radiator 327 disposed inside the electronic device 100.

According to an embodiment, the sixth antenna radiator 326 may be disposed on one area of the PCB 330 adjacent to the rear camera module 343 and the second edge 300b. In an embodiment, the sixth antenna radiator 326 may transmit and/or receive a signal in a designated frequency band. For example, the sixth antenna radiator 326 may transmit and/or receive a Wi-Fi 5G signal.

According to an embodiment, the seventh antenna radiator 327 may be disposed on the PCB 330 adjacent to the hinge structure 350 between the battery 341 and the first edge 300a. In an embodiment, the seventh antenna radiator 327 may transmit and/or receive a signal in a designated frequency band. For example, the seventh antenna radiator 327 may transmit and/or receive a Wi-Fi 2.4G signal.

According to an embodiment, the electronic device 100 may include the magnet 310 for maintaining a folding state (e.g., the folded state 100B in FIG. 2) of the electronic device 100. For example, the electronic device 100 may include a first magnet 311 and/or a second magnet 312. For another example, the electronic device 100 may include only the first magnet 311. For another example, the electronic device 100 may include the first magnet 311, the second magnet 312, and/or a third magnet 313.

According to an embodiment, the magnet 310 may be disposed at one area inside the electronic device 100. In an embodiment, the magnet 310 may be disposed at one area inside the electronic device 100 adjacent to the edge of the first housing 111. For example, the first magnet 311 of the magnet 310 may be disposed to be surrounded by the conductive part of the fourth edge 300d. For example, the second magnet 312 of the magnet 310 may be disposed to be surrounded by the conductive part of the fifth edge 300e.

For another example, the third magnet 313 of the magnet 310 may be disposed adjacent to the third edge 300c and on one area of the electronic device 100 adjacent to the microphone module 344 and the vibration motor sensor 346.

According to an embodiment, the magnet 310 may be disposed to maintain the folding state (e.g., the folded state 100B in FIG. 2) in which the first housing 111 and the second housing 112 are folded. For example, in case that the edge of the first housing 111 comes in contact with an edge (not shown) of the second housing 112 in the folding state 100B, the first magnet 311 disposed adjacent to the edge of the first housing 111 may be attached to a fourth magnet (not shown) disposed adjacent to the edge of the second housing 112 by attractive force between the magnets. For example, the second magnet 312 distinguished from the first magnet 311 disposed adjacent to the edge of the first housing 111 may be attached to a fifth magnet (not shown) distinguished from a third magnet (not shown) disposed adjacent to the edge of the second housing 112 by attractive force between the magnets.

For example, the attractive force between the magnets 310 disposed on the edge of each housing 110 may maintain a state in which the edge of the first housing 111 and the edge of the second housing 112 are adjacent to each other.

According to an embodiment, the edge of the first housing 111 and the edge of the second housing 112 are attached to each other by the magnet 310 and thus the electronic device 100 may maintain the folding state 100B before force larger than or equal to the magnetic force is applied from the outside to unfold the electronic device 100.

As the folding state 100B is maintained by the magnet 310, the electronic device 100 may provide a portable electronic device to a user.

According to an embodiment, the electronic device 100 may use a magnet structure including at least one of the magnet 310 as an antenna radiator. For example, the electronic device 100 may use a magnet structure (e.g., the magnet structure 410 in FIG. 4) including the first magnet 311 as an antenna radiator.

According to an embodiment, specific embodiments related to the magnet structure 410 used as an antenna radiator will be described in detail with reference to FIGS. 4 to 24.

Figure 4:
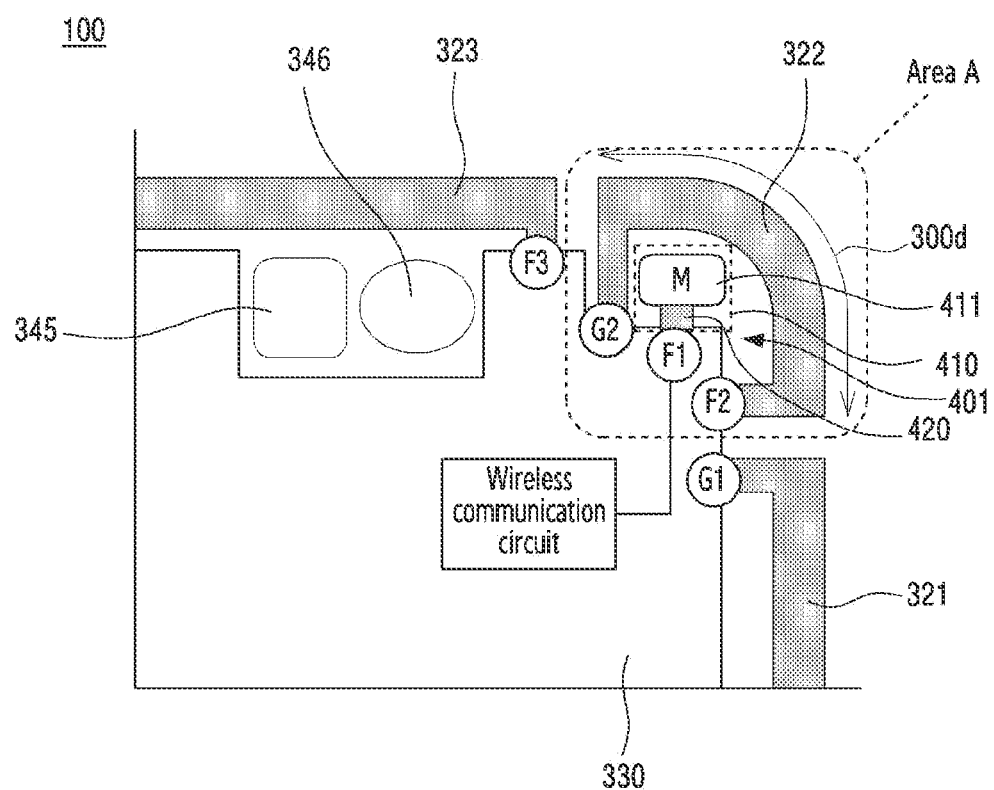
FIG. 4 illustrates a magnet structure according to an embodiment of the disclosure.

FIG. 4 illustrates a magnet structure according to an embodiment of the disclosure.

According to various embodiments, the electronic device 100 may include multiple antenna radiators 320 and the magnet structure 410.

According to an embodiment, the electronic device 100 may use at least a portion of the magnet structure 410 as an antenna radiator. According to an embodiment, the wireless communication circuit of the electronic device 100 may transmit and/or receive a signal in a designated frequency band by using a conductive coating member (e.g., the conductive coating member 412 in FIG. 5) of the magnet structure 410.

Referring to FIG. 4, the magnet structure 410 may include at least one magnet of the magnet 310 and a conductive coating member 412 enclosing a surface of the at least one magnet. For example, the magnet structure 410 may include a first magnet 311 and the conductive coating member 412 enclosing a surface of the first magnet 311. According to an embodiment, the magnet structure 410 may be disposed inside the electronic device 100. For example, the magnet structure 410 may be disposed on an area adjacent to the conductive part of the fourth edge 300d of the first housing 111. In an embodiment, the magnet structure 410 may be formed to be surrounded by the conductive part of the fourth edge 300d. For example, the magnet structure 410 may be disposed in the internal space between the PCB 330 and the conductive part of the fourth edge 300d.

According to an embodiment, it is described that the magnet structure 410 is disposed on an area adjacent to the fourth edge 300d of the first housing 111, but is not limited thereto. For example, the magnet structure 410 may be disposed on an area adjacent to the fifth edge 300e of the first housing 111.

According to an embodiment, the magnet structure 410 may include the magnet 411 (e.g., the magnet 310 and/or the first magnet 311 in FIG. 3) and the conductive coating member (e.g., the conductive coating member 412 in FIG. 5) applied on a surface of the magnet 411.

In an embodiment, the conductive coating member 412 may be formed to enclose the surface of the magnet 411.

In an embodiment, the magnet 411 may refer to the magnet 310 in FIG. 3.

According to an embodiment, it is described that the magnet structure 410 includes one magnet 411, but is not limited thereto. According to an embodiment, the magnet structure 410 may include multiple magnets. For example, the magnet structure 410 may include the first magnet 311, a conductive coating member applied on the first magnet 311, the second magnet 312, and a conductive coating member applied on the second magnet 312 in FIG. 3.

According to an embodiment, the magnet structure 410 may be electrically connected to the wireless communication circuit disposed on the PCB 330. For example, a portion of the conductive coating member 412 of the magnet structure 410 may extend to the PCB 330 and thus the conductive coating member 412 of the magnet structure 410 may be electrically connected to the wireless communication circuit. For another example, the conductive coating member 412 of the magnet structure 410 may be electrically connected to the wireless communication circuit on the PCB 330 by conductive connection (e.g., a c-clip).

According to an embodiment, the electronic device 100 may use a structure (not shown) disposed inside the electronic device 100 as an antenna radiator. By way of example, the electronic device 100 may use at least a portion of the magnet structure 410 as an antenna radiator.

According to an embodiment, the wireless communication circuit may transmit and/or receive a signal in a designated frequency band by using the magnet structure 410 of the first housing 111 as an antenna radiator. For example, the wireless communication circuit may transmit and/or receive a signal in a designated frequency band by using the magnet structure 410 adjacent to the conductive part of the fourth edge 300*d* of the first housing 111 as an antenna radiator.

According to an embodiment, the magnet structure 410 is described by taking the magnet structure 410 disposed adjacent to the fourth edge 300*d* of the first housing 111 as an example, but is not limited thereto. For another example, the wireless communication circuit may use the magnet structure 410 disposed inside the electronic device 100 spaced apart from a fifth edge (e.g., the fifth edge 300*e* in FIG. 3) of the first housing 111 as an antenna radiator.

In an embodiment, the wireless communication circuit may feed the conductive coating member 412 of the magnet structure 410 to use the conductive coating member 412 of the magnet structure 410 as an antenna radiator. For example, the wireless communication circuit may feed a portion of the conductive coating member 412 through a first feeding point F1 so as to transmit and/or receive a signal in a designated first frequency band by using the conductive coating member 412 as a first antenna radiator.

According to an embodiment, a portion of the conductive coating member 412 of the magnet structure 410 may be electrically connected to the wireless communication circuit through the first feeding point F1. For example, the first feeding point F1 in FIG. 4 may be a point at which the wireless communication circuit feeds a portion of the conductive coating member 412 of the magnet structure 410.

According to an embodiment, the first frequency band may include a signal in a sub 6 GHz band. For example, the designated first frequency band may include a signal in n77 (e.g., within about 3,300 MHz to about 4,200 MHz), but is not limited thereto. For another example, the designated first frequency band may include a signal in n78 (e.g., within about 3,300 MHz to about 3,800 MHz).

According to an embodiment, the electronic device 100 may use a portion of the fourth edge 300*d* of the housing 110 as an antenna radiator different from the antenna radiator of the magnet structure 410.

According to an embodiment, a portion of the fourth edge 300*d* may be electrically connected to the wireless communication circuit disposed on PCB 330. For example, a portion of the fourth edge 300*d* may be electrically connected to the wireless communication circuit via a second feeding point F2, and another portion of the fourth edge 300*d* may be electrically connected to the PCB 330 via a second ground point G2.

According to an embodiment, the second feeding point F2 may be a point at which the wireless communication circuit and a portion of the fourth edge 300*d* are electrically connected to each other. For example, the second feeding point F2 may be a point at which the wireless communication circuit feeds a portion of the conductive coating member of the fourth edge 300*d*.

According to an embodiment, the second ground point G2 may be a point at which the ground on the PCB 330 and another portion of the fourth edge 300*d* are electrically connected to each other.

According to an embodiment, the wireless communication circuit may use the conductive part of the fourth edge 300*d* as the second antenna radiator 322 by feeding the conductive part of the fourth edge 300*d*. For example, the wireless communication circuit may feed a portion of conductive part of the fourth edge 300*d* via the second feeding point F2 to transmit and/or receive a signal in the designated MB band or NR frequency band by using the conductive part of the fourth edge 300*d* as the second antenna radiator 322.

For example, the frequency band of the signal transmitted and/or received by using the second antenna radiator 322 may include about 1,500 MHz to about 4,200 MHz.

Here, according to an embodiment, the magnet structure 410 may not be electrically connected to a portion of the conductive part of the fourth edge 300*d*. For example, the magnet structure 410 and the fourth edge 300*d* may independently provide antenna radiator function.

According to an embodiment, it is described that the electronic device 100 includes one magnet structure 410 as an example of the magnet structure, but is not limited thereto. For example, the electronic device 100 may include multiple magnet structures which are separately used as an antenna radiator.

Hereinafter, an antenna using the conductive coating member 412 of the magnet structure 410 as the first antenna radiator may be referred to as a first magnet antenna.

According to an embodiment, it is described that the first magnet antenna 401 uses one magnet structure 410 as an example, but is not limited thereto. For example, the first magnet antenna 401 may transmit and/or receive a signal in a designated frequency band by using multiple magnet structures electrically connected to each other as one antenna radiator.

According to an embodiment, by using the magnet structure 410 as an antenna radiator, the electronic device 100 may secure an efficient volume of an antenna while maintaining performance of the antenna. Furthermore, by securing the efficient volume, the size of the housing 110 is not increased and thus the electronic device 100 may provide a portable electronic device to a user.

The ground point electrically connected to the ground of the PCB 330 shown in FIGS. 4 to 24 may include a first ground point G1, a second ground point G2, and a third ground point G3, and the feeding point electrically connected to the wireless communication circuit may include a first feeding point F1, a second feeding point F2, and a third feeding point F3.

Figure 5:
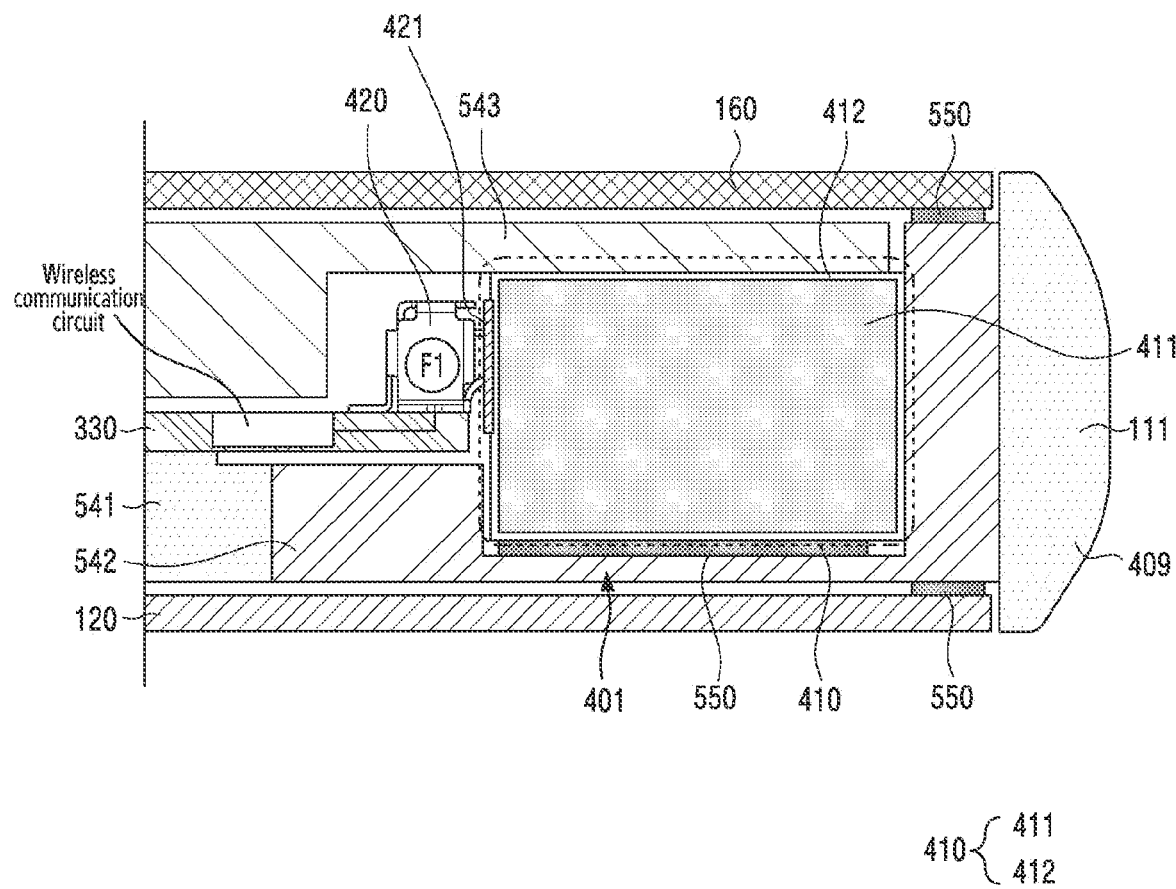
FIG. 5 illustrates a sectional view of the magnet structure in FIG. 4 according to an embodiment of the disclosure.

FIG. 5 illustrates a sectional view of the magnet structure in FIG. 4 according to an embodiment of the disclosure.

According to an embodiment, the electronic device 100 may include the magnet structure 410, the first housing 111, a first support structure 541, a second support structure 542, a third support structure 543, the rear cover (or rear glass) 160, the flexible display 120, and/or the PCB 330.

According to an embodiment, the first support structure 541, the second support structure 542, and the third support structure 543 may be arranged in an internal space of the electronic device 100. In an embodiment, the first support structure 541, the second support structure 542, and the third support structure 543 may be arranged in an internal space of the electronic device 100, which is formed by the flexible display 120, the rear cover 160, and a lateral member 409 of the first housing 111.

For example, at least a portion of the first support structure 541 may be disposed in the internal space of the electronic device 100 adjacent to a rear surface of the flexible display 120.

For example, at least a portion of the second support structure 542 may be disposed on the rear surface of the flexible display 120 and a portion thereof may come in contact with the lateral member 409 of the first housing 111.

For example, at least a portion of the third support structure 543 may be disposed in the electronic device 100 adjacent to a rear surface of the rear cover 160. For example, at least a portion of the third support structure 543 may be positioned inside the electronic device 100 surrounded by the magnet structure 410, the PCB 330 disposed on the first support structure 541, and the rear cover 160.

According to an embodiment, various electronic components may be disposed on the first support structure 541. For example, the PCB 330, a battery (not shown), and a camera module (not shown) may be positioned on the first support structure 541.

According to an embodiment, the PCB 330 may be positioned on the first support structure 541. For example, the first support structure 541 may be formed of a bracket and the PCB 330 may be positioned on the bracket.

According to an embodiment, the second support structure 542 and the third support structure 543 may be formed to support the magnet structure 410. For example, a portion of the second support structure 542 and the third support structure 543 may be formed to surround the magnet structure 410 inside the electronic device 100 to fix the magnet structure 410 inside the electronic device 100.

According to an embodiment, a tape 550 may be disposed on the second support structure 542. For example, the second support structure 542 may be attached to the rear cover 160 by the tape 550. For another example, the second support structure 542 may be attached to the flexible display 120 by the tape 550. For still another example, the second support structure 542 may be attached to the magnet structure 410 by the tape 550.

According to an embodiment, as the tape 550 is disposed on the second support structure 542, the rear cover 160, the flexible display 120, and the magnet structure 410 may be fixed to an outer surface or to the inside of the electronic device 100.

For example, at least a portion of the third support structure 543 may be disposed inside the electronic device 100 between the rear cover 160 and the PCB 330.

According to an embodiment, the magnet structure 410 may be disposed inside the electronic device 100 while being surrounded by the second support structure 542, the PCB 330, and the third support structure 543.

According to an embodiment, a sectional surface of the magnet structure 410 may be formed to have a rectangular shape, but is not limited thereto. For example, the sectional surface of the magnet structure 410 may be formed to have a circular shape. For another example, the sectional surface of the magnet structure 410 may be formed to have a hexagonal shape.

According to an embodiment, the magnet structure 410 may be electrically connected to the PCB 330. In an embodiment, the conductive coating member 412 of the magnet structure 410 may be electrically connected to the wireless communication circuit through the first feeding point F1. For example, the conductive coating member 412 of the magnet structure 410 may be electrically connected to the wireless communication circuit through a first conductive connection member 420. For example, the first conductive connection member 420 may be disposed on the first feeding point F1.

According to an embodiment, the first conductive connection member 420 may be formed of a c-clip but is not limited thereto. For another example, the first conductive connection member 420 may be formed of a flexible printed circuit board (FPCB).

According to an embodiment, the first conductive connection member 420 may be electrically connected to the conductive coating member 412 by a conductive auxiliary member 421. For example, one surface of the conductive coating member 412 may be attached to a portion of the conductive auxiliary member 421, and the other surface opposite to the one surface may be connected to the first conductive connection member 420. For example, the conductive auxiliary member 421 may be formed of a metal sheet, but is not limited thereto.

According to an embodiment, as the conductive auxiliary member 421 is attached between the conductive coating member 412 and the first conductive connection member 420, the conductive coating member 412 and the first conductive connection member 420 may be prevented from corrosion.

According to an embodiment, the wireless communication circuit may use the magnet structure 410 as the first magnet antenna 401 by using the first conductive connection member 420. In an embodiment, an antenna using the conductive coating member 412 of the magnet structure 410 as the first antenna radiator may be referred to as a first magnet antenna 401.

According to an embodiment, the wireless communication circuit may directly feed a portion of the conductive coating member 412 of the magnet structure 410 through the first feeding point F1. For example, the wireless communication circuit may feed a portion of the conductive coating member 412 through the first conductive connection member 420.

According to an embodiment, the wireless communication circuit may feed a portion of the conductive coating member 412 through the first feeding point F1 so as to transmit and/or receive a signal in a designated first frequency band by using the conductive coating member 412 of the magnet structure 410 as an antenna radiator. According to an embodiment, the wireless communication circuit may feed a portion of the conductive coating member 412 through the first conductive connection member 420 so as to transmit and/or receive a signal in a designated first frequency band by using the conductive coating member 412 of the magnet structure 410 as an antenna radiator.

According to an embodiment, the wireless communication circuit may transmit and/or receive a signal in a designated first frequency band by using the first magnet antenna 401 including the magnet structure 410. For example, the wireless communication circuit may transmit and/or receive a signal in the designated first frequency band of about 3.2 GHz to about 4.2 GHz.

According to an embodiment, as the wireless communication circuit uses the first magnet antenna 401 including the magnet structure 410, the electronic device 100 including the magnet 411 may secure an efficient volume of an antenna. Furthermore, the electronic device 100 may provide an electronic device securing antenna performance without increase in the size of the electronic device 100.

According to an embodiment, the first magnet antenna 401 using the conductive coating member 412 of the magnet structure 410 may be distinguished from a second antenna radiator (e.g., 322 in FIG. 4) using the conductive part of the first housing 111 adjacent to the magnet structure 410 in FIG. 4.

According to an embodiment, the wireless communication circuit may use each of the conductive parts of the fourth edge 300d of the first housing 111 and the magnet structure 410 as an antenna radiator.

Figure 6:
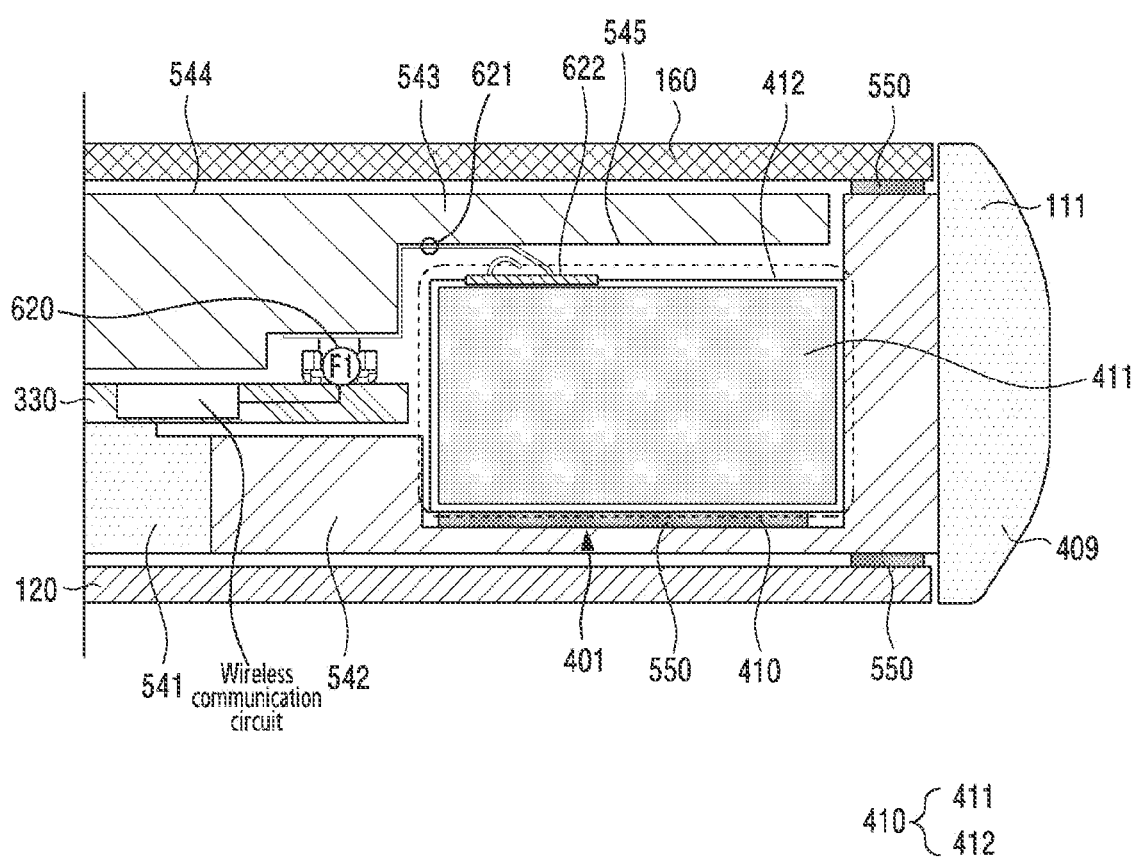
FIG. 6 illustrates a sectional view of the magnet structure in FIG. 4 according to an embodiment of the disclosure.

FIG. 6 illustrates a sectional view of the magnet structure in FIG. 4 according to an embodiment of the disclosure.

Referring to FIG. 6, the electronic device 100 in FIG. 6 may further include a second conductive connection member 621 unlike the electronic device 100 in FIG. 5.

According to an embodiment, the electronic device 100 in FIG. 6 further includes the second conductive connection member 621 and thus transmit and/or receive a signal in a frequency band different from that of the electronic device 100 in FIG. 5.

According to an embodiment, the second support structure 542 and the third support structure 543 may include a non-conductive material. For example, at least a portion of the second support structure 542 and the third support structure 543 may be formed of an injection material (e.g., a plastic material).

According to an embodiment, the second conductive connection member 621 may electrically connect the wireless communication circuit disposed on the PCB 330 and the magnet structure 410. For example, a portion of the second conductive connection member 621 may be electrically connected to the first conductive connection member 620 electrically connected to the wireless communication circuit. For example, another portion of the second conductive connection member 621 may be electrically connected to the conductive coating member 412 of the magnet structure 410.

For another example, the other portion of the second conductive connection member 621 may be electrically connected to the conductive coating member 412 through the conductive auxiliary member 622.

According to an embodiment, at least a portion of the second conductive connection member 621 may be disposed on the third support structure 543 formed of a non-conductive member.

According to an embodiment, the third support structure 543 may include a first surface 544 facing the rear cover 160 and a second surface 545 facing the flexible display 120 opposite to the first surface 544.

According to an embodiment, the second conductive connection member 621 may be disposed on the second surface 545 of the third support structure 543. For example, the second conductive connection member 621 may be disposed along the second surface 545 of the third support structure 543.

According to an embodiment, the second conductive connection member 621 may be disposed along the second surface 545 of the third support structure 543 and electrically connected to the first conductive connection member 620 so as to electrically connect the conductive coating member 412 and the wireless communication circuit.

According to an embodiment, the wireless communication circuit use the conductive coating member 412 of the magnet structure 410 as an antenna radiator by using the first conductive connection member 620 and the second conductive connection member 621.

According to an embodiment, the wireless communication circuit may feed a portion of the conductive coating member 412 through the first feeding point F1 so as to transmit and/or receive a signal in a designated second frequency band by using the conductive coating member 412 of the magnet structure 410 as an antenna radiator. For example, the wireless communication circuit may feed the conductive coating member 412 through the second conductive connection member 621 and the first conductive connection member 620 disposed on the first feeding point F1 so as to transmit and/or receive a signal in a designated second frequency band by using the conductive coating member 412 of the magnet structure 410 as an antenna radiator.

According to an embodiment, an antenna including the first conductive connection member 620, the second conductive connection member 621, the conductive auxiliary member 622, and the magnet structure 410 may be referred to as a first magnet antenna 601.

According to an embodiment, the wireless communication circuit may feed the conductive coating member 412 through the first conductive connection member 620 and the second conductive connection member 621 so that the first magnet antenna 601 in FIG. 6 may transmit and/or receive a signal in the designated second frequency band distinguished from the first frequency band of the first magnet antenna 401 in FIG. 5.

Figure 7:
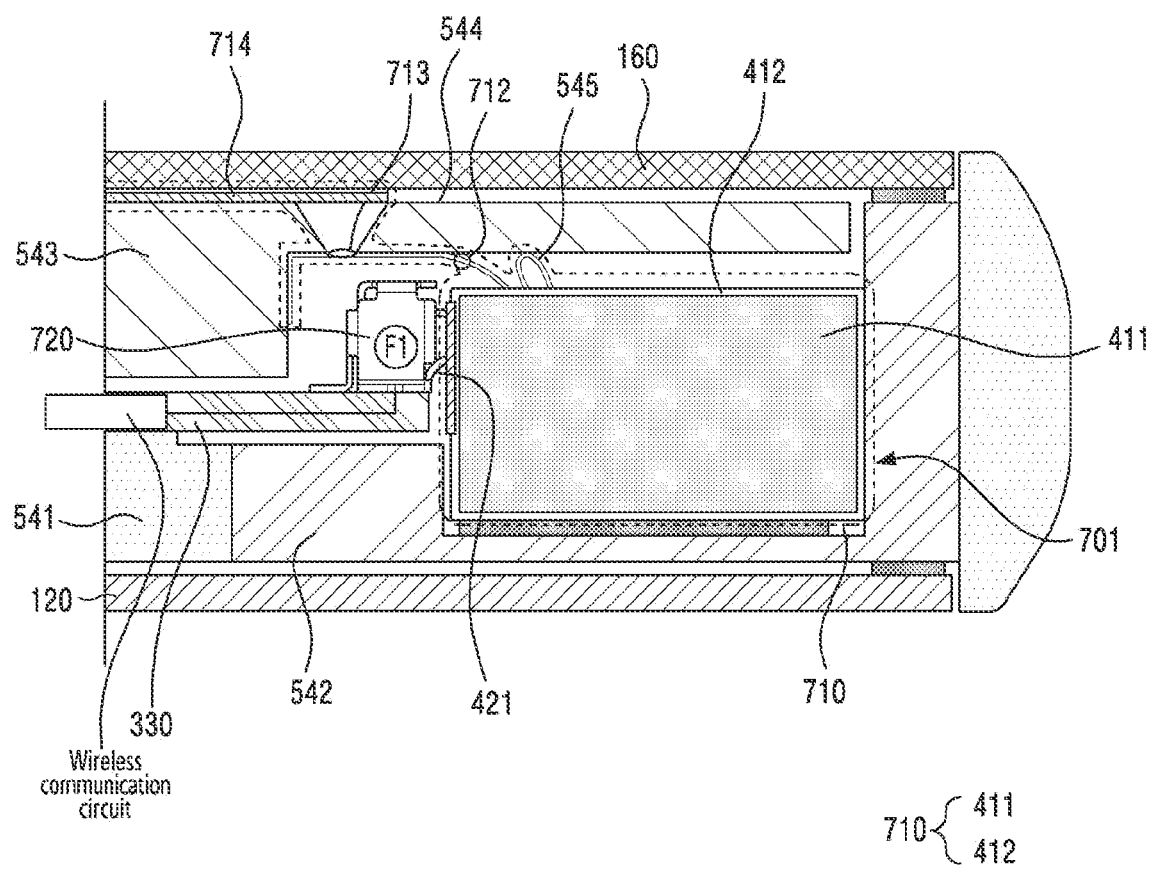
FIG. 7 illustrates a sectional view of the magnet structure in FIG. 4 according to an embodiment of the disclosure.

FIG. 7 illustrates a sectional view of the magnet structure in FIG. 4 according to an embodiment of the disclosure.

Figure 8:
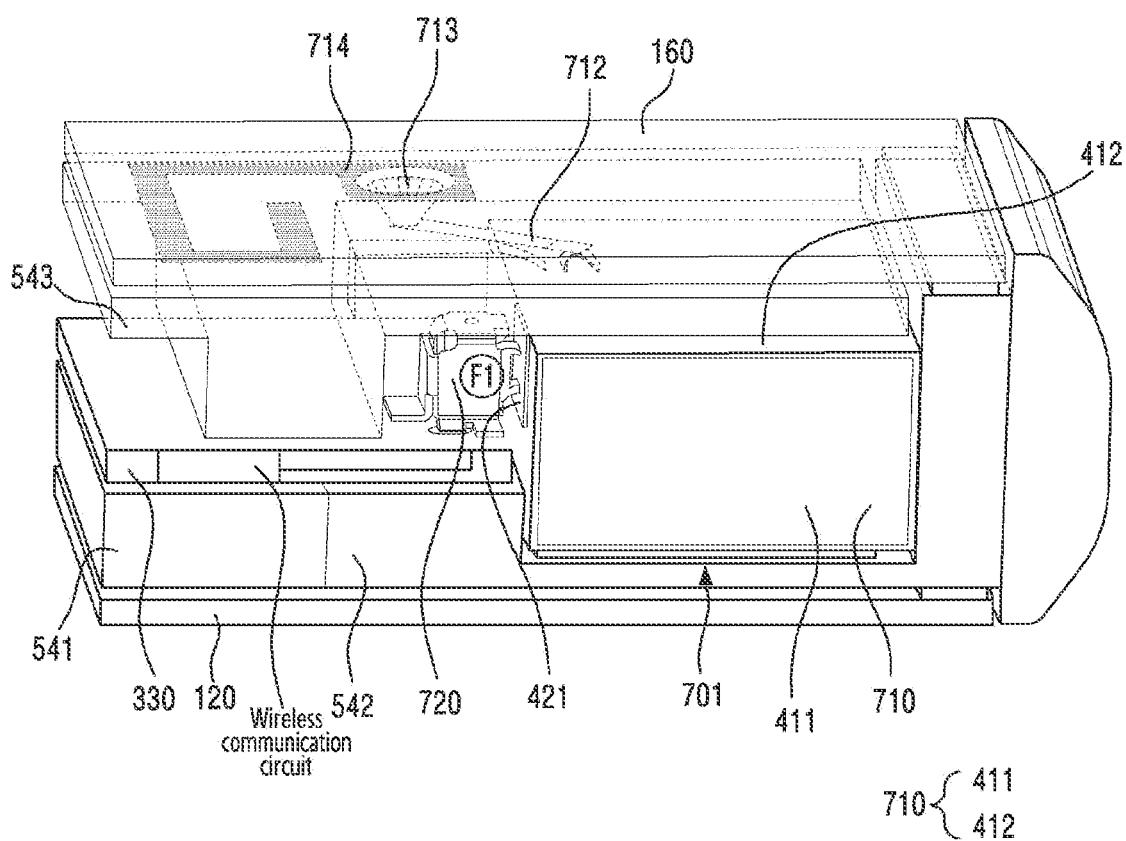
FIG. 8 illustrates a perspective view of the magnet structure in FIG. 7 according to an embodiment of the disclosure.

FIG. 8 illustrates a perspective view of the magnet structure in FIG. 7 according to an embodiment of the disclosure.

According to an embodiment, FIG. 7 illustrates a sectional view of the magnet structure 410 disposed inside the electronic device 100 and FIG. 8 illustrates a perspective view of the magnet structure 710 in FIG. 7.

According to an embodiment, unlike the electronic device 100 in FIG. 5 to FIG. 6, the electronic device 100 in FIGS. 7 and 8 may further include a conductive extension member 712 and a conductive pattern 714. The first conductive connection member 720 of FIG. 7 may correspond to the first conductive connection member 420 of FIG. 4.

According to an embodiment, the electronic device 100 in FIGS. 7 and 8 further includes the conductive extension member 712 and the conductive pattern 714 and thus transmit and/or receive a signal in a frequency band different from that of the electronic device 100 in FIG. 5.

Referring to FIGS. 7 and 8, the conductive extension member 712 may be formed by extending a portion of the conductive coating member 412 of the magnet structure 710. According to another embodiment, the conductive extension member 712 may be connected to a portion of the conductive coating member 412 of the magnet structure 710 through a connection member (not shown).

According to an embodiment, the conductive pattern member 714 may be connected to the conductive extension member 712. For example, the conductive pattern member 714 may be connected to a portion of the conductive extension member 712 so that the conductive extension member 712 may be electrically connected to the conductive pattern member 714.

According to an embodiment, it is described that the conductive pattern member 714 and the conductive extension member 712 are separate components, but is not limited thereto. For another example, the conductive pattern member 714 may be integrally formed with the conductive extension member 712.

According to an embodiment, the conductive extension member 712 may extend from a portion of the conductive coating member 412 to be disposed along the second surface 545 of the third support structure 543. According to an embodiment, the conductive pattern member 714 may be disposed on the first surface 544 of the third support structure 543. For example, the conductive pattern member 714 may be disposed between the first surface 544 of the third support structure 543 and the rear cover 160.

In an embodiment, the third support structure 543 may include a hole 713. In an embodiment, the conductive extension member 712 may be disposed along the second surface 545 of the third support structure 543 to be connected to the conductive pattern member 714 disposed on the first surface 544 of the third support structure 543 via the hole 713.

According to an embodiment, the conductive pattern member 714 may be formed of an antenna pattern member (e.g., a stainless use steel (SUS) member).

According to an embodiment, the wireless communication circuit transmit and/or receive a signal in a designated third frequency band by using, as an antenna radiator, the conductive pattern member 714, the conductive extension member 712 electrically connected to the conductive pattern member 714, and the conductive coating member 412 electrically connected to the conductive extension member 712. For example, the wireless communication circuit may feed the conductive coating member 412 through the first conductive connection member 420 disposed on the first feeding point F1 so as to transmit and/or receive a signal in a designated third frequency band by using the first magnet antenna 701.

According to an embodiment, as the electronic device 100 further includes the conductive extension member 712 and the conductive pattern member 714, the electronic device 100 in FIG. 7 may transmit and/or receive a signal in a third frequency band different from that of the first magnet antenna 401 in FIG. 5 through the first magnet antenna 701.

Figure 9:
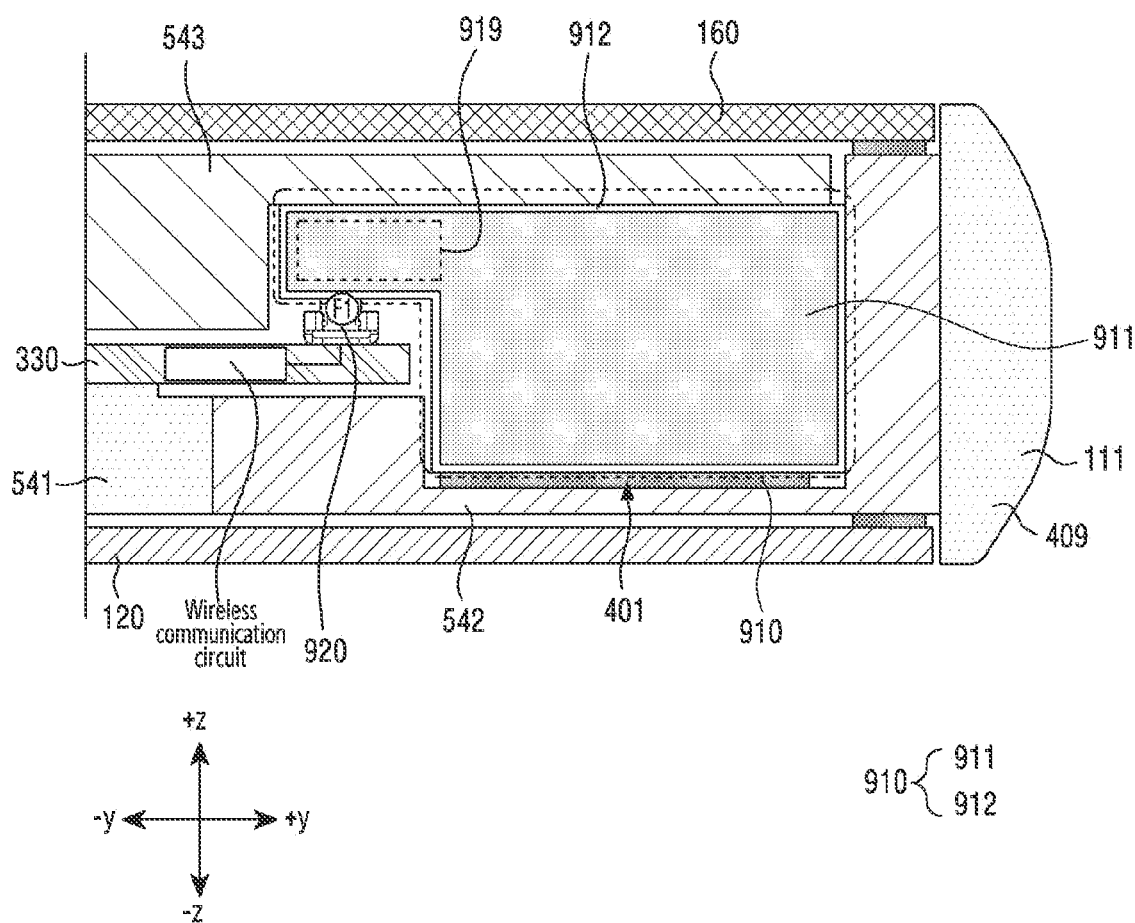
FIG. 9 illustrates a sectional view of the magnet structure in FIG. 7 according to an embodiment of the disclosure.

FIG. 9 illustrates a sectional view of the magnet structure in FIG. 7 according to an embodiment of the disclosure.

Referring to FIG. 9, a magnet structure 910 may be formed to have a shape substantially different from that of the magnet structure 410 in FIG. 4. The magnet 911 of FIG. 9 may correspond to the magnet 411 of FIG. 4.

According to an embodiment, the magnet structure 910 in FIG. 9 may further include a protrusion 919 unlike the magnet structure 410 in FIG. 4. In an embodiment, the magnet structure 910 may further include the protrusion 919 protruding from the edge of the first housing 111 toward the inside of the electronic device 100. According to another embodiment, the protrusion 919 may protrude from a portion of the magnet structure 910 toward the inside of the electronic device 100. For example, the protrusion 919 may protrude from the rear cover 160 or a portion of the magnet structure 910 adjacent to the third support structure 543 toward the inside of the electronic device 100 in a first direction (e.g., a −(y) direction).

According to an embodiment, a sectional surface of the protrusion 919 shown in FIG. 9 may be formed to have a rectangular shape, but is not limited thereto. For example, the sectional surface of the protrusion 919 may be formed to have a circular shape.

According to an embodiment, as the protrusion 919 is formed, a portion of the PCB 330 and the protrusion 919 of the magnet structure 910 may overlap each other when viewed from a second direction (e.g., a −(z) direction) perpendicular to the first direction.

According to an embodiment, a first conductive connection member 920 may be disposed between areas in which a portion of the PCB 330 and the protrusion 919 of the magnet structure 910 overlap each other when viewed from the second direction (e.g., the −(z) direction). According to an embodiment, as the first conductive connection member 920 is disposed, the wireless communication circuit on the PCB 330 and the protrusion 919 of the magnet structure 910 may be electrically connected to each other.

According to an embodiment, the wireless communication circuit may be electrically connected to the conductive coating member 912 of the protrusion 919 of the magnet structure 910 through the first feeding point F1.

According to an embodiment, the wireless communication circuit may transmit and/or receive a signal in a designated fourth frequency band by using the first magnet antenna 901 including the magnet structure 910. For example, the wireless communication circuit may feed the conductive coating member 912 disposed on the protrusion 919 through the first feeding point F1 so as to transmit and/or receive a signal in a designated fourth frequency band by using the first magnet antenna 901 including the magnet structure 910.

According to an embodiment, as the protrusion 919 is additionally formed on the magnet structure 910, the size of a radiator may be changed by the conductive coating member 912 on which the protrusion 919 is positioned, compared to the first magnet antenna 401 in FIG. 5 and thus the electronic device 100 in FIG. 9 may include the first magnet antenna 901 for transmitting and/or receiving a signal in a fourth frequency band different from that of the first magnet antenna 401 in FIG. 5.

Figure 10:
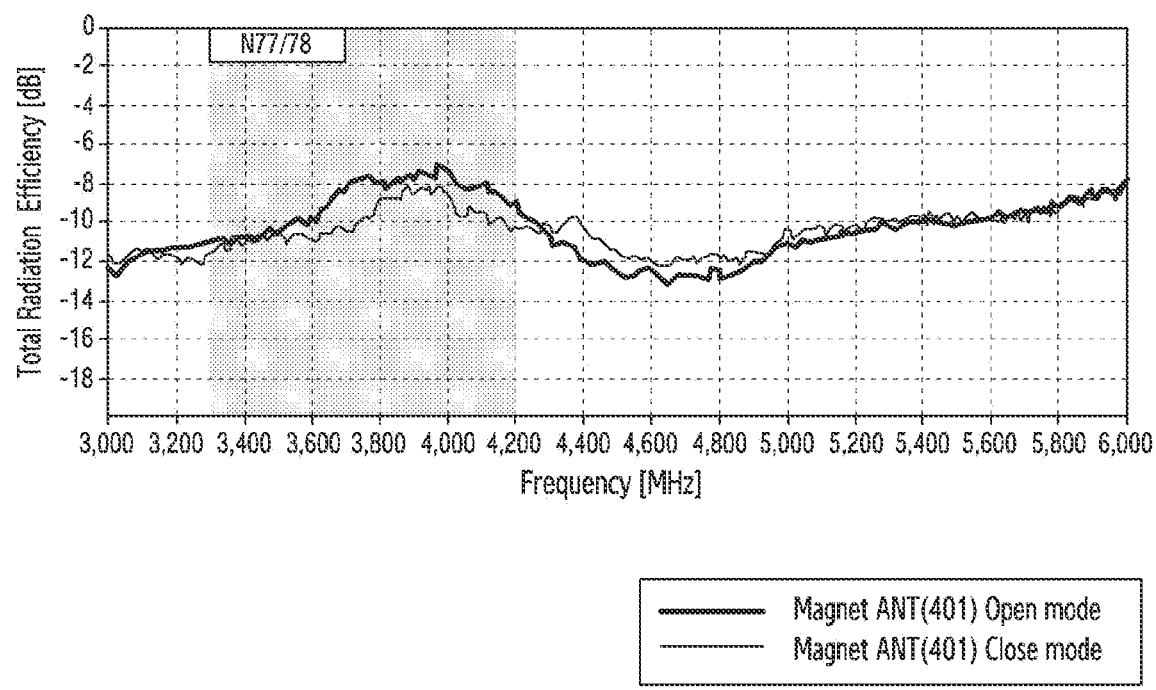
FIG. 10 illustrates a graph comparing antenna performances of a magnet structure according to an embodiment of the disclosure.

FIG. 10 illustrates a graph comparing antenna performances of a magnet structure according to an embodiment of the disclosure.

Referring to FIG. 10, the graph in FIG. 10 may show comparison of performances of the first magnet antenna 401 including the magnet structure 410 in the unfolded state (open mode) 100A and the folded state (close mode) 100B of the electronic device 100.

The x axis of the graph in FIG. 10 is an axis indicating a frequency (MHz) and Y axis is an axis indicating radiation efficiency [dB].

According to an embodiment, the first magnet antenna 401 may transmit and/or receive a signal in a frequency band within a range of about 3,300 MHz to about 4,200 MHz. For another example, the antennas may transmit and/or receive a signal in a frequency band within about 5,000 MHz to 6,000 MHz.

According to an embodiment, referring to FIG. 10, the performances of the magnet antenna in the unfolded state (open mode) 100A and the folded state (close mode) 100B of the electronic device 100 may be substantially the same. For example, the performances of the magnet antenna in the unfolded state (open mode) 100A and the folded state (close mode) 100B within 5,000 MHz to 6,000 MHz may be substantially the same.

In case that the edge of the housing is used as an antenna radiator in the foldable electronic device, an antenna performance loss may occur in the folded state (close mode) 100B rather than the unfolded state (open mode) 100A. In the folded state, as the edges of the first housing 111 and the second housing 112 are disposed adjacent to each other, coupling may occur and thus degradation in antenna performance may occur.

According to an embodiment, considering of the degradation in antenna performance of the foldable electronic device, performances of the first magnet antenna 401 in the folded state (close mode) 100B other than the unfolded state (open mode) 100A of the electronic device 100 may be substantially the same in a frequency range of about 3,300 MHz to about 4,200 MHz.

Figure 11:
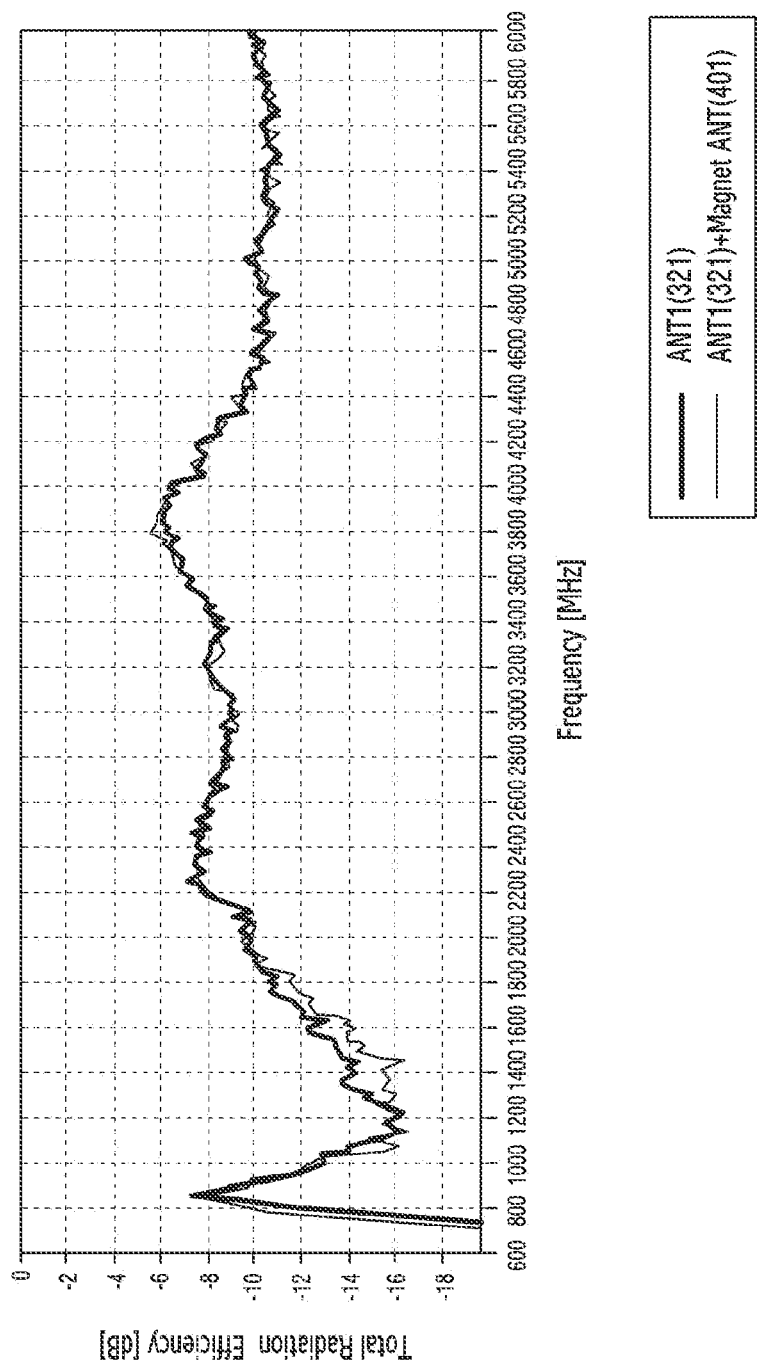
FIG. 11 illustrates a graph comparing performances of a first antenna according to an embodiment of the disclosure.

FIG. 11 illustrates a graph comparing performances of a first antenna according to an embodiment of the disclosure.

According to an embodiment, FIG. 11 is a graph comparing performances of the first antenna radiator 321 of the electronic device 100 including the first magnet antenna 401 and the first antenna radiator 321 of the electronic device 100 not including the first magnet antenna 401.

For example, the graph in FIG. 11 is a graph indicating comparison of radiation efficiencies of the first antenna radiator 321 of a case that the first magnet antenna 401 and the first antenna radiator 321 are formed together and a case that only the first antenna radiator 321 is formed.

Referring to FIGS. 3 and 11 according to an embodiment, the radiation efficiencies of the first antenna radiator 321 of the case that only the first antenna radiator 321 is formed and the case that the first magnet antenna 401 and the first antenna radiator 321 are formed together may be substantially the same. In an embodiment, even in case that the first magnet antenna 401 and the first antenna radiator 321 are closely disposed, the first antenna radiator 321 may not be interfered with the first magnet antenna 401.

Figure 12:
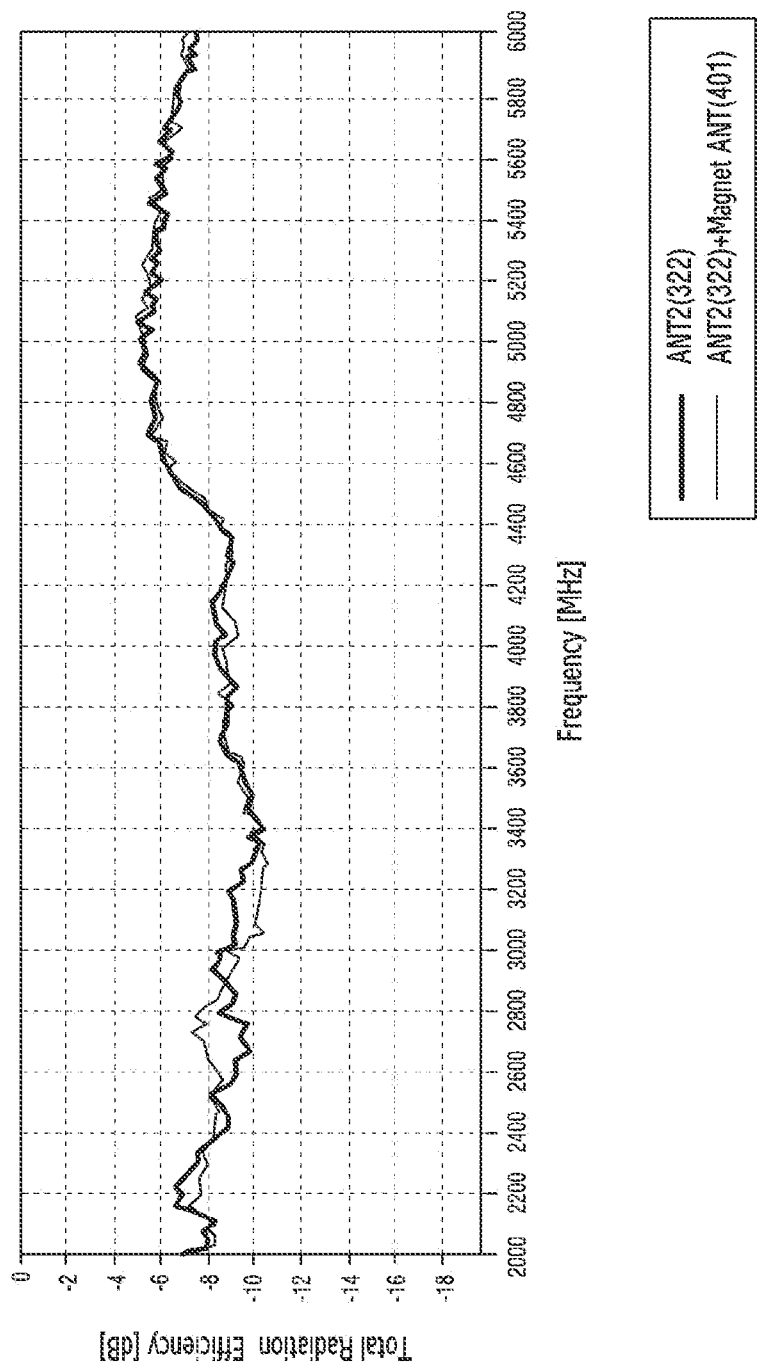
FIG. 12 illustrates a graph comparing performances of a second antenna according to an embodiment of the disclosure.

FIG. 12 illustrates a graph comparing performances of a second antenna according to an embodiment of the disclosure.

According to an embodiment, FIG. 12 is a graph comparing performances of the second antenna radiator 322 of the electronic device 100 including the first magnet antenna 401 and the second antenna radiator 322 of the electronic device not including the first magnet antenna 401.

For example, the graph in FIG. 12 is a graph indicating comparison of radiation efficiencies of the second antenna radiator 322 of a case that the first magnet antenna 401 and the second antenna radiator 322 are formed together and a case that only the second antenna radiator 322 is formed.

Referring to FIGS. 3 and 12 according to an embodiment, the radiation efficiencies of the second antenna radiator 322 of the case that only the second antenna radiator 322 is formed and the case that the first magnet antenna 401 and the second antenna radiator 322 are formed together may be substantially the same. In an embodiment, even in case that the first magnet antenna 401 and the second antenna radiator 322 are closely disposed, the second antenna radiator 322 may not be interfered with the first magnet antenna 401.

Figure 13:
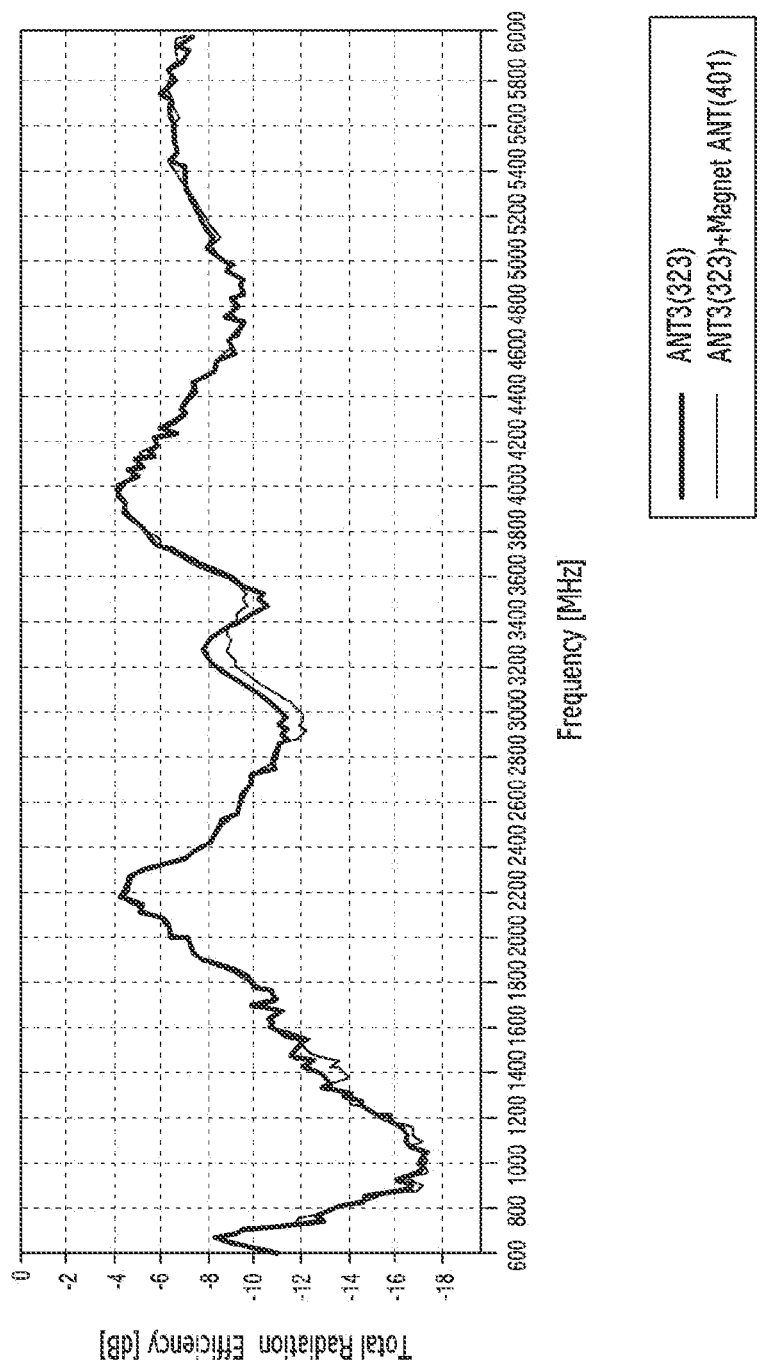
FIG. 13 illustrates a graph comparing performances of a third antenna according to an embodiment of the disclosure.

FIG. 13 illustrates a graph comparing performances of a third antenna according to an embodiment of the disclosure.

According to an embodiment, FIG. 13 is a graph comparing performances of the third antenna radiator 323 of the electronic device 100 including the first magnet antenna 401 and the third antenna radiator 323 of the electronic device not including the first magnet antenna 401.

For example, the graph in FIG. 13 is a graph indicating comparison of radiation efficiencies of the third antenna radiator 323 of a case that the first magnet antenna 401 and the third antenna radiator 323 are formed together and a case that only the third antenna radiator 323 is formed.

Referring to FIGS. 3 and 13 according to an embodiment, the radiation efficiencies of the third antenna radiator 323 of the case that only the third antenna radiator 323 is formed and the case that the first magnet antenna 401 and the third antenna radiator 323 are formed together may be substantially the same. In an embodiment, even in case that the first magnet antenna 401 and the third antenna radiator 323 are closely disposed, the third antenna radiator 323 may not be interfered with the first magnet antenna 401.

Figure 14:
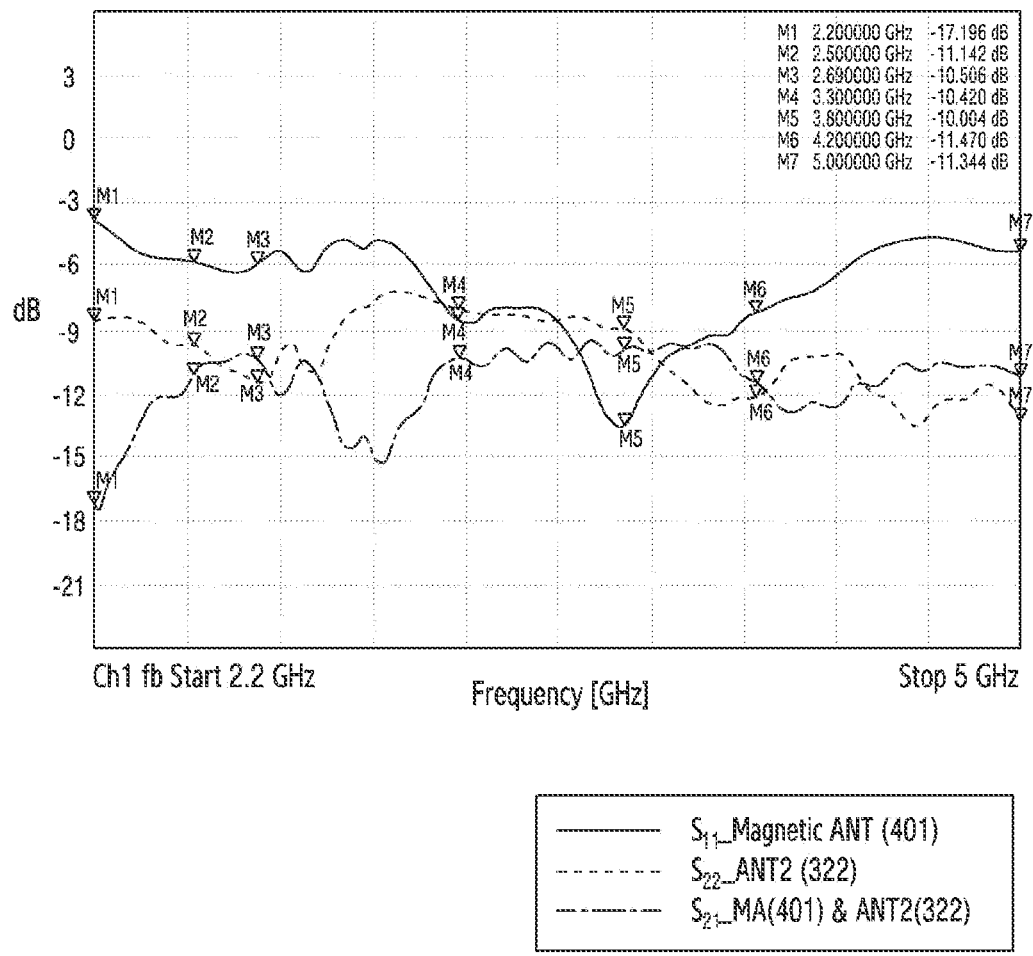
FIG. 14 illustrates a graph comparing radiation efficiencies of a first magnet antenna and a second antenna radiator according to an embodiment of the disclosure.

FIG. 14 illustrates a graph comparing radiation efficiencies of a first magnet antenna and a second antenna radiator according to an embodiment of the disclosure.

Referring to FIG. 3, the second antenna radiator 322 of the antenna radiator 320 may be disposed closer to the magnet antenna 401 than the other antenna radiator 320.

According to an embodiment, the graph of FIG. 14 illustrates an effect of radiation efficiency of an antenna according to adjacent disposal of the second antenna radiator 322 and the first magnet antenna 401.

According to an embodiment, graph S11 may illustrate a reflection coefficient of the first magnet antenna 401. According to an embodiment, graph S22 may illustrate a reflection coefficient of the second magnet antenna 322. According to an embodiment, graph S21 may illustrate a radiation efficiency according to effects of the first magnet antenna 401 and the second antenna radiator 322 to each other.

According to an embodiment, in case that the radiation efficiency is −10 dB or less, the radiation performances of the second antenna radiator 322 of the case that the first magnet antenna 401 is formed and the case that only the second antenna radiator 322 is formed may be substantially the same.

Referring to graph S21 in FIG. 14, in case that the electronic device 100 includes the first magnet antenna 401, the radiation performance of the second radiator 322 of the electronic device 100 may be −10 dB or less. According to an embodiment, referring to graph S21, the first magnet antenna 401 may not substantially affect radiation performance of the second antenna radiator 322.

Figure 15:
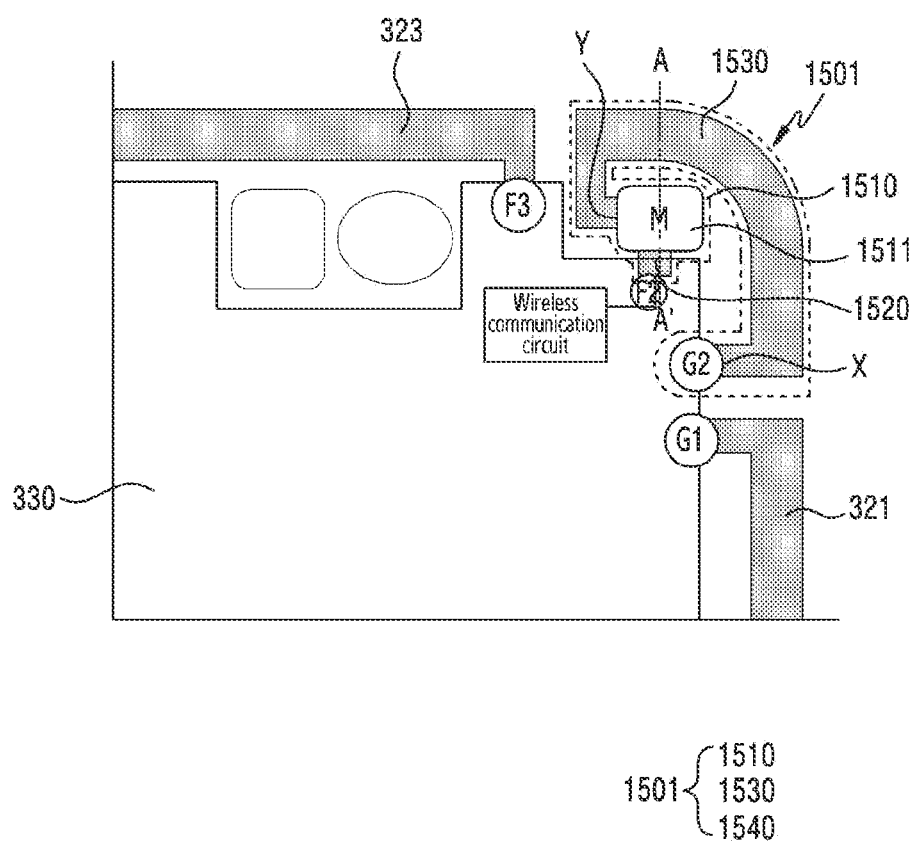
FIG. 15 illustrates a magnet structure according to an embodiment of the disclosure.

FIG. 15 illustrates a magnet structure according to an embodiment of the disclosure.

Figure 16:
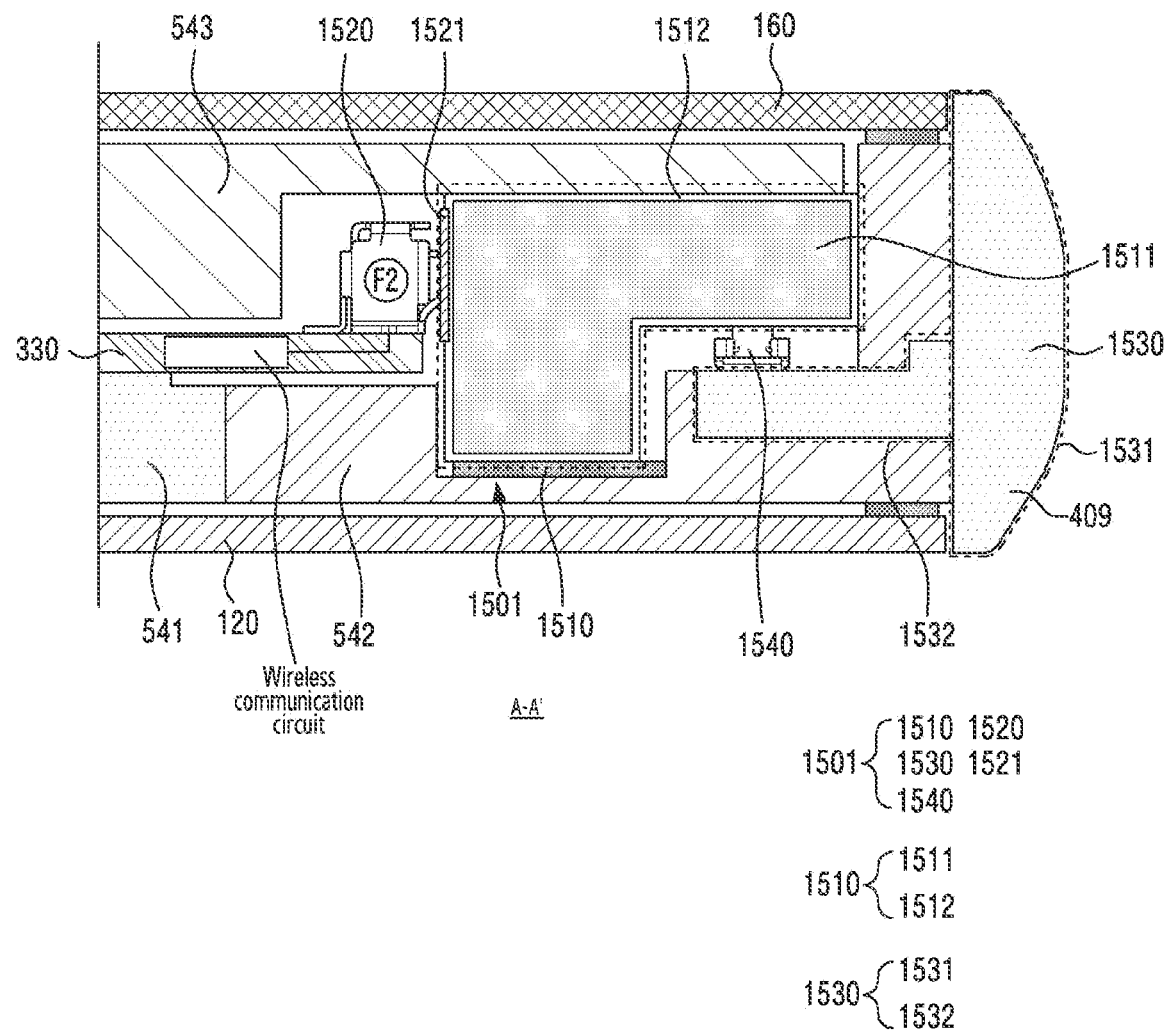
FIG. 16 illustrates a sectional view of the magnet structure in FIG. 15 taken along line A-A' according to an embodiment of the disclosure.

FIG. 16 illustrates a sectional view of the magnet structure in FIG. 15 taken along line A-A' according to an embodiment of the disclosure.

According to an embodiment, unlike the electronic device 100 in FIG. 4, the electronic device 100 in FIGS. 15 and 16 may transmit and/or receive a signal in a designated frequency band by using a magnet structure 1510 and a conductive part 1530 of the first housing 111 as an antenna radiator. The magnet 1511 of FIG. 15 may correspond to the magnet 411 of FIG. 4.

According to an embodiment, an antenna using the magnet structure 1510 and the conductive part 1530 of the first housing 111 as an antenna radiator may be referred to as a second magnet antenna 1501.

According to an embodiment, the electronic device 100 may include a first antenna radiator 321, a second magnet antenna 1501, and/or the third antenna radiator 323.

According to an embodiment, unlike the first magnet antenna 401, 701, 901 formed of only the magnet structure 410 in FIGS. 5 to 9, the second magnet antenna 1501 in FIGS. 15 and 16 may further include the conductive part 1530 of the first housing 111.

For example, the second magnet antenna 1501 may include a first conductive connection member 1520, a conductive auxiliary member 1521, the magnet structure 1510, a third conductive connection member 1540, and/or the conductive part 1530 of the first housing 111 electrically connected to the magnet structure 1510.

According to an embodiment, the conductive part of the first housing 111 of the second magnet antenna 1501 may be electrically connected to the PCB 330 through the second ground point G2. For example, a first point X may correspond to the second ground point G2 and may be electrically connected to a ground disposed on the PCB 330 at the first point X of the conductive part 1530 of the first housing 111.

According to an embodiment, the magnet structure 1510 of the second magnet antenna 1501 may be electrically connected to the PCB 330 through the second feeding point F2. For example, the magnet structure 1510 may be electrically connected to the wireless communication circuit on the PCB 330 through a second feeding point F2.

According to an embodiment, the magnet structure 1510 may be electrically connected to the PCB 330 through the first conductive connection member 1520 disposed on the second feeding point F2. According to an embodiment, referring to FIG. 16, the magnet structure 1510 may further include a conductive auxiliary member 1521.

According to an embodiment, the first conductive connection member 1520 and the conductive auxiliary member 1521 may refer to the first conductive connection member 420 and the conductive auxiliary member 421 in FIG. 4 to FIG. 5.

Referring to FIG. 15, another second point Y of the conductive part 1530 of the first housing 111 according to an embodiment may be electrically connected to the magnet structure 1510. For example, the second point Y of the conductive part 1530 of the first housing 111 may be electrically connected to the conductive coating member 1512 of the magnet structure 1510. In an embodiment, the second point Y of the conductive part 1530 may be electrically connected to the conductive coating member 1512 of the magnet structure 1510 by the third conductive connection member 1540 (e.g., a c-clip or a FPCB).

Referring to FIG. 16 according to an embodiment, the conductive part 1530 of the lateral member 409 of the first housing 111 may include a first area 1531 and a second area 1532. According to an embodiment, the first area 1531 may include an area exposed to the outside of the electronic device 100 of the conductive part 1530 of the lateral member 409 of the first housing 111. For example, one surface of the first area 1531 may form an exterior of the electronic device 100 and the other surface thereof may form toward the inside of the electronic device 100.

According to an embodiment, the second area 1532 may include an area facing the inside of the electronic device 100 of the conductive part 1530 of the lateral member 409 of the first housing 111. In an embodiment, the second area 1532 may extend toward the inside of the electronic device 100 from the other surface of the first area 1531 of the conductive part 1530. For example, the second area 1532 may extend toward the inside of the electronic device 100 from a portion of the other surface of the first area 1531 adjacent to the flexible display 120. According to an embodiment, the second area 1532 may be formed of a flange.

According to an embodiment, when viewed from the top of the rear cover 160, at least a portion of the second area 1532 may overlap at least a portion of the magnet structure 1510. For example, when viewed from the top of the rear cover 160, the third conductive connection member 1540 may be disposed on an area in which at least a portion of the second area 1532 and at least a portion of the magnet structure 1510 overlap each other.

According to an embodiment, the third conductive connection member 1540 may be disposed on the second area 1532. For example, the third conductive connection member 1540 may be disposed on the second area 1532 of the conductive part 1530 of the first housing 111 to electrically connect the conductive coating member 1512 of the magnet structure 1510 and the conductive part 1530 of the first housing 111.

According to an embodiment, the wireless communication circuit may feed the conductive coating member 1512 of the magnet structure 1510 through the second feeding point F2 so as to transmit and/or receive a signal in a designated fifth frequency band by using the second magnet antenna 1501. For example, the wireless communication circuit may feed the conductive coating member 1512 of the magnet structure 1510 through the conductive auxiliary member 1521 and the first conductive connection member 1520 disposed on the second feeding point F2 so as to a signal in a designated fifth frequency band based on an electrical path including the first conductive connection member 1520, the conductive auxiliary member 1521, the conductive coating member 1512, the third conductive connection member 1540, the second area 1532 of the conductive part 1530, and the first area 1531 of the conductive part 1530.

According to an embodiment, the fifth frequency may include a frequency band within a range of about 2.4 GHz to 2.5 GHz. According to another embodiment, the fifth frequency may include a frequency band within a range of about 5.0 GHz to 5.8 GHz.

According to an embodiment, by using the magnet structure 1510 as an antenna radiator, the electronic device 100 may secure an efficient volume of an antenna while maintaining performance of the antenna. Furthermore, by securing the efficient volume, the size of the housing 110 is not increased and thus the electronic device 100 may provide a portable electronic device to a user.

Figure 17:
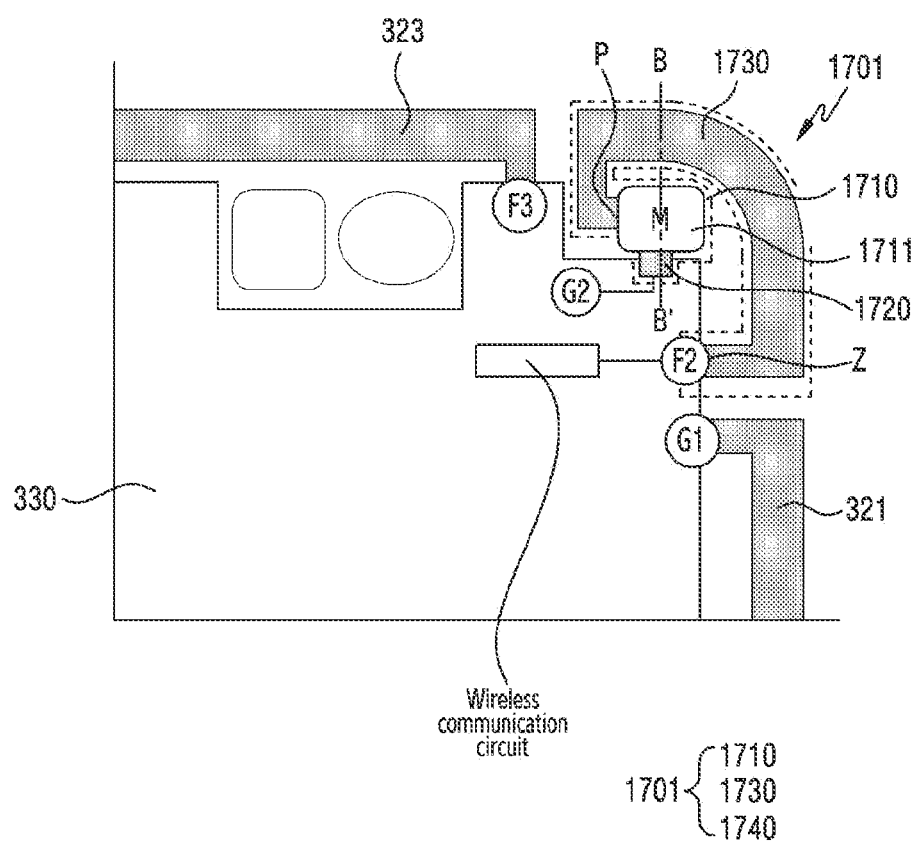
FIG. 17 illustrates a magnet structure according to an embodiment of the disclosure.

FIG. 17 illustrates a magnet structure according to an embodiment of the disclosure.

Figure 18:
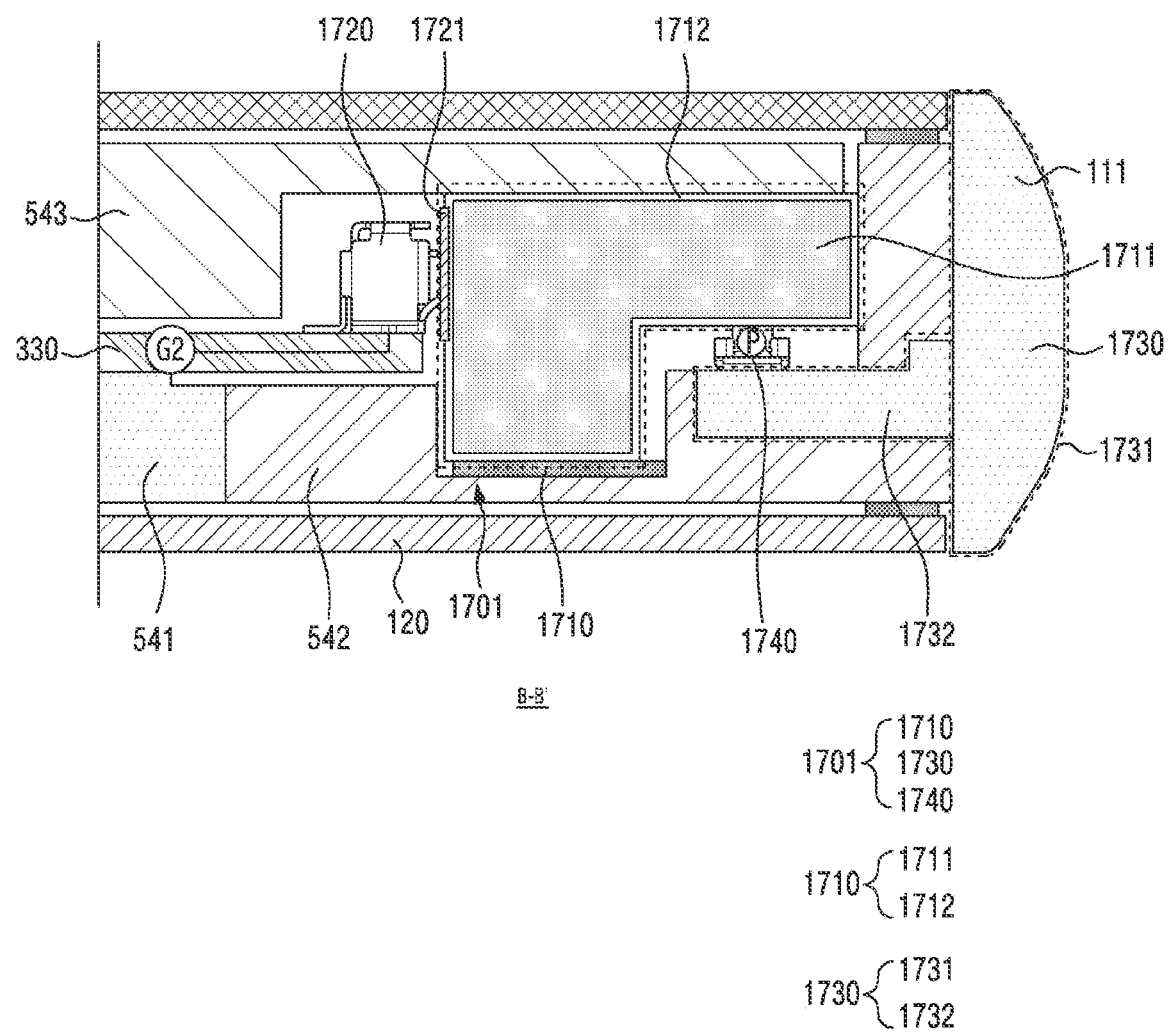
FIG. 18 illustrates a sectional view of the magnet structure in FIG. 17 taken along line B-B' according to an embodiment of the disclosure.

FIG. 18 illustrates a sectional view of the magnet structure in FIG. 17 taken along line B-B' according to an embodiment of the disclosure.

According to an embodiment, unlike the conductive coating member 1512 of the magnet structure 1510 in FIG. 15 connected to the wireless communication circuit through the second feeding point F2, the conductive coating member 1712 of the magnet structure 1710 in FIGS. 17 and 18 may be electrically connected to a ground through the second ground point G2.

According to an embodiment, a second magnet antenna 1701 may include a first conductive connection member 1720, a conductive auxiliary member 1721, the magnet structure 1710, a third conductive connection member 1740, and a conductive part 1730 of the lateral member 409 of the first housing 111 electrically connected to the magnet structure 1710.

According to an embodiment, the magnet structure 1710 of the second magnet antenna 1701 may be electrically connected to the PCB 330. For example, the second magnet structure 1710 may be electrically connected to a ground of the PCB 330 through a second ground point G2. For example, the magnet structure 1710 may be electrically connected to a ground of the PCB 330 through the first conductive connection member 1720 disposed at the second ground point G2.

According to an embodiment, the first conductive connection member 1720 may be additionally connected to the conductive auxiliary member 1721 so as to electrically connect the magnet structure 1710 and the PCB 330.

According to an embodiment, the first conductive connection member 1720 and the conductive auxiliary member 1721 may refer to the first conductive connection member 420 and the conductive auxiliary member 421 in FIG. 4 to FIG. 5.

Referring to FIG. 17, the conductive part 1730 of the lateral member 409 of the first housing 111 of the second magnet antenna 1701 according to an embodiment may be electrically connected to the PCB 330. For example, a third point Z of the conductive part 1730 of the first housing 111 may be electrically connected to the wireless communication circuit of the PCB 330.

According to an embodiment, the conductive part 1730 may be electrically connected to the magnet structure 1710 by the third conductive connection member 1740. For example, referring to FIG. 18, the conductive part 1730 may be electrically connected to the magnet structure 1710 at a fourth point P. By way of example, the conductive part 1730 may be electrically connected to the conductive coating member 1712 at the fourth point P by a conductive connection member (e.g., a c-clip or a FPCB).

According to an embodiment, the third conductive connection member 1740 may be disposed on the second area 1732 of the conductive part 1730 of the first housing 111. For example, the third conductive connection member 1740 may be disposed on the second area 1732 of the conductive part 1730 of the first housing 111 to electrically connect the conductive coating member 1712 of the magnet structure 1710 and the conductive part 1730 of the first housing 111.

According to an embodiment, the wireless communication circuit may feed the conductive part 1730 of the lateral member 409 of the first housing 111 through the second feeding point F2 so as to transmit and/or receive a signal in a designated frequency band by using the second magnet antenna 1701.

For example, the wireless communication circuit may feed the third point Z of the conductive part 1730 of the first housing 111 to transmit and/or receive a signal in a designated sixth frequency band based on an electrical path including the first area 1531 of the conductive part 1530, the second area 1532 of the conductive part 1530, the third conductive connection member 1540, the conductive coating member 1512, the conductive auxiliary member 1521, and/or the first conductive connection member 1520.

According to an embodiment, the third point Z may correspond to the second feeding point F2 for feeding the wireless communication circuit and a portion of the conductive part 1730 of the first housing 111.

According to an embodiment, the sixth frequency may include a frequency band within a range of about 2.4 GHz to 2.5 GHz. According to another embodiment, the sixth frequency may include a frequency band within a range of about 5.0 GHz to 5.8 GHz.

According to an embodiment, by using the magnet structure 1710 as an antenna radiator, a radiation efficient volume of an antenna may be secured and thus radiation performance of the antenna of the electronic device 100 may be improved. Furthermore, by securing the efficient volume, the size of the housing 110 is not increased and thus the electronic device 100 may provide a portable electronic device to a user.

According to an embodiment, in addition to the connection relationship the conductive coating member 1712 of the third magnet structure 1710 to the ground of the PCB 330 through the second ground point G2 shown in FIGS. 17 and 18, an embodiment of the second magnet antenna 1701 may refer to the embodiment of the second magnet antenna 1501 in FIG. 16.

Figure 19:
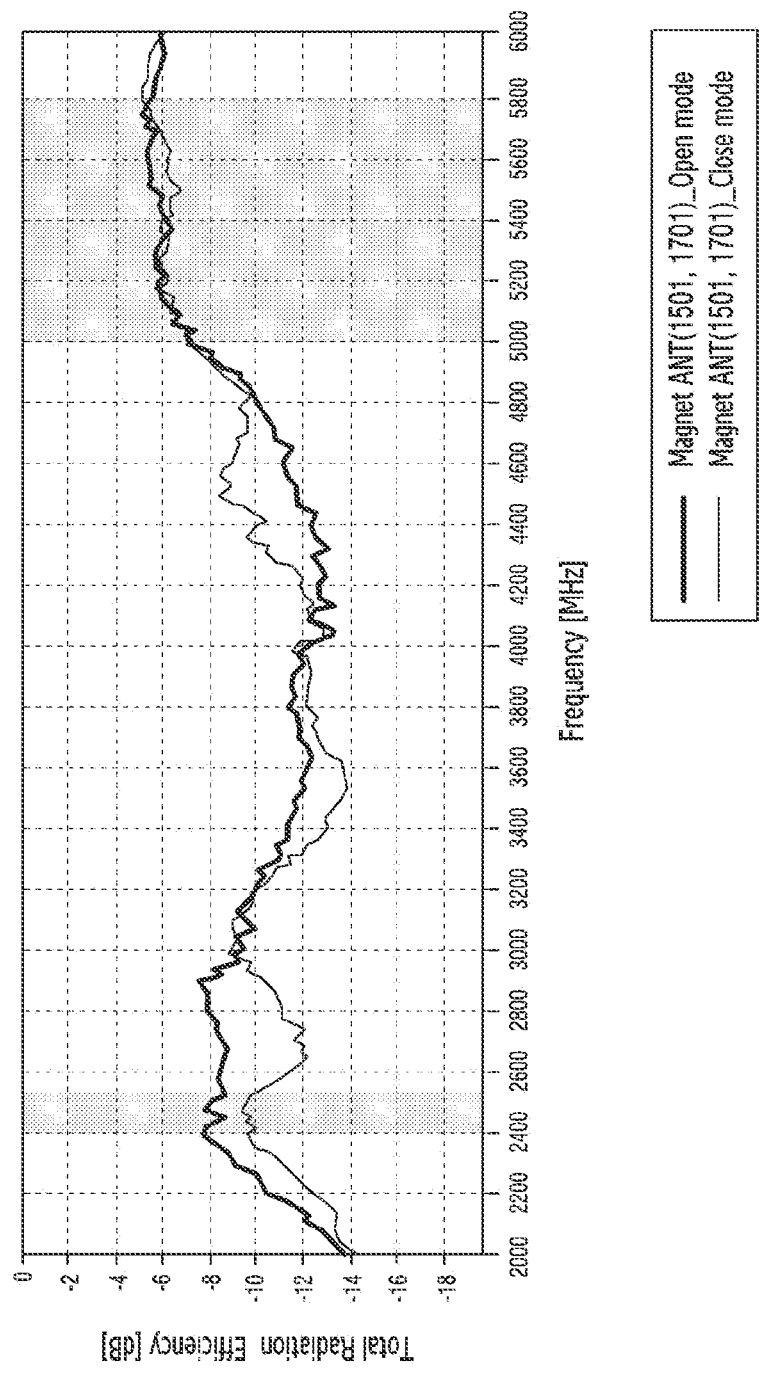
FIG. 19 illustrates a graph comparing antenna performances of a second magnet antenna according to an embodiment of the disclosure.

FIG. 19 illustrates a graph comparing antenna performances of a second magnet antenna according to an embodiment of the disclosure.

Referring to FIG. 19, the graph in FIG. 19 may show comparison of performances of the second magnet antenna 1501, 1701 using the magnet structure 1510, 1710 in the unfolded state (open mode) 100A and the folded state (close mode) 100B of the electronic device 100.

The x axis of the graph in FIG. 17 is an axis indicating a frequency (MHz) and Y axis is an axis indicating radiation efficiency [dB].

According to an embodiment, the second magnet antenna 1501, 1701 may transmit and/or receive a signal of Wi-Fi 2.4G (within a range of about 2,400 MHz to about 2,500 MHz). For another example, the antennas may transmit and/or receive a signal of Wi-Fi 5G (within about 5,000 MHz to 5,800 MHz).

According to an embodiment, referring to FIG. 19, the performances of the magnet antenna in the unfolded state (open mode) 100A and the folded state (close mode) 100B of the electronic device 100 may be substantially the same. For example, the performances of the magnet antenna in the unfolded state (open mode) 100A and the folded state (close mode) 100B within about 5,000 MHz to about 5,800 MHz may be substantially the same.

In case that the edge of the housing is used as an antenna radiator in the foldable electronic device, an antenna performance loss may occur in the folded state (close mode) 100B rather than the unfolded state (open mode) 100A. It is because in the folded state, as the edges of the first housing and the second housing are disposed adjacent to each other, coupling may occur and thus degradation in antenna performance may occur.

According to an embodiment, considering of the degradation in antenna performance of the foldable electronic device, performances of the second magnet antenna 1501, 1701 in the folded state (close mode) 100B and the unfolded state (open mode) 100A of the electronic device 100 may be substantially the same in a frequency band within a range of about 5,000 MHz to about 5,800 MHz.

Figure 20:
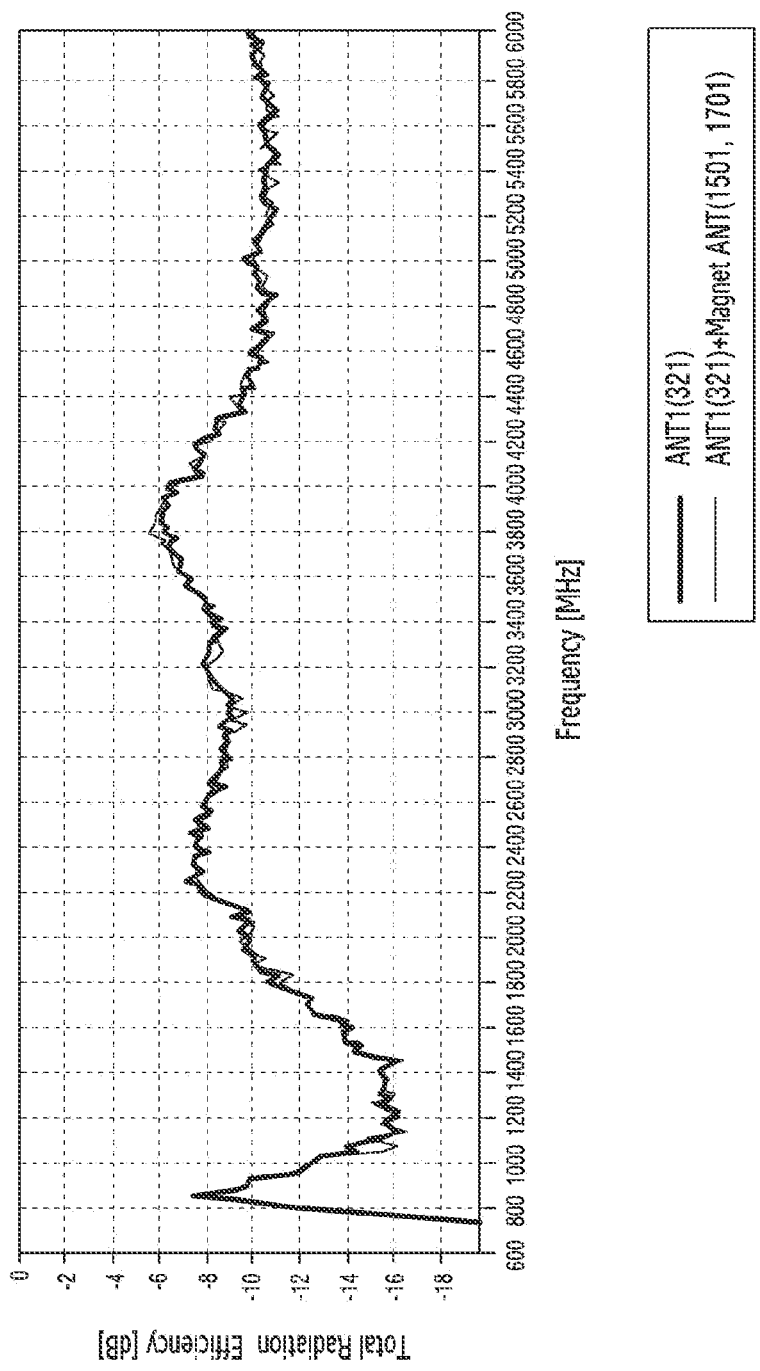
FIG. 20 illustrates a graph comparing performances of a first antenna according to an embodiment of the disclosure.

FIG. 20 illustrates a graph comparing performances of a first antenna according to an embodiment of the disclosure.

According to an embodiment, FIG. 20 is a graph comparing performances of the first antenna radiator 321 of the electronic device 100 including the second magnet antenna 1501, 1701 and the first antenna radiator 321 of the electronic device 100 not including the second magnet antenna 1501, 1701.

For example, the graph in FIG. 20 is a graph indicating comparison of radiation efficiencies of the first antenna radiator 321 of a case that the second magnet antenna 1501, 1701 and the first antenna radiator 321 are formed together and a case that only the first antenna radiator 321 is formed.

Referring to FIGS. 3 and 20 according to an embodiment, the radiation efficiencies of the first antenna radiator 321 of the case that only the first antenna radiator 321 is formed and the case that the second magnet antenna 1501, 1701 and the first antenna radiator 321 are formed together may be substantially the same. In an embodiment, even in case that the second magnet antenna 1501, 1701 and the first antenna radiator 321 are closely disposed, the first antenna radiator 321 may not be interfered with the second magnet antenna 1501, 1701.

Figure 21:
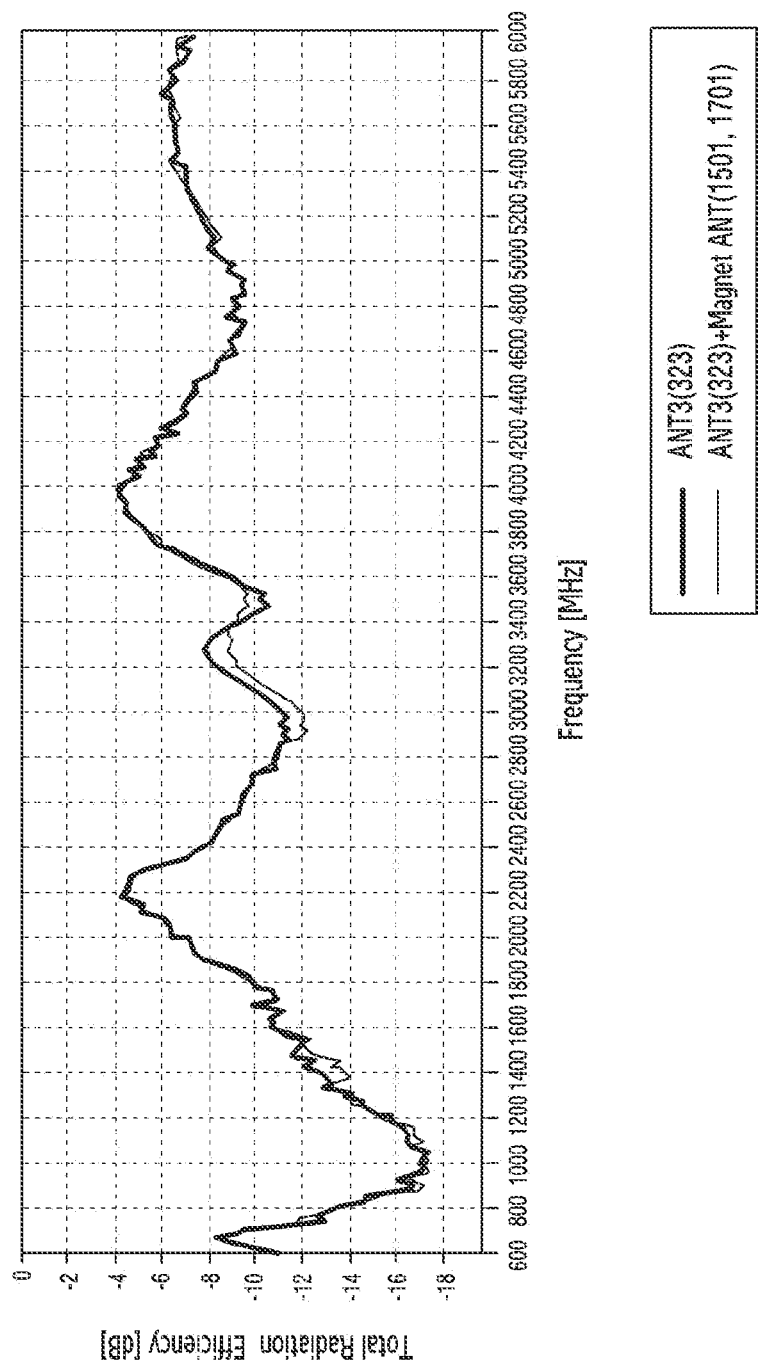
FIG. 21 illustrates a graph comparing performances of a third antenna according to an embodiment of the disclosure.

FIG. 21 illustrates a graph comparing performances of a third antenna according to an embodiment of the disclosure.

According to an embodiment, FIG. 21 is a graph comparing performances of the third antenna radiator 323 of the electronic device 100 including the second magnet antenna 1501, 1701 and the third antenna radiator 323 of the electronic device not including the second magnet antenna 1501, 1701.

For example, the graph in FIG. 13 is a graph indicating comparison of radiation efficiencies of the third antenna radiator 323 of a case that the second magnet antenna 1501, 1701 and the third antenna radiator 323 are formed together and a case that only the third antenna radiator 323 is formed.

Referring to FIGS. 3 and 21 according to an embodiment, the radiation efficiencies of the third antenna radiator 323 of the case that only the third antenna radiator 323 is formed and the case that the second magnet antenna 1501, 1701 and the third antenna radiator 323 are formed together may be substantially the same. In an embodiment, even in case that the second magnet antenna 1501, 1701 and the third antenna radiator 323 are closely disposed, the third antenna radiator 323 may not be interfered with the second magnet antenna 1501, 1701.

Figure 22:
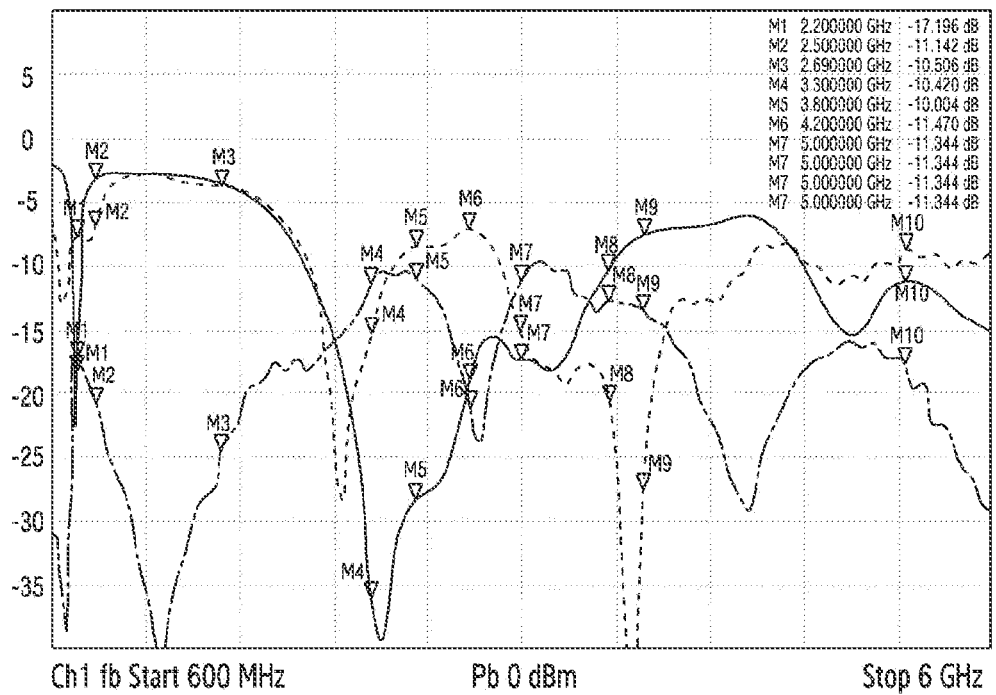
FIG. 22 illustrates a graph comparing radiation efficiencies of a first magnet antenna and a second antenna radiator according to an embodiment of the disclosure.

FIG. 22 illustrates a graph comparing radiation efficiencies of a first magnet antenna and a second antenna radiator according to an embodiment of the disclosure.

Referring to FIG. 22, the third antenna radiator 323 of the antenna radiator 320 may be disposed closer to the second magnet antenna 1501, 1701 than other an antenna radiator.

According to an embodiment, the graph of FIG. 22 illustrates an effect of radiation efficiency of an antenna according to adjacent disposal of the third antenna radiator 323 and the second magnet antenna 1501, 1701.

According to an embodiment, graph S11 may illustrate a reflection coefficient of the second magnet antenna 1501, 1701. According to an embodiment, graph S22 may illustrate a reflection coefficient of the third magnet antenna 323. According to an embodiment, graph S21 may illustrate radiation efficiency according to effects of the second magnet antenna 1501, 1701 and the third antenna radiator 323 to each other.

According to an embodiment, in case that the radiation efficiency is −10 dB or less, the radiation performances of the second antenna radiator 322 of the case that the first magnet antenna 401 is formed and the case that only the second antenna radiator 322 is formed may be substantially the same.

Referring to graph S21 in FIG. 22, in case that the second magnet antenna 1501, 1701 is formed, the radiation performance of the third radiator 323 may be −10 dB or less. According to an embodiment, referring to graph S21, the second magnet antenna 1501, 1701 may not substantially affect radiation performance of the third antenna radiator 323.

Figure 23:
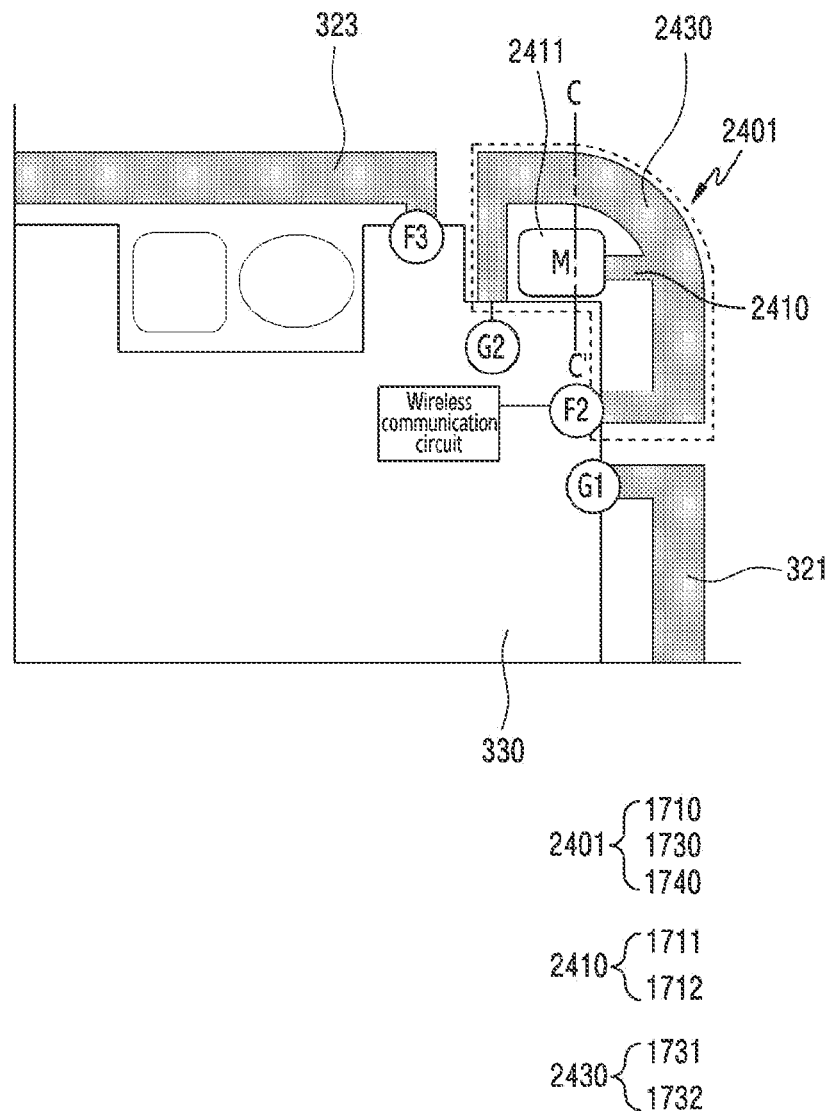
FIG. 23 illustrates a magnet structure according to an embodiment of the disclosure.

FIG. 23 illustrates a magnet structure according to an embodiment of the disclosure.

Figure 24:
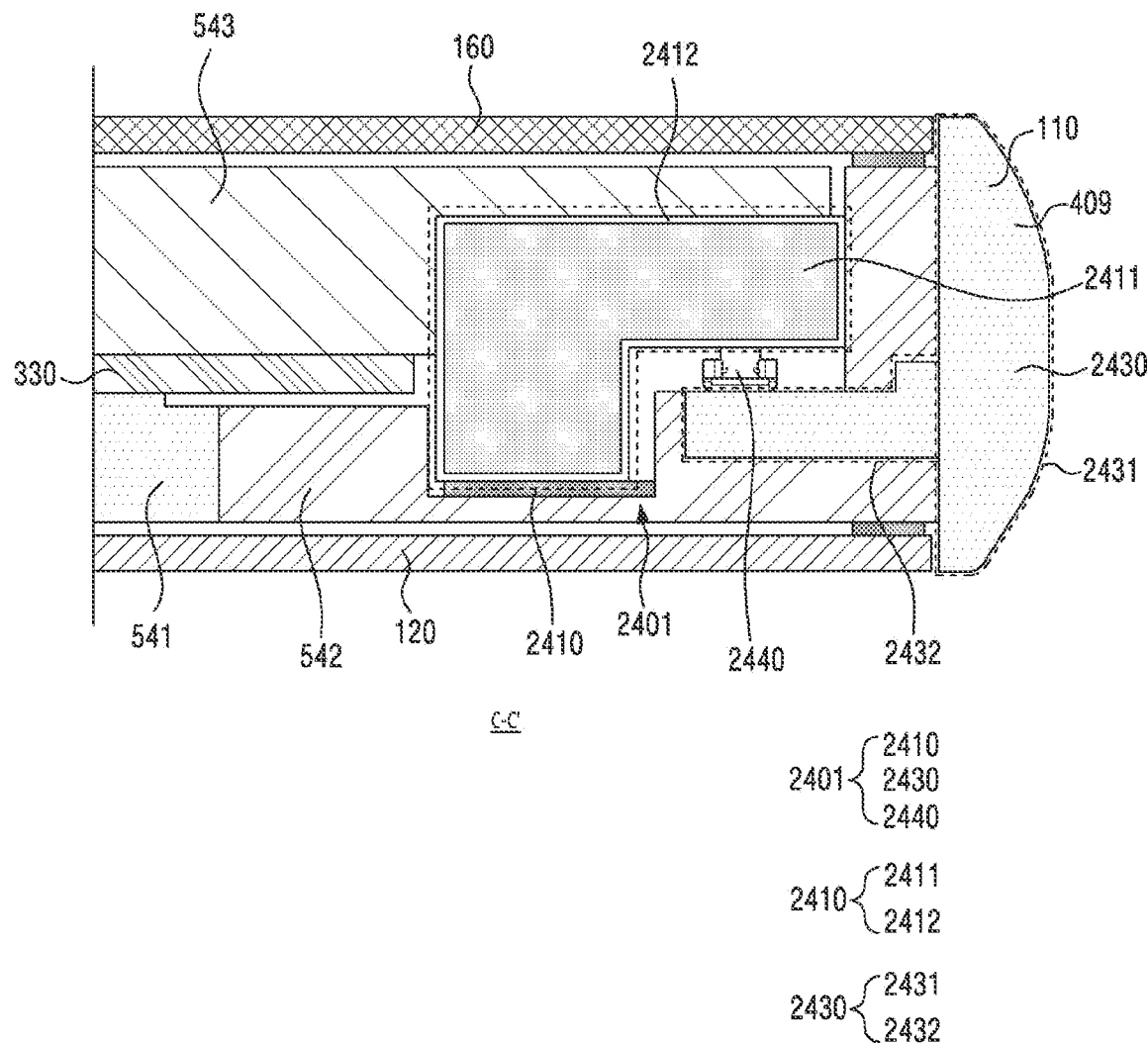
FIG. 24 illustrates a sectional view of the magnet structure in FIG. 23 taken along line C-C' according to an embodiment of the disclosure.

FIG. 24 illustrates a sectional view of the magnet structure in FIG. 23 taken along line C-C' according to an embodiment of the disclosure.

According to an embodiment, unlike the electronic device 100 in FIG. 15 to FIG. 18, the electronic device 100 in FIG. 23 may include a magnet structure 2410 not directly connected to the PCB 330.

According to an embodiment, a third magnet antenna 2401 may include the magnet structure 2410 and a conductive part 2430 of the first housing 111.

According to an embodiment, the magnet structure 2410 in FIG. 23 may be electrically connected to the conductive part 2430 of the lateral member 409 of the first housing 111. For example, a conductive coating member 2411 of the magnet structure 2410 may be electrically connected to a portion of the conductive part 2430 of the first housing 111 while not being directly connected to the PCB 330.

According to an embodiment, both ends of the conductive part 2430 of the lateral member 409 of the first housing 111 may be electrically connected to the PCB 330. For example, a portion of the conductive part 2430 may be electrically connected to the wireless communication circuit through the second feeding point F2. For example, another portion of the conductive part 2430 may be electrically connected to a ground on the PCB 330 through the second ground point G2.

According to an embodiment, a portion of the conductive part 2430 of the lateral member 409 of the first housing 111 may be electrically connected to the magnet structure 2410.

For example, referring to FIG. 24, the conductive part 2430 of the lateral member 409 of the first housing 111 may include a first area 2431 exposed to the outside of the electronic device 100 and a second area 2432 facing the inside of the electronic device 100.

The first area 2431 and the second area 2432 of the conductive part 2430 in FIG. 24 according to an embodiment may refer to the first area 1531 and the second area 1532 of the conductive part 1530 in FIG. 16.

Referring to FIG. 23 according to an embodiment, the magnet structure 2410 may not be directly connected to the PCB 330 while being electrically connected to the second area 2432 of the conductive part 2430. For example, the magnet structure 2410 may be electrically connected to the second area 2432 of the conductive part 2430 by a third conductive connection member 2440 formed on the second area 2432.

According to an embodiment, the wireless communication circuit may feed a portion of the conductive part 2430 of the first housing 111 electrically connected to the PCB 330 through the second feeding point F2 to transmit and/or receive a signal in a designated seventh frequency band by using the third magnet antenna 2401 as an antenna radiator.

According to an embodiment, a third magnet antenna 2401 may be an antenna including the conductive part 2430 and conductive coating member 2412 of the magnet structure 2410.

According to an embodiment, as the magnet structure 2410 is not directly connected to the PCB 330 but connected to the second area 2432 of the conductive part 2430, the electronic device 100 in FIG. 23 may transmit and/or receive a signal in a seventh frequency band based on an electrical path distinguished from that of the electronic device 100 in FIG. 15 to FIG. 17.

According to an embodiment, by using the magnet structure 2410 as an antenna radiator, the electronic device 100 may additionally secure a radiation efficient volume of an antenna and thus radiation performance of the antenna of the electronic device 100 may be improved. Furthermore, by securing the efficient volume, the size of the housing 110 is not increased and thus the electronic device 100 may provide a portable electronic device to a user.

Figure 25:
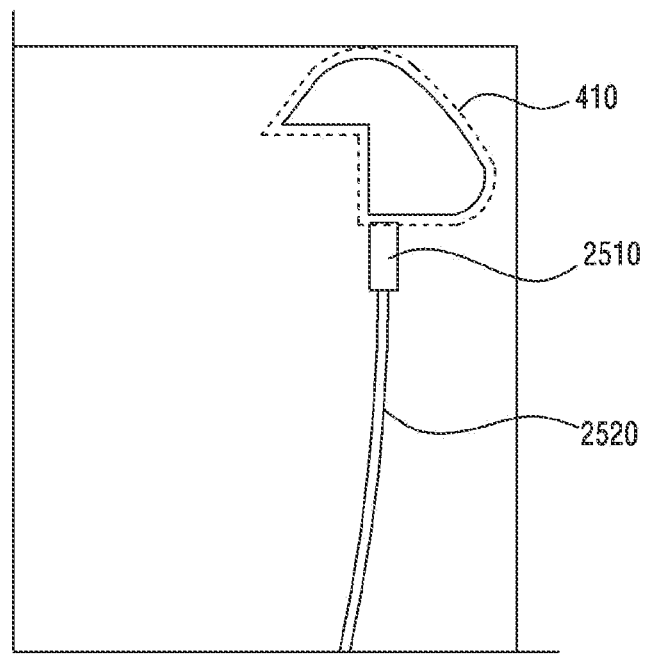
FIG. 25 illustrates a magnet structure and a switching module according to an embodiment of the disclosure.

FIG. 25 illustrates a magnet structure and a switching module according to an embodiment of the disclosure.

According to an embodiment, the electronic device 100 may further include a switching module 2510. For example, the electronic device 100 may further include the switching module 2510 including at least one lumped element (e.g., an inductor or a capacitor) for impedance matching.

According to an embodiment, the magnet structure 410 may be electrically connected to the PCB 330 by the switching module 2510. For example, the conductive coating member 412 of the magnet structure 410 may be electrically connected to the wireless communication circuit of the PCB 330 through the switching module 2510 including at least one lumped element. According to another embodiment, the switching module 2510 may be electrically connected to the PCB 330 by the conductive connection member 2520.

According to an embodiment, the conductive connection member 2520 may include a coaxial cable.

According to an embodiment, it is described that the conductive connection member 2520 and the switching module 2510 are separate components, but is not limited thereto. For example, conductive connection member 2520 may be formed of at least one connection member including the switching module 2510.

According to an embodiment, the wireless communication circuit in the electronic device 100 may control the switching module 2510. For example, the wireless communication circuit may control the switching module 2510 to cause the switching module 2510 to perform impedance matching corresponding to the designated frequency band.

According to an embodiment, the magnet structure 410 may be electrically connected to the switching module 2510 to transmit and/or receive a signal in various frequency bands. For example, a resonant frequency of the first antenna using the magnet structure 410 may be shifted through the switching module 2510.

The resonant frequency shift by the switching module 2510 and the performance change of the first antenna will be described in detail with reference to FIGS. 26 and 27.

Figure 26:
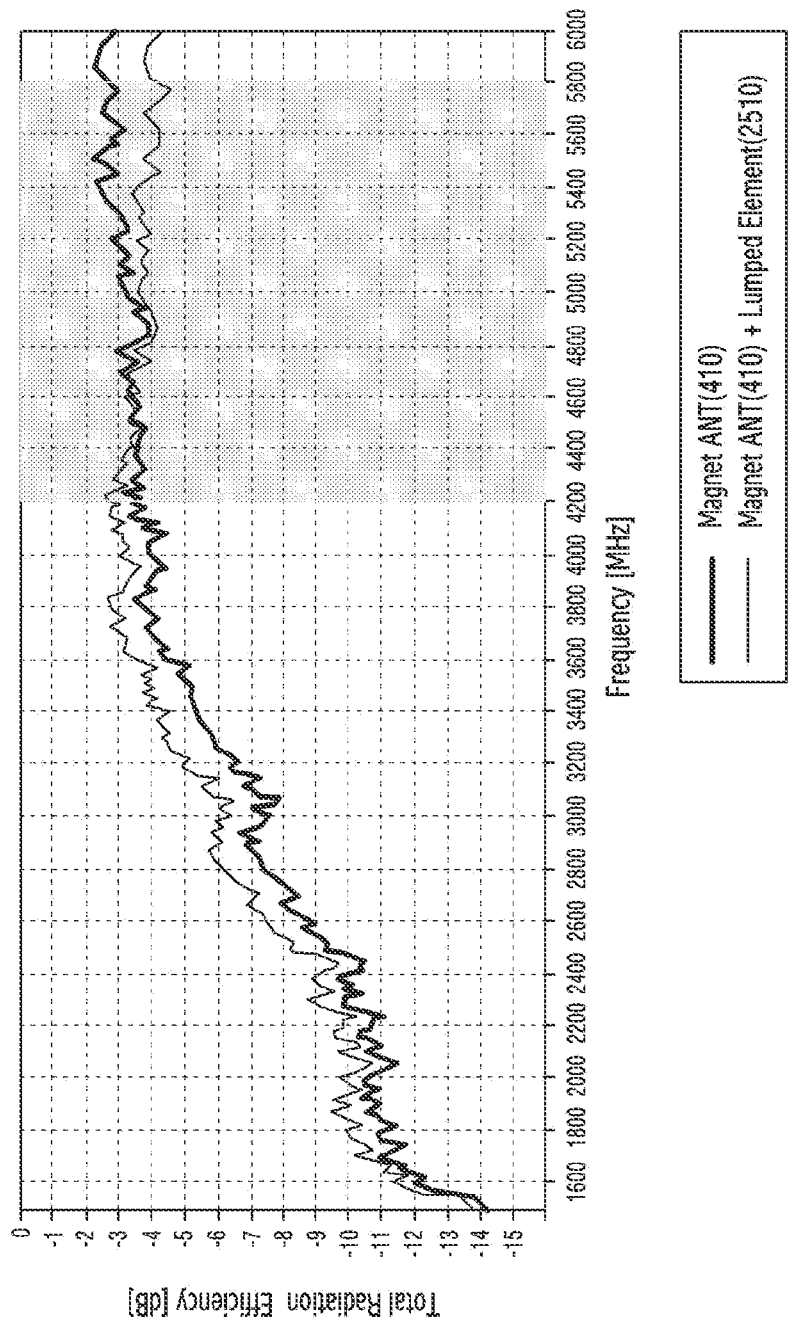
FIG. 26 illustrates a graph comparing radiation efficiencies of a magnet antenna according to an embodiment of the disclosure.

FIG. 26 illustrates a graph comparing radiation efficiencies of a magnet antenna according to an embodiment of the disclosure.

According to an embodiment, FIG. 26 is a graph comparing radiation efficiencies of the first magnet antenna 401 and the first magnet antenna 401 further including a switching module (e.g., the switching module 2510 in FIG. 25). For example, the switching module 2510 may include a lumped element and FIG. 26 is a graph comparing radiation efficiencies of the first magnet antenna 401 and the first magnet antenna 401 including the lumped element.

The x axis of the graph in FIG. 26 indicates a frequency [MHz] and Y axis indicates radiation efficiency [dB].

According to an embodiment, as the electronic device 100 further includes the switching module 2510, the first magnet antenna 401 may adjust a resonance of a frequency through impedance matching. For example, as the electronic device 100 further includes a lumped element of the switching module 2510, the first magnet antenna 401 may adjust a resonance of a frequency through impedance matching.

For example, the first magnet antenna 401 including the lumped element of the switching module 2510 may transmit and/or receive a signal in a frequency band within a range of about 4,200 MHz to about 6,000 MHz. According to an embodiment, in the frequency band within a range of about 4,200 MHz to about 6,000 MHz, the first magnet antenna 401 may adjust a resonance of a frequency by using the lumped element of the switching module 2510.

Figure 27:
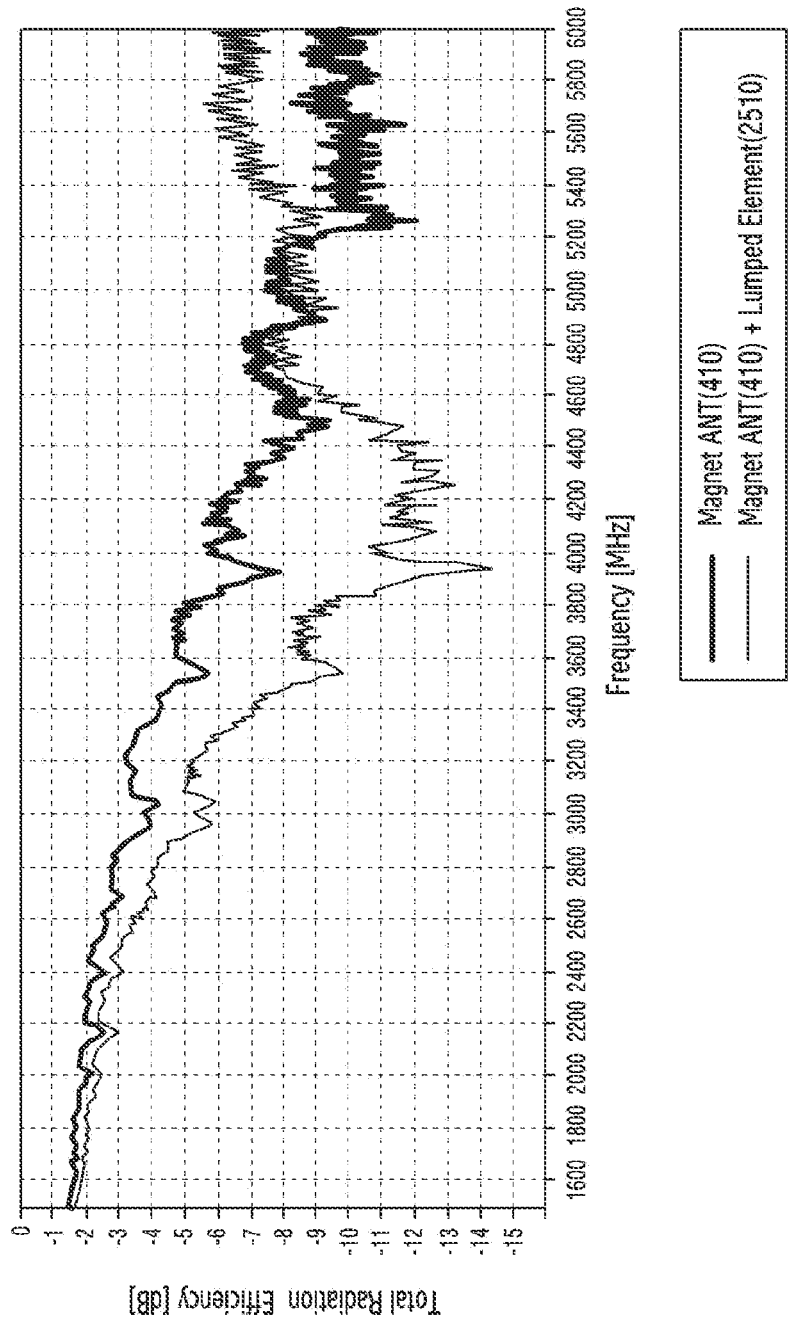
FIG. 27 illustrates a graph comparing reflection coefficients of a first magnet antenna according to an embodiment of the disclosure.

FIG. 27 illustrates a graph comparing reflection coefficients of a first magnet antenna according to an embodiment of the disclosure.

Unlike the graph in FIG. 26, the graph in FIG. 27 shows a reflection coefficient [dB] of the first magnet antenna 401 further including the lumped element of the switching module 2510 of the first magnet antenna 401.

According to an embodiment, as the electronic device 100 further includes the switching module 2510 including a lumped element, a resonant frequency of the first magnet antenna 401 using the first magnet antenna 401 may be shifted. For example, as the electronic device 100 uses the switching module 2510 including the lumped element, a range of the resonant frequency band may be shifted from a range within about 5,200 MHz to about 6,000 MHz to a range within about 3,200 MHz to about 5,000 MHz.

According to an embodiment, by further including the switching module 2510, the electronic device 100 may transmit and/or receive a signal in various frequency bands.

Referring to FIGS. 25 to 27, the first magnet antenna 401 is described as an example, but is not limited thereto. For example, the second magnet antenna (1501 in FIGS. 15 and 1701 in FIG. 17) and the third magnet antenna (2401 in FIG. 24) may further include the switching module 2510.

Figure 28:
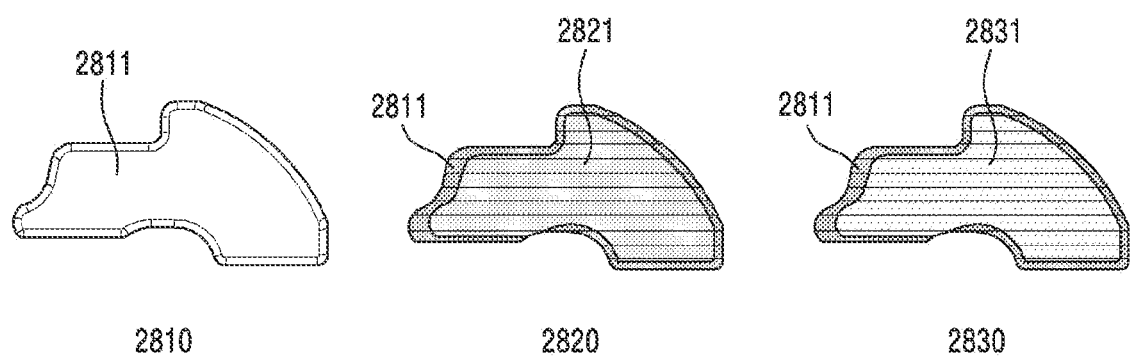
FIG. 28 illustrates a magnet of a magnet structure according to an embodiment of the disclosure.

FIG. 28 illustrates a magnet of a magnet structure according to an embodiment of the disclosure.

Referring to FIG. 28, the magnet structure 410 may be implemented as at least one of the magnet structure 2820 or the magnet structure 2821.

According to an embodiment, the magnet structure 410 may include the magnet 411 and the conductive coating member 412 enclosing a surface of the magnet 411.

According to an embodiment, a structure 2820, 2830 to be described below may refer to the magnet structure 410 in FIG. 4, and a magnet 2821, 2831 to be described below may refer to the magnet 411 in FIGS. 3 and 4.

According to an embodiment, the first structure 2810 may only the conductive coating member 2811 without the magnet.

According to an embodiment, the second structure 2820 may include the magnet 2821 and the conductive coating member 2811 enclosing the magnet 2821. According to an embodiment, the magnet 2821 may be formed of ferrite.

According to an embodiment, the magnet 2831 of the third structure 2830 may be formed of neodymium unlike the magnet 2821 of the second structure 2820.

According to an embodiment, as the magnet 2831 is formed of neodymium, a magnetic force stronger than that of ferrite of the magnet 2831 may be secured. According to an embodiment, as the magnet 2831 has a stronger magnetic force, the electronic device 100 may maintain the folding state more easily.

According to an embodiment, the material forming the magnet 2821, 2831 is described as ferrite or neodymium, but is not limited thereto. For example, the magnet may be formed as a samarium-cobalt (Sm—Cm) magnet or an alnico magnet.

According to an embodiment, the conductive coating member 2811 may be formed of nickel (Ni), but is not limited thereto. For another example, the conductive member 2811 may be formed of silver, copper, gold, aluminum, iron, graphite, and/or lead.

According to an embodiment, in case that the magnet 2821, 2831 formed of neodymium or ferrite is exposed to air, corrosion may occur.

According to an embodiment, as the conductive coating member 2811 is formed to enclose the magnet 2821, 2831, the conductive coating member 2811 may prevent the magnet 2821, 2831 from corrosion. As conductive coating member 2811 is formed, the electronic device 100 may transmit and/or receive a signal in a designated frequency band by using the magnet structure.

Figure 29:
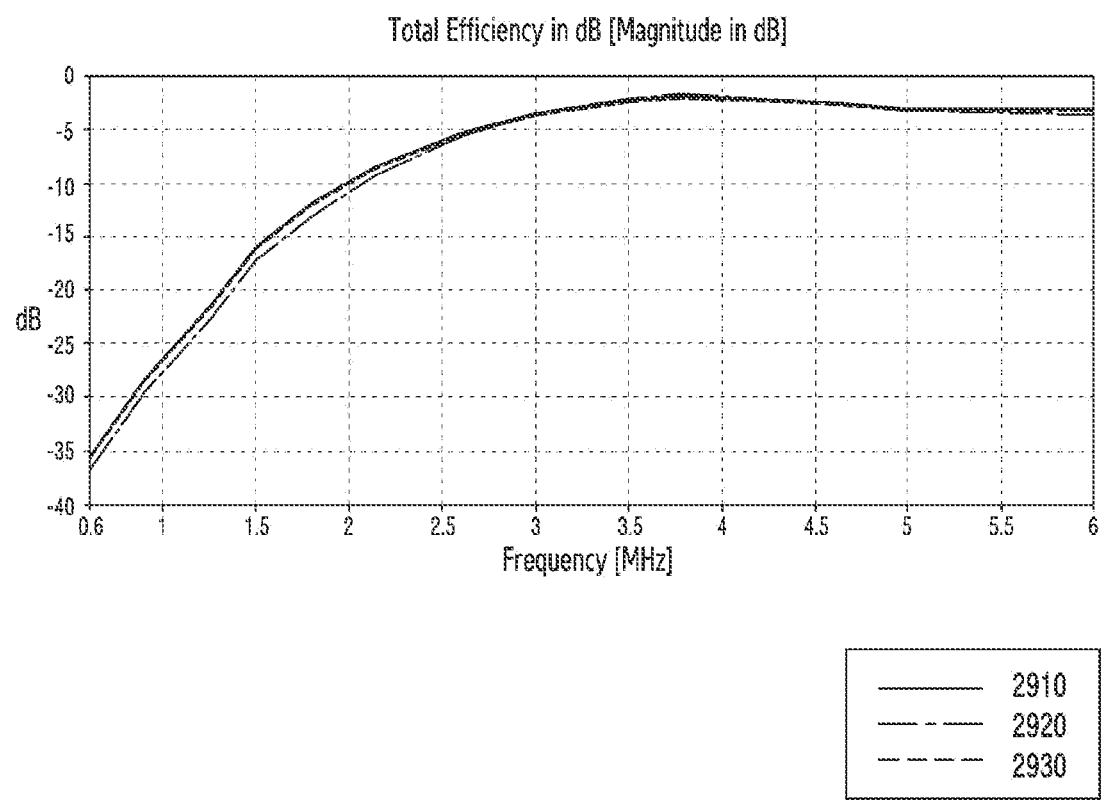
FIG. 29 illustrates a graph comparing antenna performances of a first magnet antenna according to a type of a structure in FIG. 28 according to an embodiment of the disclosure.

FIG. 29 illustrates a graph comparing antenna performances of a first magnet antenna 401 according to a type of the magnet structure 410 in FIG. 28 according to an embodiment of the disclosure.

According to an embodiment, graph 2910 shows a radiation efficiency in case that the first structure 2810 formed only by the conductive member 2811 in FIG. 28 is used as an antenna radiator.

According to an embodiment, graph 2920 shows a radiation efficiency in case that the second structure 2820 including the magnet 2821 formed of ferrite in FIG. 28 is used as an antenna radiator.

According to an embodiment, graph 2930 shows a radiation efficiency in case that the third structure 2830 including the magnet 2831 formed of neodymium in FIG. 28 is used as an antenna radiator.

Referring to the graph in FIG. 29 according to an embodiment, radiation performances of the magnet antenna in a case 2910 of not including the magnet and cases 2920, 2930 of using different types of magnets may be substantially the same.

Figure 30:
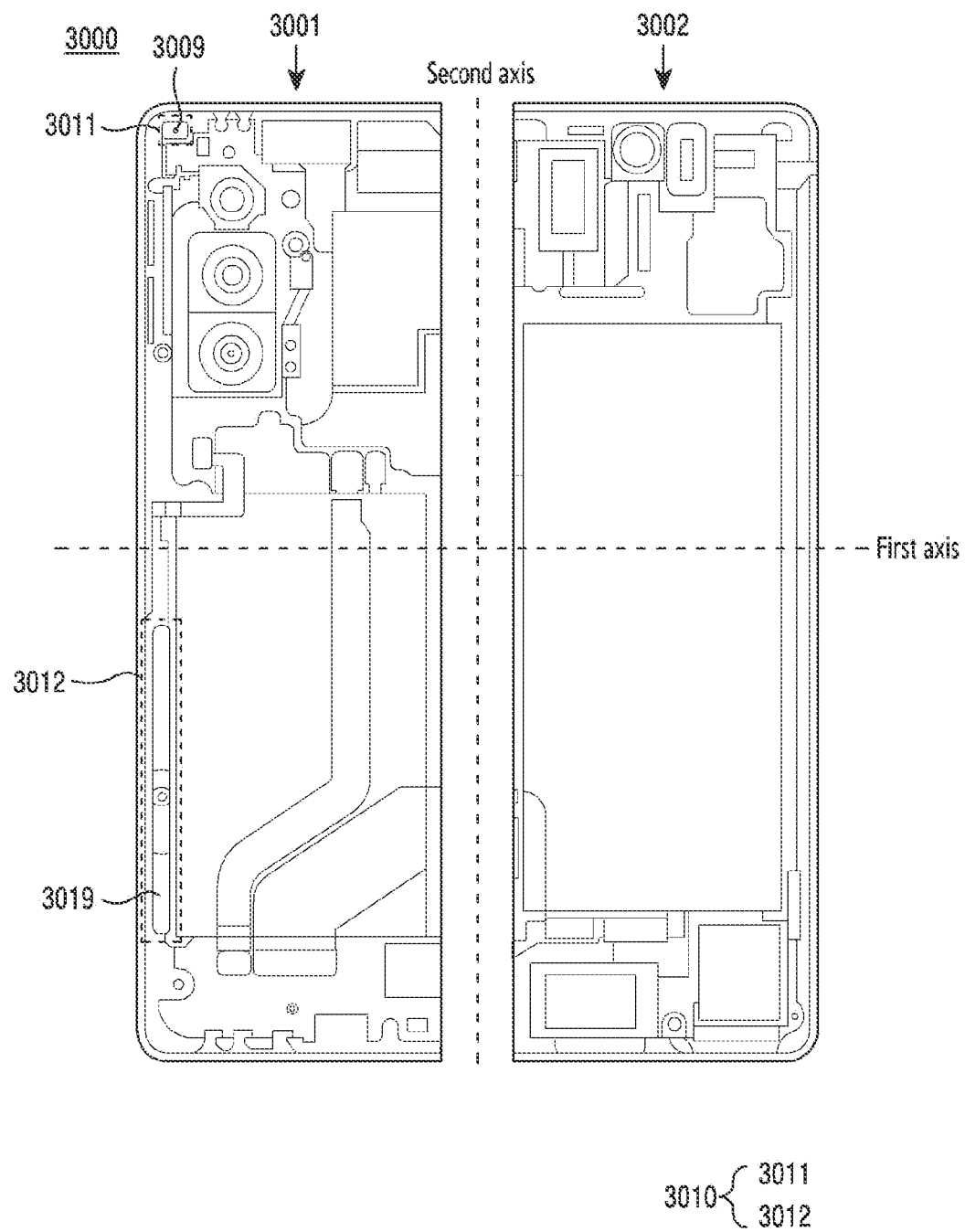
FIG. 30 illustrates a front surface of an electronic device according to an embodiment of the disclosure.

FIG. 30 illustrates a front surface of an electronic device according to an embodiment of the disclosure.

Unlike the electronic device 100 in FIG. 1, in the electronic device 3000 in FIG. 30, a folding axis may be formed as the second axis perpendicular to the first axis.

According to an embodiment, the electronic device 3000 may include a first housing 3001 and a second housing 3002. According to an embodiment, the second housing 3002 may rotate around the second axis to be folded with respect to the first housing 3001.

According to an embodiment, the electronic device 3000 may include multiple magnet structures 3010. For example, the electronic device 3000 may include a first magnet structure 3011 and a second magnet structure 3012.

According to an embodiment, the magnet structure 3010 and the magnet 3009 may refer to the magnet structure 310 in FIG. 3 and the magnet structure 410 in FIG. 4. For example, the magnet structure 3011 may include the first magnet 3009 and a conductive coating member (not shown) formed to enclose a surface of the first magnet 3009. For example, the first magnet structure 3011 may include a magnet formed of ferrite and a conductive coating member formed of nickel.

For example, the second magnet structure 3012 may include a second magnet 3019 and a conductive coating member (not shown) formed to enclose a surface of the second magnet 3019. For example, the second magnet structure 3012 may include a magnet formed of ferrite and a conductive coating member formed of nickel.

Referring to FIG. 30, it is described that the first magnet structure 3011 and the second magnet structure 3012 are disposed inside the first housing 3001, but are not limited thereto. For another example, the first magnet structure 3011 may be positioned inside the second housing 3002.

For still another example, the first magnet structure 3011 and/or the second magnet structure 3012 may be positioned inside the first housing 3001 while being spaced apart from an edge of the first housing 3001.

According to an embodiment, the electronic device 3000 may include a first magnet structure 3011 and a second magnet structure 3012 to maintain the folding state around the second axis.

According to an embodiment, the electronic device 3000 may use the magnet structure 3010 including multiple magnets as an antenna radiator.

According to an embodiment, the wireless communication circuit (not shown) of the electronic device 3000 may transmit and/or receive a signal in a designated frequency band by feeding the conductive coating member of the first magnet structure 3011. For example, an antenna using the first magnet structure 3011 as an antenna radiator may refer to the first magnet antenna 401, 701, 901 using the first magnet structure 410, 710, 910 in FIGS. 4 to 9.

According to another embodiment, the wireless communication circuit (not shown) of the electronic device 3000 may transmit and/or receive a signal in a designated frequency band by using the first magnet structure 3011 and the conductive part of the first housing 3001 as an antenna radiator. For example, an antenna using the first magnet structure 3011 and the conductive part of the first housing 3001 as an antenna radiator may refer to the second magnet antenna 1501, 1701 and/or the third magnet antenna 2401 in FIGS. 15 to 24.

According to an embodiment, the magnet structure 3010 in FIG. 30 is described taking the first magnet structure 3011 as an example, but is not limited thereto. For example, the second magnet structure 3012 may include a magnet formed of ferrite and a conductive coating member formed of nickel to enclose the magnet.

Figure 31:
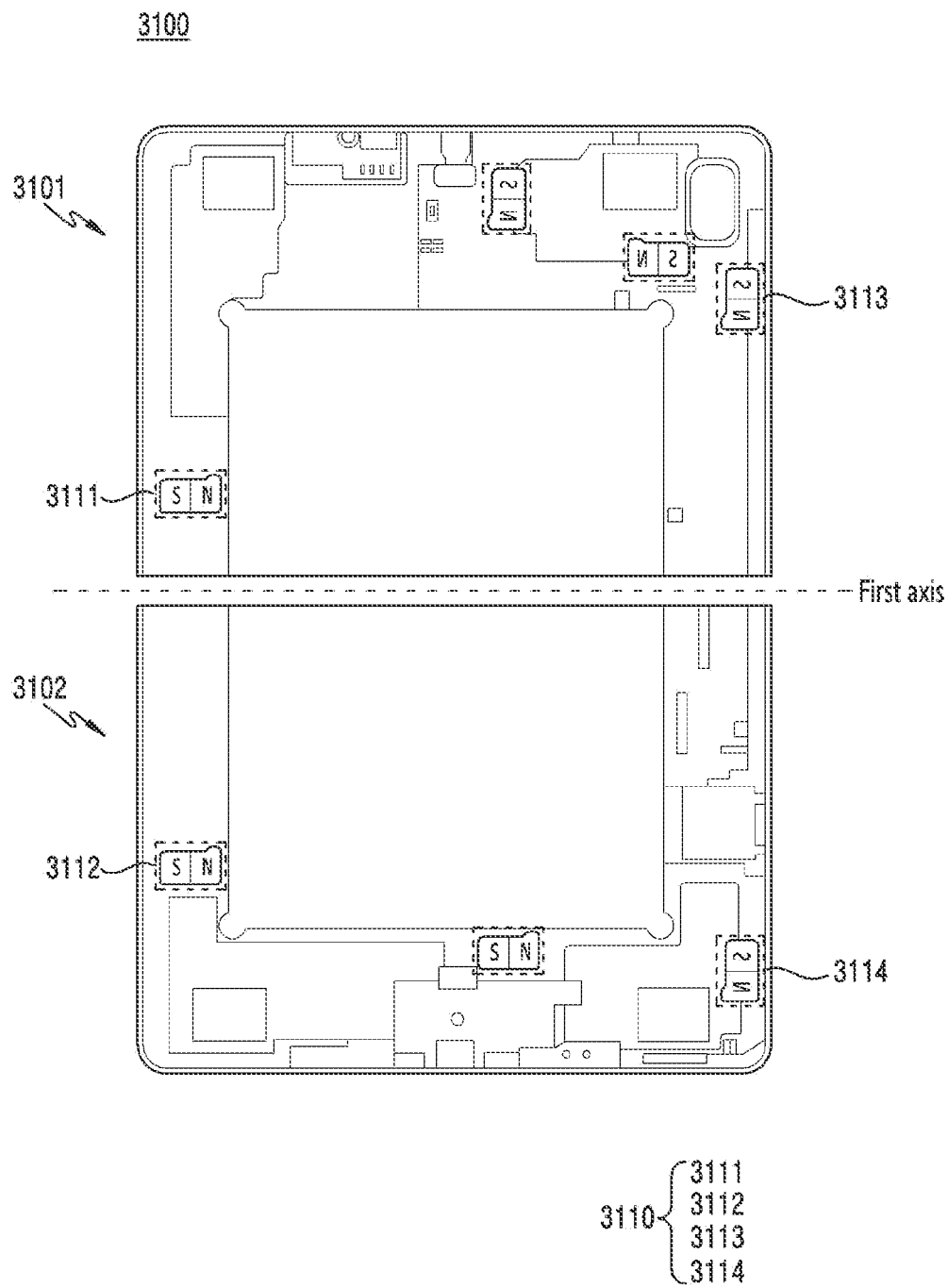
FIG. 31 illustrates a computer device according to an embodiment of the disclosure.

FIG. 31 illustrates a computer device according to an embodiment of the disclosure.

Referring to FIG. 31, the electronic device 3100 may be formed as a computer device (e.g., hereinafter, the electronic device 3100 will be referred to as a computer device) unlike the electronic device 100 in FIG. 1 and the electronic device 3000 in FIG. 30.

According to an embodiment, the computer device 3100 may include a housing including a first housing 3101 and a second housing 3102. According to an embodiment, the first housing 3101 and the second housing 3102 may be formed to be rotatable around the first axis by a hinge structure.

According to an embodiment, a portion of the housing of the computer device 3100 may be formed of a conductive part. For example, a portion of an edge of the housing of the computer device 3100 may be formed of a conductive part and non-conductive part.

The material forming the edge of the housing of the computer device 3100 may refer to the electronic device 100 in FIG. 1.

According to an embodiment, the electronic device 3100 may include a magnet structure 3110. For example, the magnet structure 3110 may be disposed on one area inside the computer device 3100 adjacent to the conductive part of the edge of the housing of the computer device 3100.

According to an embodiment, multiple magnet structures 3110 may be formed.

The magnet structure 3110 of the electronic device 3100 in FIG. 31 may refer to the magnet structure 410 of the electronic device 100 in FIG. 4. For example, the magnet of the magnet structure 3110 may be disposed inside the computer device 3100 so that the first housing 3101 and the second housing 3102 of the computer device 3100 may maintain the folding state.

According to an embodiment, the magnet structure 3110 may include a first magnet structure 3111, a second magnet structure 3112, a third magnet structure 3113, and/or a fourth magnet structure 3114.

Referring to FIG. 31, the first magnet structure 3111 to the fourth magnet structure 3114 are illustrated, but are not limited thereto. For example, a fifth magnet structure (not shown) may be further included.

According to an embodiment, the first magnet structure 3111 may include a magnet (e.g., the magnet 411 in FIG. 5) and a conductive coating member (e.g., the conductive coating member 412 in FIG. 5) enclosing the magnet. For example, the first magnet structure 3111 may include a conductive coating member formed of nickel and a magnet formed of ferrite.

According to an embodiment, the wireless communication circuit disposed in the computer device 3100 may transmit and/or receive a signal in a designated frequency band by using the first magnet structure 3111 as an antenna radiator.

According to another embodiment, the wireless communication circuit of the computer device 3100 may feed the conductive coating member of the first magnet structure 3111 to transmit and/or receive a signal in a designated frequency band by using the conductive coating member as an antenna radiator. For example, an antenna using the first magnet structure 3111 as an antenna radiator may refer to the first magnet antenna 401, 701, 901 using the first magnet structure 410, 710, 910 in FIGS. 4 to 9.

According to another embodiment, the wireless communication circuit may feed the conductive part to transmit and/or receive a signal in a designated frequency band by using the conductive part of the first housing 3101 as an antenna radiator. For example, an antenna using the first magnet structure 3111 and the conductive part of the first housing 3101 as an antenna radiator may refer to the second magnet antenna 1501, 1701 and/or the third magnet antenna 2401 in FIGS. 15 to 24.

According to an embodiment, the magnet structure 3110 in FIG. 31 is described taking the first magnet structure 3111 as an example, but is not limited thereto. For example, the second magnet structure 3112 may include a magnet formed of ferrite and a conductive coating member formed of nickel to enclose the magnet.

Figure 32:
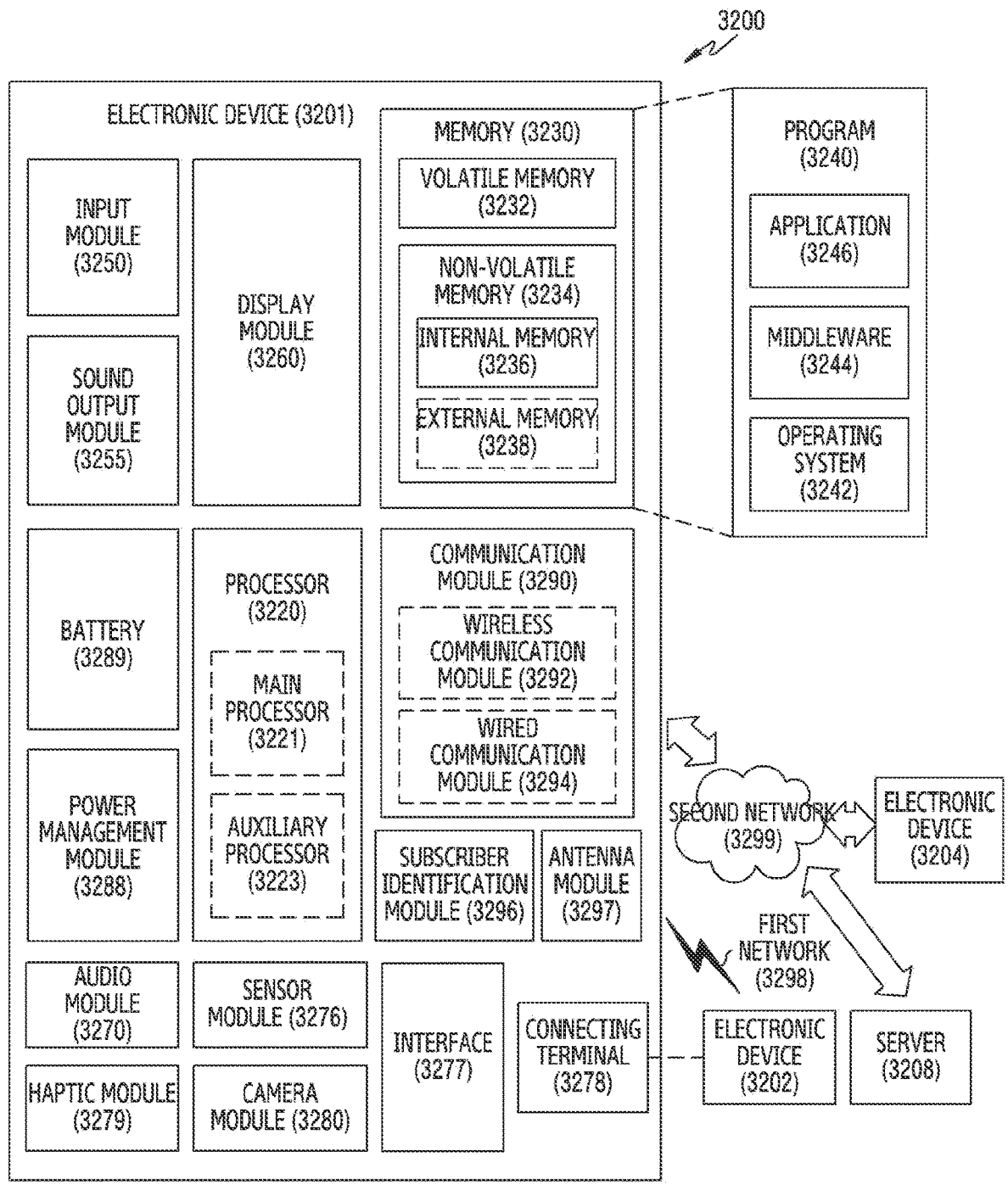
FIG. 32 is a view illustrating an electronic device in a network environment according to an embodiment of the disclosure.

FIG. 32 is a block diagram illustrating an electronic device 3201 in a network environment 3200 according to various embodiments.

Referring to FIG. 32, the electronic device 3201 in the network environment 3200 may communicate with an electronic device 3202 via a first network 3298 (e.g., a short-range wireless communication network), or at least one of an electronic device 3204 or a server 3208 via a second network 3299 (e.g., a long-range wireless communication network). According to an embodiment, the electronic device 3201 may communicate with the electronic device 3204 via the server 3208. According to an embodiment, the electronic device 3201 may include a processor 3220, memory 3230, an input module 3250, a sound output module 3255, a display module 3260, an audio module 3270, a sensor module 3276, an interface 3277, a connecting terminal 3278, a haptic module 3279, a camera module 3280, a power management module 3288, a battery 3289, a communication module 3290, a subscriber identification module(SIM) 3296, or an antenna module 3297. In some embodiments, at least one of the components (e.g., the connecting terminal 3278) may be omitted from the electronic device 3201, or one or more other components may be added in the electronic device 3201. In some embodiments, some of the components (e.g., the sensor module 3276, the camera module 3280, or the antenna module 3297) may be implemented as a single component (e.g., the display module 3260).

The processor 3220 may execute, for example, software (e.g., a program 3240) to control at least one other component (e.g., a hardware or software component) of the electronic device 3201 coupled with the processor 3220, and may perform various data processing or computation. According to one embodiment, as at least part of the data processing or computation, the processor 3220 may store a command or data received from another component (e.g., the sensor module 3276 or the communication module 3290) in volatile memory 3232, process the command or the data stored in the volatile memory 3232, and store resulting data in non-volatile memory 3234. According to an embodiment, the processor 3220 may include a main processor 3221 (e.g., a central processing unit (CPU) or an application processor (AP)), or an auxiliary processor 3223 (e.g., a graphics processing unit (GPU), a neural processing unit (NPU), an image signal processor (ISP), a sensor hub processor, or a communication processor (CP)) that is operable independently from, or in conjunction with, the main processor 3221. For example, when the electronic device 3201 includes the main processor 3221 and the auxiliary processor 3223, the auxiliary processor 3223 may be adapted to consume less power than the main processor 3221, or to be specific to a specified function. The auxiliary processor 3223 may be implemented as separate from, or as part of the main processor 3221.

The auxiliary processor 3223 may control at least some of functions or states related to at least one component (e.g., the display module 3260, the sensor module 3276, or the communication module 3290) among the components of the electronic device 3201, instead of the main processor 3221 while the main processor 3221 is in an inactive (e.g., sleep) state, or together with the main processor 3221 while the main processor 3221 is in an active state (e.g., executing an application). According to an embodiment, the auxiliary processor 3223 (e.g., an image signal processor or a communication processor) may be implemented as part of another component (e.g., the camera module 3280 or the communication module 3290) functionally related to the auxiliary processor 3223. According to an embodiment, the auxiliary processor 3223 (e.g., the neural processing unit) may include a hardware structure specified for artificial intelligence model processing. An artificial intelligence model may be generated by machine learning. Such learning may be performed, e.g., by the electronic device 3201 where the artificial intelligence is performed or via a separate server (e.g., the server 3208). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 3230 may store various data used by at least one component (e.g., the processor 3220 or the sensor module 3276) of the electronic device 3201. The various data may include, for example, software (e.g., the program 3240) and input data or output data for a command related thererto. The memory 3230 may include the volatile memory 3232 or the non-volatile memory 3234.

The program 3240 may be stored in the memory 3230 as software, and may include, for example, an operating system (OS) 3242, middleware 3244, or an application 3246.

The input module 3250 may receive a command or data to be used by another component (e.g., the processor 3220) of the electronic device 3201, from the outside (e.g., a user) of the electronic device 3201. The input module 3250 may include, for example, a microphone, a mouse, a keyboard, a key (e.g., a button), or a digital pen (e.g., a stylus pen).

The sound output module 3255 may output sound signals to the outside of the electronic device 3201. The sound output module 3255 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 3260 may visually provide information to the outside (e.g., a user) of the electronic device 3201. The display module 3260 may include, for example, a display, a hologram device, or a projector and control circuitry to control a corresponding one of the display, hologram device, and projector. According to an embodiment, the display module 3260 may include a touch sensor adapted to detect a touch, or a pressure sensor adapted to measure the intensity of force incurred by the touch.

The audio module 3270 may convert a sound into an electrical signal and vice versa. According to an embodiment, the audio module 3270 may obtain the sound via the input module 3250, or output the sound via the sound output module 3255 or a headphone of an external electronic device (e.g., an electronic device 3202) directly (e.g., wiredly) or wirelessly coupled with the electronic device 3201.

The sensor module 3276 may detect an operational state (e.g., power or temperature) of the electronic device 3201 or an environmental state (e.g., a state of a user) external to the electronic device 3201, and then generate an electrical signal or data value corresponding to the detected state. According to an embodiment, the sensor module 3276 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 3277 may support one or more specified protocols to be used for the electronic device 3201 to be coupled with the external electronic device (e.g., the electronic device 3202) directly (e.g., wiredly) or wirelessly. According to an embodiment, the interface 3277 may include, for example, a high definition multimedia interface (HDMI), a universal serial bus (USB) interface, a secure digital (SD) card interface, or an audio interface.

A connecting terminal 3278 may include a connector via which the electronic device 3201 may be physically connected with the external electronic device (e.g., the electronic device 3202). According to an embodiment, the connecting terminal 3278 may include, for example, a HDMI connector, a USB connector, a SD card connector, or an audio connector (e.g., a headphone connector).

The haptic module 3279 may convert an electrical signal into a mechanical stimulus (e.g., a vibration or a movement) or electrical stimulus which may be recognized by a user via his tactile sensation or kinesthetic sensation. According to an embodiment, the haptic module 3279 may include, for example, a motor, a piezoelectric element, or an electric stimulator.

The camera module 3280 may capture a still image or moving images. According to an embodiment, the camera module 3280 may include one or more lenses, image sensors, image signal processors, or flashes.

The power management module 3288 may manage power supplied to the electronic device 3201. According to one embodiment, the power management module 3288 may be implemented as at least part of, for example, a power management integrated circuit (PMIC).

The battery 3289 may supply power to at least one component of the electronic device 3201. According to an embodiment, the battery 3289 may include, for example, a primary cell which is not rechargeable, a secondary cell which is rechargeable, or a fuel cell.

The communication module 3290 may support establishing a direct (e.g., wired) communication channel or a wireless communication channel between the electronic device 3201 and the external electronic device (e.g., the electronic device 3202, the electronic device 3204, or the server 3208) and performing communication via the established communication channel. The communication module 3290 may include one or more communication processors that are operable independently from the processor 3220 (e.g., the application processor (AP)) and supports a direct (e.g., wired) communication or a wireless communication. According to an embodiment, the communication module 3290 may include a wireless communication module 3292 (e.g., a cellular communication module, a short-range wireless communication module, or a global navigation satellite system (GNSS) communication module) or a wired communication module 3294 (e.g., a local area network (LAN) communication module or a power line communication (PLC) module). A corresponding one of these communication modules may communicate with the external electronic device via the first network 3298 (e.g., a short-range communication network, such as Bluetooth™, wireless-fidelity (Wi-Fi) direct, or infrared data association (IrDA)) or the second network 3299 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 3292 may identify and authenticate the electronic device 3201 in a communication network, such as the first network 3298 or the second network 3299, using subscriber information (e.g., international mobile subscriber identity (IMSI)) stored in the subscriber identification module 3296.

The wireless communication module 3292 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 3292 may support a high-frequency band (e.g., the mmWave band) to achieve, e.g., a high data transmission rate. The wireless communication module 3292 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 3292 may support various requirements specified in the electronic device 3201, an external electronic device (e.g., the electronic device 3204), or a network system (e.g., the second network 3299). According to an embodiment, the wireless communication module 3292 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 3297 may transmit or receive a signal or power to or from the outside (e.g., the external electronic device) of the electronic device 3201. According to an embodiment, the antenna module 3297 may include an antenna including a radiating element composed of a conductive material or a conductive pattern formed in or on a substrate (e.g., a printed circuit board (PCB)). According to an embodiment, the antenna module 3297 may include a plurality of antennas (e.g., array antennas). In such a case, at least one antenna appropriate for a communication scheme used in the communication network, such as the first network 3298 or the second network 3299, may be selected, for example, by the communication module 3290 (e.g., the wireless communication module 3292) from the plurality of antennas. The signal or the power may then be transmitted or received between the communication module 3290 and the external electronic device via the selected at least one antenna. According to an embodiment, another component (e.g., a radio frequency integrated circuit (RFIC)) other than the radiating element may be additionally formed as part of the antenna module 3297.

According to various embodiments, the antenna module 3297 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 3201 and the external electronic device 3204 via the server 3208 coupled with the second network 3299. Each of the electronic devices 3202 or 3204 may be a device of a same type as, or a different type, from the electronic device 3201. According to an embodiment, all or some of operations to be executed at the electronic device 3201 may be executed at one or more of the external electronic devices 3202, 3204, or 3208. For example, if the electronic device 3201 should perform a function or a service automatically, or in response to a request from a user or another device, the electronic device 3201, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 3201. The electronic device 3201 may provide the outcome, with or without further processing of the outcome, as at least part of a reply to the request. To that end, a cloud computing, distributed computing, mobile edge computing (MEC), or client-server computing technology may be used, for example. The electronic device 3201 may provide ultra low-latency services using, e.g., distributed computing or mobile edge computing. In another embodiment, the external electronic device 3204 may include an internet-of-things (IoT) device. The server 3208 may be an intelligent server using machine learning and/or a neural network. According to an embodiment, the external electronic device 3204 or the server 3208 may be included in the second network 3299. The electronic device 3201 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 3240) including one or more instructions that are stored in a storage medium (e.g., internal memory 3236 or external memory 3238) that is readable by a machine (e.g., the electronic device 3201). For example, a processor (e.g., the processor 3220) of the machine (e.g., the electronic device 3201) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments, an electronic device may include a housing including a first housing and a second housing connected to the first housing by a hinge structure to be rotatable around a first axis, a magnet structure disposed inside the housing, the magnet structure including a magnet and a conductive coating member for enclosing a surface of the magnet, and a wireless communication circuit electrically connected to the conductive coating member, wherein the magnet is disposed to maintain a folding state in which the first housing and the second housing are folded, and the wireless communication circuit feeds a portion of the conductive coating member of the magnet structure to transmit and/or receive a signal in a designated first frequency band by using the conductive coating member as an antenna radiator.

According to an embodiment, a portion of an edge of the first housing may include a conductive part, the conductive part of the first housing may be electrically connected to the wireless communication circuit, and the wireless communication circuit may feed the conductive part to transmit and/or receive a signal in a designated second frequency band distinguished from the first frequency band by using the conductive part of the first housing as an antenna radiator.

According to an embodiment, a first conductive connection member for electrically connecting the wireless communication circuit and the conductive coating member of the magnet structure may be further included, and the wireless communication circuit may directly feed the conductive coating member through the first conductive connection member to transmit and/or receive a signal in a designated first frequency band by using the conductive coating member of the magnet structure as the antenna radiator.

According to an embodiment, a printed circuit board (PCB) on which the wireless communication circuit is disposed; a non-conductive structure disposed between the PCB and the first housing inside the electronic device; and a second conductive connection member disposed along the non-conductive structure and electrically connecting the first conductive connection member and the conductive coating member of the magnet structure may be further included, and the wireless communication circuit may feed the conductive coating member through the first conductive connection member and the second conductive connection member to transmit and/or receive a signal in the designated first frequency band by using the conductive coating member of the magnet structure as the antenna radiator.

According to an embodiment, the conductive coating member of the magnet structure may be formed of nickel and the magnet of the magnet structure may be formed of ferrite or neodymium.

According to an embodiment, the magnet structure may further include a conductive extension member electrically connected to the conductive coating member and a conductive pattern member electrically connected to the conductive extension member and the wireless communication circuit may feed the conductive coating member to transmit and/or receive a signal in the designated first frequency band by using the conductive coating member, the conductive extension member electrically connected to the conductive coating member, and the conductive pattern member together as the antenna radiator.

According to an embodiment, the magnet structure may further include a protrusion protruding in a direction facing the inside of the electronic device from the edge of the first housing, and the wireless communication circuit may feed the conductive coating member formed on the protrusion of the magnet structure to transmit and/or receive a signal in the designated first frequency band by using the magnet structure having the protrusion formed thereon as the antenna radiator.

According to various embodiments, an electronic device may include a housing including a first housing and a second housing connected to the first housing by a hinge structure to be rotatable around a first axis, a portion of an edge of the first housing including a conductive part, a magnet structure disposed on an area adjacent to the conductive part of the edge of the first housing inside the housing, the magnet structure including a magnet and a conductive coating member for enclosing a surface of the magnet, and a wireless communication circuit electrically connected to the conductive coating member, wherein the magnet is disposed to maintain a folding state in which the first housing and the second housing are folded, the conductive coating member of the magnet structure and the conductive part of the edge of the first housing are electrically connected to each other, and the wireless communication circuit feeds a portion of the conductive coating member to transmit and/or receive a signal in a designated third frequency band based on a first electrical path including the conductive coating member and the conductive part.

According to an embodiment, the conductive part of the first housing may include a first area exposed to the outside of the electronic device and a second area extending toward the inside of the first housing from a middle of the first area, and a third conductive connection member disposed on the second area and electrically connecting the conductive coating member of the magnet structure and the conductive part may be further included.

According to an embodiment, the designated third frequency may be a frequency band within 2.4 GHz to 2.5 GHz or may include a frequency band within 5.0 GHz to 5.8 GHz.

According to an embodiment, a switching module including at least one lumped element electrically connected to the conductive coating member of the magnet structure may be further included, and the conductive coating member may be electrically connected to the wireless communication circuit through the switching module.

According to various embodiments, an electronic device may include a housing including a first housing and a second housing connected to the first housing by a hinge structure to be rotatable around a first axis, a portion of an edge of the first housing including a conductive part, a magnet structure disposed on an area adjacent to the conductive part of the edge of the first housing inside the housing, the magnet structure including a magnet and a conductive coating member for enclosing a surface of the magnet, and a wireless communication circuit disposed on a printed circuit board (PCB) and electrically connected to the conductive coating member, wherein the magnet is disposed to maintain a folding state in which the first housing and the second housing are folded, a portion of the conductive coating member of the magnet structure is electrically connected to the conductive part of the edge of the first housing, another portion thereof is electrically connected to a ground of the PCB, and the wireless communication circuit feeds a portion of the conductive part to transmit and/or receive a signal in a designated fourth frequency band based on a second electrical path including the conductive part and the conductive coating member electrically connected to the ground.

According to an embodiment, a switching module including at least one lumped element electrically connected to the conductive coating member of the magnet structure may be further included, and the conductive coating member may be electrically connected to the wireless communication circuit through the switching module.

According to an embodiment, in the electronic device, the conductive coating member of the magnet structure may be formed of nickel and the magnet of the magnet structure may be formed of ferrite or neodymium.

According to various embodiments, an electronic device may include a housing including a first housing and a second housing connected to the first housing by a hinge structure to be rotatable around a first axis, a portion of an edge of the first housing including a conductive part, a magnet structure disposed on an area adjacent to the conductive part of the edge of the first housing inside the housing, the magnet structure including a magnet and a conductive coating member for enclosing a surface of the magnet, and a wireless communication circuit disposed on a printed circuit board (PCB) and electrically connected to the conductive coating member, wherein the magnet is disposed to maintain a folding state in which the first housing and the second housing are folded, both ends of the conductive part of a first edge of the first housing are electrically connected to the PCB, the magnet structure is electrically connected to the a portion of the conductive part of the first edge of the first housing, and the wireless communication circuit feeds the conductive part of the first housing to transmit and/or receive a signal in a designated fifth frequency band based on a third electrical path including the conductive part and the conductive coating member electrically connected to the conductive part.

According to an embodiment, the conductive coating member of the magnet structure may be formed of nickel and the magnet of the magnet structure may be formed of ferrite or neodymium.

According to an embodiment, the conductive part of the first housing may include a first area exposed to the outside of the electronic device and a second area extending toward the inside of the first housing from a middle of the first area, and a third conductive connection member disposed on the second area and electrically connecting the conductive coating member of the magnet structure and the conductive part may be further included.

According to an embodiment, the designated fifth frequency may be a frequency band within 2.4 GHz to 2.5 GHz or may include a frequency band within 5.0 GHz to 5.8 GHz.

According to an embodiment, a switching module including at least one lumped element electrically connected to the conductive coating member of the magnet structure may be further included, and the conductive coating member may be electrically connected to the wireless communication circuit through the switching module.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a housing comprising a first housing and a second housing, the second housing being connected to the first housing by a hinge structure to be rotatable around a first axis;
a magnet structure disposed inside the housing, the magnet structure comprising a magnet and a conductive coating member configured to enclose a surface of the magnet; and
a wireless communication circuit electrically connected to the conductive coating member,
wherein the magnet is disposed to maintain a folding state in which the first housing and the second housing are folded, and
wherein the wireless communication circuit is configured to feed a portion of the conductive coating member of the magnet structure to transmit and/or receive a signal in a designated first frequency band by using the conductive coating member as an antenna radiator.

2. The electronic device of claim 1,
wherein a portion of an edge of the first housing comprises a conductive part,
wherein the conductive part of the first housing is electrically connected to the wireless communication circuit, and
wherein the wireless communication circuit is configured to feed the conductive part to transmit and/or receive a signal in a designated second frequency band distinguished from the first frequency band by using the conductive part of the first housing as an antenna radiator.

3. The electronic device of claim 1, further comprising:
a first conductive connection member configured to electrically connect the wireless communication circuit and the conductive coating member of the magnet structure,
wherein the wireless communication circuit is configured to directly feed the conductive coating member through the first conductive connection member to transmit and/or receive a signal in the designated first frequency band by using the conductive coating member of the magnet structure as the antenna radiator.

4. The electronic device of claim 1, further comprising:
a first conductive connection member configured to electrically connect the wireless communication circuit;
a printed circuit board (PCB) on which the wireless communication circuit is disposed;
a non-conductive structure disposed between the PCB and the first housing inside the electronic device; and a second conductive connection member disposed along the non-conductive structure and configured to electrically connect the first conductive connection member and the conductive coating member of the magnet structure, wherein the wireless communication circuit is configured to feed the conductive coating member through the first conductive connection member and the second conductive connection member to transmit and/or receive a signal in the designated first frequency band by using the conductive coating member of the magnet structure as the antenna radiator.

5. The electronic device of claim 1,
wherein the conductive coating member of the magnet structure is formed of nickel, and
wherein the magnet of the magnet structure is formed of ferrite or neodymium.

6. The electronic device of claim 1,
wherein the magnet structure further comprises a conductive extension member electrically connected to the conductive coating member and a conductive pattern member electrically connected to the conductive extension member, and
wherein the wireless communication circuit is configured to feed the conductive coating member to transmit and/or receive a signal in the designated first frequency band by using the conductive coating member, the conductive extension member electrically connected to the conductive coating member, and the conductive pattern member together as the antenna radiator.

7. The electronic device of claim 1,
wherein the magnet structure further comprises a protrusion protruding in a direction facing the inside of the electronic device from an edge of the first housing, and
wherein the wireless communication circuit is configured to feed the conductive coating member formed on the protrusion of the magnet structure to transmit and/or receive a signal in the designated first frequency band by using the magnet structure having the protrusion formed thereon as the antenna radiator.

8. An electronic device comprising:
a housing comprising a first housing and a second housing, the second housing being connected to the first housing by a hinge structure to be rotatable around a first axis, a portion of an edge of the first housing comprising a conductive part;
a magnet structure disposed inside the housing and disposed on an area adjacent to the conductive part of the edge of the first housing, the magnet structure comprising a magnet and a conductive coating member configured to enclose a surface of the magnet; and
a wireless communication circuit electrically connected to the conductive coating member,
wherein the magnet is disposed to maintain a folding state in which the first housing and the second housing are folded,
wherein the conductive coating member of the magnet structure and the conductive part of the edge of the first housing are electrically connected to each other, and
wherein the wireless communication circuit is configured to feed a portion of the conductive coating member to transmit and/or receive a signal in a designated third frequency band based on a first electrical path comprising the conductive coating member and the conductive part.

9. The electronic device of claim 8,
wherein the conductive part of the first housing comprises a first area exposed to the outside of the electronic device and a second area extending toward the inside of the first housing from a middle of the first area, and
wherein the electronic device further comprises a third conductive connection member disposed on the second area and configured to electrically connect the conductive coating member of the magnet structure and the conductive part.

10. The electronic device of claim 8, wherein the designated third frequency band belongs to a frequency band within 2.4 gigahertz (GHz) to 2.5 GHz or comprises a frequency band within 5.0 GHz to 5.8 GHz.

11. The electronic device of claim 8, further comprising:
a switching module comprising at least one lumped element electrically connected to the conductive coating member of the magnet structure,
wherein the conductive coating member is electrically connected to the wireless communication circuit through the switching module.

12. An electronic device comprising:
a housing comprising a first housing and a second housing, the second housing being connected to the first housing by a hinge structure to be rotatable around a first axis, a portion of an edge of the first housing comprising a conductive part;
a magnet structure disposed inside the housing and disposed on an area adjacent to the conductive part of the edge of the first housing, the magnet structure comprising a magnet and a conductive coating member configured to enclose a surface of the magnet; and
a wireless communication circuit disposed on a printed circuit board (PCB) and electrically connected to the conductive coating member,
wherein the magnet is disposed to maintain a folding state in which the first housing and the second housing are folded,
wherein a portion of the conductive coating member of the magnet structure is electrically connected to the conductive part of the edge of the first housing, another portion thereof is electrically connected to a ground of the PCB, and
wherein the wireless communication circuit is configured to feed a portion of the conductive part to transmit and/or receive a signal in a designated fourth frequency band based on a second electrical path comprising the conductive part and the conductive coating member electrically connected to the ground.

13. The electronic device of claim 12, wherein the designated fourth frequency band belongs to a frequency band within 2.4 gigahertz (GHz) to 2.5 GHz or comprises a frequency band within 5.0 GHz to 5.8 GHz.

14. The electronic device of claim 12, further comprising:
a switching module comprising at least one lumped element electrically connected to the conductive coating member of the magnet structure,
wherein the conductive coating member is electrically connected to the wireless communication circuit through the switching module.

15. The electronic device of claim 12,
wherein the conductive coating member of the magnet structure is formed of nickel, and
wherein the magnet of the magnet structure is formed of ferrite or neodymium.

16. An electronic device comprising:
a housing comprising a first housing and a second housing, the second housing being connected to the first housing by a hinge structure to be rotatable around a first axis, a portion of an edge of the first housing comprising a conductive part;
a magnet structure disposed inside the housing and disposed on an area adjacent to the conductive part of the edge of the first housing, the magnet structure comprising a magnet and a conductive coating member configured to enclose a surface of the magnet; and
a wireless communication circuit disposed on a printed circuit board (PCB) and electrically connected to the conductive coating member,
wherein the magnet is disposed to maintain a folding state in which the first housing and the second housing are folded,
wherein both ends of the conductive part of a first edge of the first housing are electrically connected to the PCB,
wherein the magnet structure is electrically connected to a portion of the conductive part of the first edge of the first housing, and
wherein the wireless communication circuit is configured to feed the conductive part of the first housing to transmit and/or receive a signal in a designated fifth frequency band based on a third electrical path comprising the conductive part and the conductive coating member electrically connected to the conductive part.

17. The electronic device of claim 16,
wherein the conductive coating member of the magnet structure is formed of nickel, and
wherein the magnet of the magnet structure is formed of ferrite or neodymium.

18. The electronic device of claim 16,
wherein the conductive part of the first housing comprises a first area exposed to the outside of the electronic device and a second area extending toward the inside of the first housing from a middle of the first area, and
wherein the electronic device further comprises a third conductive connection member disposed on the second area and configured to electrically connect the conductive coating member of the magnet structure and the conductive part.

19. The electronic device of claim 16, wherein the designated fifth frequency band belongs to a frequency band within 2.4 gigahertz (GHz) to 2.5 GHz or comprises a frequency band within 5.0 GHz to 5.8 GHz.

20. The electronic device of claim 16, further comprising:
a switching module comprising at least one lumped element electrically connected to the conductive coating member of the magnet structure,
wherein the conductive coating member is electrically connected to the wireless communication circuit through the switching module.

* * * * *